3,014,944
PROCESS OF PREPARING ORGANIC
PHOSPHORUS COMPOUNDS
Gail H. Birum, Dayton, Ohio, assignor to Monsanto Chemical Company, St. Louis, Mo., a corporation of Delaware
No Drawing. Filed May 9, 1960, Ser. No. 27,505
27 Claims. (Cl. 260—461)

The present invention relates to organic compounds of phosphorus and provides a new and highly valuable method of preparing compounds having both trivalent phosphorus and pentavalent phosphorus ester groups.

The present method involves three reactants: a trivalent phosphorus compound having at least one chlorine or bromine atom attached to the phosphorus atom thereof, a carbonyl compound which is either an aldehyde or a ketone, and an ester of a trivalent phosphorus acid. Reaction proceeds by the replacement of the chlorine or bromine which is attached to the phosphorus atom with a phosphinylhydrocarbyloxy group. Hence, the nature of the reaction product depends upon the number of halogen atoms linked to the phosphorus initially. Thus, where X denotes chlorine or bromine, and T is an alkyl or haloalkyl radical, the following reactions take place:

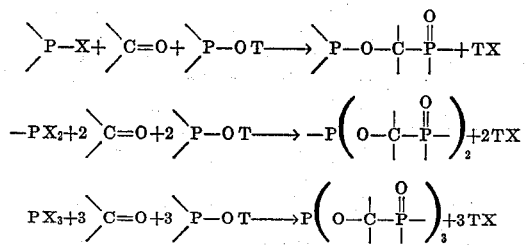

The dangling valences depicted above can be satisfied by numerous substituents. It is thus apparent that the present process provides a means of obtaining a multitude of organic compounds having two or more phosphorus ester groups. The only limitation on the phosphorus halogen compound is that it is not one which undergoes self-condensation, and the only limitation on the carbonyl compound is that it does not contain substituents which are more reactive with the phosphorus halogen compound than is the carbonyl radical.

The invention thus provides a method of preparing compounds having a plurality of diverse phosphorus ester groups which comprises contacting together the three reactants:

(1) A trivalent phosphorus compound which does not undergo self-condensation and which has attached to the phosphorus atom thereof from one to three halogen atoms selected from the class consisting of chlorine and bromine, (2) A carbonyl compound which is selected from the class consisting of aldehydes and ketones and which has no substituent with which the compound (1) reacts in preference to the carbonyl group, and (3) A triorgano trivalent phosphorus ester in which at least one of the organic groups is bonded, at an aliphatic carbon thereof, to phosphorus through an oxygen atom.

Phosphorus halogen compounds which will undergo self-condensation are, e.g., those in which there are present substituents containing reactive hydrogen such as —OH, —SH, —COOH, H₂N— and RHN— radicals, or aldehydic or ketonic carbonyl groups. Obviously, such compounds cannot be used in a reaction involving replacement of halogen by a moiety of another reactant. So far as substitution in the carbonyl reactant is concerned, the phosphorus halogen compound undergoes reaction with the carbonyl group in preference to almost any group. The primary or secondary amino groups are examples of the few exceptions. Substituents such as, e.g., the nitro, halogen, hydroxy, carboxy, cyano, methylenedioxy, hydrocarbyloxy, hydrocarbylthio, hydrocarbyldithio, dihydrocarbylamino or dihydrocarbylamido radicals may be present in the carbonyl compound which is employed in the present reaction.

While the presently provided process is applicable to the production of a very great number of substituted compounds having diverse phosphorus ester groups, of particular importance is the process effected with the reactants shown in the following scheme:

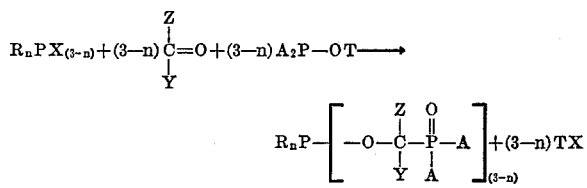

in which X is selected from the class consisting of chlorine and bromine, n is an integer of 0 to 2, R is selected from the class consisting of hydrocarbyl-, hydrocarbyloxy-, hydrocarbylthio-, and (hydrocarbyloxy)hydrocarbyloxy radicals of from 1 to 12 carbon atoms and such radicals carrying halogen as substituents, (alkyl)₂N- and (alkyl)(aryl)N- radicals having from 1 to 5 carbon atoms in each alkyl group and 6 to 7 carbon atoms in the aryl group;

D͡N—radicals wherein D represents the necessary atoms to make up a saturated N-hetero ring of from 3 to 6 members; and wherein two R's taken together stand for a radical selected from the class consisting of the bivalent -O-hydrocarbylene-O- and -O-halohydrocarbylene-O- radicals which complete a ring with the phosphorus atom, are free of aliphatic unsaturation, and which contain from 2 to 4 carbon atoms in a chain and a total of 2 to 12 carbon atoms; Y is selected from the class consisting of hydrogen, hydrocarbyl radicals of from 1 to 17 carbon atoms when n is 2, hydrocarbyl radicals of from 1 to 10 carbon atoms when n is less than 2, the furyl radical and the thienyl radical, and such radicals carrying as a substituent, when n is 0 to 2, a radical which is selected from the class consisting of halogen, —NO₂, —CHO, methylenedioxy, —CN, (alkyl)₂N—, —COO-alkyl, —S-alkyl, —SS-alkyl, —O-alkyl and alkyl-CONH— where the alkyl radical has from 1 to 5 carbon atoms, and also only when n is 2, the —OH and —COOH radicals; Z is selected from the class consisting of hydrogen and the methyl radical and is methyl only when Y is an alkyl radical of from 1 to 2 carbon atoms; and, when n is 2, Z and Y taken together with the carbon atom to which they are attached complete the cyclohexane ring; A is selected from the class consisting of hydrocarbyl, hydrocarbyloxy, and (hydrocarbyloxy)hydrocarbyloxy radicals of from 1 to 12 carbon atoms and such radicals having halogen as a substituent; and T is selected from the class consisting of alkyl, alkenyl, aralkyl and hydrocarbyloxyalkyl radicals of from 1 to 12 carbon atoms, and such radicals having halogen substitution.

Using the above-defined reactants, when only one halogen atom is present, the reaction proceeds as follows:

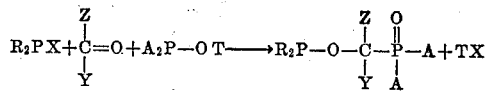

When there are two halogen atoms present, the reaction is:

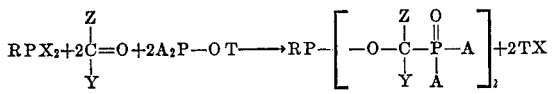

When there are three halogen atoms present, the reaction proceeds:

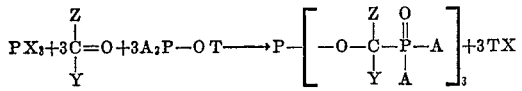

Particularly useful trivalent phosphorus compounds having halogen linked to the phosphorus atom thereof are compounds of the formula $$PX_3$$
$$R'PX_2$$
$$R'OPX_2$$
$$R'SPX_2$$
$$(R'O)_2PX$$
$$(R'S)_2PX$$
$$(R'S)(R'O)PX$$
$$R'_2PX$$
$$R'(R'O)PX$$
$$R'(R'S)PX$$

wherein R' is a hydrocarbyl radical of from 1 to 2 carbon atoms or said hydrocarbyl radical containing halogen substitution and X is chlorine or bromine. Also presently useful are the compounds of the formula R'OPX$_2$ (R'O)$_2$PX and R'(R'O)PX wherein the R' which is linked to the oxygen carries a hydrocarbyloxy radical which may or may not be halogen-substituted.

Of the nitrogenous phosphorus halogen compounds, the following are presently useful:

$$(alkyl)_2N-PX_2$$
$$(alkyl)_2N-P(OR')X$$
$$(alkyl)_2N-P(SR')X$$
$$(alkyl)_2N-P(R')X$$
$$(alkyl)(aryl)N-PX_2$$
$$(alkyl)(aryl)N-P(SR')X$$
$$(alkyl)(aryl)N-P(OR')X$$
$$(alkyl)(aryl)N-P(R')X$$

wherein the alkyl radical has from 1 to 5 carbon atoms, the aryl radical has from 6 to 7 carbon atoms and R' is as defined above. Also presently useful are the heterocyclic compounds of the formulae

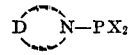

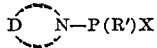

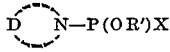

where

denotes a saturated N-heterocyclic radical of from 3 to 6 members and R' is as above defined. Particularly useful also are the dioxy compounds of the formula

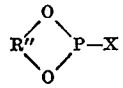

wherein R" is selected from the class consisting of bivalent hydrocarbylene radicals which are free of aliphatic unsaturation, which contain from 2 to 4 carbon atoms in a chain and a total of from 2 to 12 carbon atoms, and halogen-substitution products of such radicals.

Examples of the trivalent phosphorus halogen compounds (PX$_3$) having the above formulas and useful for the present purpose are, of course, phosphorus trichloride, phosphorus tribromide and mixed phosphorus bromide chlorides.

Compounds of the formula R'OPX$_2$ are hydrocarbyl phosphorodichloridites or dibromidites wherein there may or may not be present halogen and/or a hydrocarbyloxy radical as a substituent at the hydrocarbyl radical. The hydrocarbyl radical may be saturated or unsaturated and it may be aliphatic, cycloaliphatic or aromatic, e.g., alkyl, alkenyl, alkinyl, cycloalkyl, cycloalkenyl, aryl, alkaryl or aralkyl. Examples of the presently useful aliphatic hydrocarbyl or halohydrocarbyl phosphorodihalidites are methyl, ethyl, n-propyl, propinyl, isopropyl, isopropenyl, allyl, n-butyl, isobutyl, tert-butyl, 2-butenyl, amyl, isoamyl, n-hexyl, hexinyl, n-heptyl, n-octyl, 2-octenyl, 2-ethylhexyl, octadienyl, isononyl, n-decyl, n-undecyl, n-dodecyl, 2-dodecenyl, 2-chloroethyl, 2-fluroethyl, 3-chloro-2-propenyl, tetrachlorobutyl, 4-chloro-3-butenyl, 2-chloropropyl, 4-bromo-2-butenyl, 5-chloropentyl, 4-chloro-2-pentenyl, 3,3,3-tribromopropyl, 2-iodopropyl, 6-bromo-2-hexinyl, dichlorododecyl or trichlorohexyl phosphorodichloridite or phosphorodibromidite.

Examples of the presently useful cycloaliphatic or halocycloaliphatic phosphorodihalidites are cyclohexyl, cyclohexenyl, cyclopentyl, 2-methylcyclopentyl, cyclopentenyl, cyclohexylmethyl, 4-isopropylcyclohexyl, 2,4-dichlorocyclopentyl, 2-bromocyclohexyl, 3-chlorocyclohexenyl, 2-fluorocyclopentyl, 2-iodo-4-methylcyclohexyl, tetrachlorocyclohexyl or hexachlorobicycloheptenyl phosphorodichloridite or phosphorodibromidite.

Examples of presently useful aromatic or aliphatic-aromatic or cycloaliphatic-aromatic phosphorodihalidites are phenyl, α- or β-naphthyl, 4-biphenylyl, o-, m- or p-tolyl, o-allylphenyl, p-ethylphenyl, m-vinylphenyl, di-butylphenyl, mesityl, cumyl, o-, m- or p-pentylphenyl, cyclohexylphenyl, benzyl, 2-phenylethyl, 4-isopropylbenzyl, or α-naphthylmethyl phosphorodichloridite or phosphorodibromidite.

The hydrocarbyl or halohydrocarbyl phosphorodichloridites or dibromidites may also carry a hydrocarbyloxy radical or a halohydrocarbyloxy radical as substituent, e.g., 2-ethoxyethyl, 2-(3-chloropropoxy)ethyl 3-phenoxypropyl, 2-(2,4-dichlorophenoxy)ethyl, 4-butoxybutyl, 4-methoxyphenyl, 3-isopropoxybenzyl, β-methoxy-α-naphthyl, 4-phenoxyphenyl, 2-(chloroethoxy)ethyl, 4-methoxy-3-chloro-2-butenyl, 3-cyclohexyloxypropyl, 6-cyclohexyloxyhexyl, 4-butoxy-3,3-dichlorobutyl, 2-fluoro-3-methoxypropyl, or 4-(2-hexenyloxy)cyclohexyl phosphorodichloridite or phosphorodibromidite.

Compounds of the formula R'SPX$_2$ are hydrocarbyl or halohydrocarbyl phosphorodihalidothioites. Such compounds are, e.g., the aliphatic esters such as methyl, ethyl, propyl, isopropenyl, 2-propinyl, n-butyl, 2-ethylhexyl, n-dodecyl or 2-dodecenyl phosphorodichloridothioite or phosphorodibromidothioite; the cycloalkyl or cycloalkenyl esters such as cyclohexyl, cyclohexenyl, cyclohexinyl, 2-methylcyclopentyl, cyclopentenyl, or 2,4-dimethylcyclohexyl phosphorodichloridothioite or phosphorodibromidothioite; the halogenated aliphatic or cycloaliphatic esters such as 2-chloroethyl, 4-chloro-2-butenyl, 3-iodopropyl, 3,3-dibromopropyl, 3-bromo-2-propinyl, 2-fluoroethyl, trichlorooctyl, bromododecyl, 2-chlorocyclohexyl, dichlorocyclopentenyl or tribromocyclopentyl phosphorodichloridothioite or phosphorodibromidothioite and the oxy derivatives thereof such as 2-ethoxyethyl, 4-methoxy-2-butenyl, 3-hexyloxy-2-chloropropyl or 2-(4-bromophenoxy)ethyl phosphorochloridothioite or phosphorobromidothioite. Examples of the presently useful aromatic, aromatic-aliphatic or aromatic-cycloaliphatic phosphorodihalidothioites are phenyl phosphorodichloridothioite, 2-, 3-, or 4-tolyl phosphorodibromidothioite, β - ethyl - α - naphthyl phosphorodichloridothioite, benzyl phosphorodichloridothioite, 4-cyclohexylphenyl phosphorodichloridothioite, 4-biphenylyl phosphorodichloridothioite, etc, Halogen and/or hydrocarbyloxy substituents may be present in either the dihalidites or the dihalidothioites at either an aromatic, aliphatic or cycloaliphatic radical thereof. Examples of such substituted compounds are 2-, 3-, or 4-chlorophenyl phosphorodichloridite or phosphorodichloridothioite; 2-, 3- or 4-methoxyphenyl phosphorochloridite or phosphorochloridothioite, 3,4,5- or 2,3,4-trichlorophenyl phosphorodichloridite or phosphorodichloridothioite; 2-, 3-, or 4-(2-chloroethoxy)benzyl phosphorochloridite or phosphorochloridothioite; pentachlorophenyl phosphorodichloridite or phosphorodichloridothioite; β-bromo-α-naphthyl phosphorodichloridite or phosphorodichloridothioite; α-chloro-2-phenethyl phosphorochloridite or phosphorochloridothioite; 4-(trifluoromethyl) phenyl phosphorodichloridite or phosphorodichloridothioite; 2-, 3- or 4-cyclohexyloxyphenyl phosphorochloridite or phosphorochloridothioite; p-chlorobenzyl phosphorodichloridite or phosphorodichloridothioite; 4-(2-butenyloxy)-2, 3-dichlorobenzyl phosphorodichloridite or phosphorochloridothioite; 4-(iodophenyl)phenyl phosphorodichloridite or phosphorodichloridothioite; octachlorobiphenylyl phosphorodichloridite or phosphordichloridothioite.

Presently useful compounds of the formula (R'O)₂PX are dihydrocrabyl phosphorochloridites or phosphorobromidites or halogen and/or hydrocarbyloxy substitution products thereof. A class of aliphatic trivalent phosphorus halides which are suited for the present purpose includes the dialkyl phosphorochloridites or phosphorobromidites, i.e., compounds of the formula (alkyl—O)₂—PX in which the alkyl radical has from 1 to 12 carbon atoms and X is chlorine or bromine, e.g., dimethyl, diethyl, diisopropyl, di-n-butyl, di-tert-butyl, di-n-amyl, diisoamyl, di-n-hexyl, di-n-heptyl, bis(2-ethylhexyl), di-n-octyl, diisononyl, di-n-decyl, di-n-undecyl, di-n-dodecyl or di-tert-dodecyl phosphorochloridite or phosphorobromidite or the mixed esters such as ethyl methyl phosphorochloridite, n-octyl n-propyl phosphorobromidite, tert- amyl n-dodecyl phosphorochloridite, etc.

Also useful are the olefinic or acetylenic esters such as diisopropenyl, di-2-butenyl, diallyl, di-2-propinyl, dihexenyl, didodecenyl, or dioctadienyl phosphorochloridite or bromidite or mixed esters such as ethyl vinyl, allyl butenyl, methyl pentadienyl, butinyl hexinyl or dodecenyl propyl phosphorochloridite or bromidite.

The alkyl, alkenyl or alkinyl radicals of the dialkyl phosphorochloridite or phosphorobromidite may be substituted by one or more halogen atoms and/or hydrocarbyloxy radicals. Examples of presently useful halogenated aliphatic phosphorochlorides or phosphorobromidites are the simple esters such as bis(2-chloroethyl), bis(3 - bromopropyl), bis(chloropropenyl), bis(chloropentinyl), bis(dichlorooctyl), bis(2-fluoroethyl), bis(2-ethoxyethyl), bis(4-methoxy-2,3-dichlorobutyl), or bis(2-bromo-2-chloroethyl) phosphorochloridite or phosphorobromidite; the mixed esters such as 2-chloroethyl 3-chloro-2-butenyl phosphorochloridite, dibromohexinyl 3-bromopropyl phosphorochloridite, 2-fluoroethyl tetrachlorobutyl phosphorochloridite or 2-butenyloxyethyl 2-methoxyethyl phosphorobromidite; and mixed esters of both substituted and unsubstituted alcohols such as 2-chloroethyl methyl phosphorochloridite, 2-butenyl dichlorobutyl phosphorochloridite, 2-chloropropyl ethyl phosphorobromidite or 2-ethoxyethyl dodecyl phosphorochloridite.

The corresponding aliphatic phosphorohalidothioites which are presently useful are compounds of the formula (alkyl—S)₂—PX wherein alkyl and X is as above defined. Such compounds are, for example, dimethyl, diethyl, di-n-butyl, bis(2-ethylhexyl), didodecyl, ethyl methyl, methyl n-octyl or isopropyl methyl phosphorochloridothioite or phosphorobromidothioite. Examples of the presently useful simple or mixed haloalkyl or hydrocarbyloxyalkyl esters are bis(2-chloroethyl), bis(3-fluoropropyl), bis[2-(2-chloroethoxy)ethyl] or methyl trichlorobutyl phosphorochloridothioite or phosphorobromidothioite.

Examples of presently useful olefinic or acetylenic phosphorohalidothioites are dipentenyl, diheptinyl, bis(chlorobutenyl), ethyl octenyl, dibromopropyl methoxyprepenyl or fluoroethyl dodecenyl phosphorochloridothioite or phosphorobromidothioite.

Also presently useful are the cycloalkyl esters such as dicyclohexyl, dicyclopentyl, 2,3-dimethylcyclohexyl n-propyl, bis(cyclopentylmethyl), bis(4-ethoxycyclohexyl), bis(4-isopropenylcyclohexyl) or bis(4-chlorocyclohexyl) phosphorochloridite or phosphorochloridothioite.

Also useful are the aromatic, aliphatic-aromatic, or aromatic-cycloaliphatic phosphorohalidites, i.e., compounds of the formula

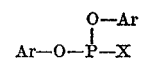

in which Ar is a hydrocarbyl radical which contains an aromatic ring and has from 6 to 12 carbon atoms, and X is chlorine or bromine. Such compounds may be diaryl, bis(alkaryl), bis(aralkyl), bis(cycloalkylaryl), bis(arylcycloalkyl), aryl alkaryl, aryl aralkyl, alkaryl aralkyl or aryl cycloalkyl phosphorohalidites, e.g., diphenyl, di-p-tolyl, di-α- or β-naphthyl, bis(4-methoxyphenyl), dibiphenylyl, dimesityl, dicumyl, bis(2-butylphenyl), bis(4-isopropenylphenyl), phenyl α-naphthyl, biphenylyl phenyl, 4-ethylphenyl phenyl, bis(2-phenylvinyl), dibenzyl, bis(2-ethylphenyl), bis[3-(2-propinyl)phenyl], bis(cyclohexylphenyl), bis-(phenycyclopentyl), benzyl phenyl, biphenylyl 4-ethylbenzyl, 3-phenylpropyl mesityl, cyclohexyl phenyl or β-naphthylmethyl phenyl phosphorochloridite or phosphorobromidite.

The corresponding phosphorohalidodithioites, i.e., compounds of the formula

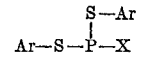

wherein Ar is as defined above, are similarly valuable for the present purpose. Such compounds are, for example, diphenyl phosphorochloridodithioite, bis(4-ethylphenyl) phosphorobromidodithioite, bis(cyclohexylphenyl) phosphorochloridothioite, di-β-naphthyl phosphorochloridodithioite, biphenylyl phenyl phosphorochloridodithioite, bis(3-phenylpropenyl) phosphorobromidothioite, benzl α-naphthylmethyl phosphorobromidodithioite, p-tolyl 2-phenylethyl phosphorochloridodithioite, etc.

Mixed phosphorohalidites or phosphorochloridodithioites, i.e., compounds in which one ester group is aliphatic and the other is aromatic, are likewise useful in the present purpose. Such compounds are, for example, methyl, phenyl, phosphorochloridite, 2-chloroethyl α-naphthyl phosphorochloridodithioite, allyl 2 - methylcyclohexyl phosphorobromidite, n-butyl cyclohexyl phosphorochloridite, 2-ethylhexyl 2,3-dichlorophenyl phosphorochloridite, etc.

Presently useful trivalent phosphorus halides also include the O-hydrocarbyl S-hydrocarbyl phosphorochloridothioites, i.e., compounds of the formula

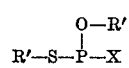

wherein R' is a hydrocarbyl or hydrocarbyloxyhydrocarbyl radical or such a radical carrying halogen substitution and X is chlorine or bromine. Such compounds are, for example, O,S-diphenyl, O,S-dicyclohexyl, O-methyl S-phenyl, O,S-bis(4-chlorophenyl), O,S-bis(2-ethoxyethyl), O-2-propenyl S-p-tolyl, O,S-di-β-naphthyl, O,S-diethyl, O,S-di-2-hexinyl, O,S-di-m-tolyl O-4-chlorophenyl S-biphenylyl, O-β-naphthylmethyl S-phenyl, O-4(2- butenylphenyl) S-2,4-dichlorophenyl or O-n-butyl S-p-cumyl phosphorochloridothioites or phosphorobromidothioites.

A very valuable class of the presently useful halides includes the dihydrocarbylphosphinous halides, i.e., compounds of the formula $$R'_2PX$$

wherein R' and X are as above defined. Such compounds are e.g., diethylphosphinous bromide, di-2-butenylphosphinous chloride, dimethylphosphinous chloride, diphenylphosphinous chloride, d-2-propinylphosphinous bromide, di-p-tolylphosphinous chloride, dicyclohexylphosphinous chloride, bis(4-hexenylphenyl)phosphinous bromide, bis-(2-ethylhexyl)phosphinous chloride, dibenzylphosphinous chloride, dicyclohexenylphosphinous chloride, di-α- or β-naphthylphosphinous chloride, (2-ethylphenyl)phenylphosphinous chloride, benzylbiphenylylphosphinous chloride, bis(4-pentylphenyl)phosphinous chloride, (dodecyl)phenyl-phosphinous bromide, etc.

Also useful in the reaction with aldehydes and triorgano phosphites are the hydrocarbyl hydrocarbylphosphonohalidites and phosphonohalidothioites, i.e., compounds of the formula

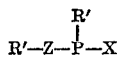

wherein R' and X are as above defined and Z denotes -O- or -S-. Examples of such compounds are methyl, ethyl, 2-propinyl, n-octyl, tert-dodecyl, 2-octenyl, cyclohexyl, phenyl, p-tolyl, 4-(2-propenyl)phenyl, benzyl, α-naphthyl, or biphenylyl phenylphosphonochloridite or ethylphosphonochloridite; phenyl or 4-ethylphenyl benzylphosphonobromidite; n-butyl or β-naphthyl cyclopentylphosphonochloridite; cyclohexyl or 2-butenyl biphenylylphosphonochloridothioite; phenyl or ethyl phenylphosphonochloridothioite, etc.

The above dihydrocarbyl phosphorohalidites, dihydrocarbylphosphorohalidodithioites, O-hydrocarbyl S-hydrocarbyl phosphorohalidothioites, dihydrocarbylphosphinous halides, hydrocarbyl hydrocarbylphosphonohalidites and hydrocarbyl hydrocarbylphosphonohalidothioites may contain one or more halogen and/or hydrocarbyloxy substituents in either an alkyl, aryl or cycloaliphatic portion thereof. Examples of such halogen-substituted compounds are:

bis(2-, 3- or 4-chlorophenyl) phosphorochloridite or phosphorochloridodithioite
bis(2-, 3- or 4-bromophenyl) phosphorobromidite or phosphorobromidodithioite
O-(2-, 3- or 4-chloro or bromophenyl) S-phenyl phosphorochloridothioite
bis(4-methoxy-2-butenyl) phosphorobromidite or phosphorochloridothioite
bis(2-chloropropyl) phosphorochloridite or phosphorochloridodithioite
bis(2-phenoxyethyl) phosphorobromidite or phosphorochloridothioite
bis(4-iodo-2-ethylphenyl) phosphorochloridite or phosphorochloridodithioite
bis[(4-fluoroethyl)phenyl] phosphorochloridite or phosphorochloridodithioite
bis(pentachlorophenyl) phosphorochloridite or phosphorochloridodithioite
bis(α-chloro-β-naphthyl) phosphorochloridite or phosphorochloridodithioite
bis(4-ethoxyphenyl) phosphorobromidite or phosphorochloridothioite
4-chlorobenzyl β-ethoxy-α-naphthyl phosphorochloridite or phosphorobromidothioite
bis(dichloro-2-pentenyl) phosphorochloridite or phosphorochloridodithioite
bis(octachlorobiphenylyl) phosphorochloridite or phosphorochloridodithioite
bis(2-chloroethyl) phosphorochloridite or phosphorochloridodithioite
bis(2-chloropropyl) phosphorochloridite or phosphorochloridodithioite
bis(3,4-dibromocyclohexenyl) phosphinous chloride
bis-[3-(2-chloroethoxy)propyl]phosphinous chloride
bis(3-fluoropropyl)phosphinous chloride
bis(2-isopropoxyphenyl) phosphinous chloride
bis(cyclohexyloxyphenyl) phosphinous chloride
(2-phenoxyethyl)phenylphosphinous bromide
2-chloroethyl ethylphosphonochloridothioite
3-propoxypropyl 2-propenylphosphonochloridite
tetrachlorobutyl dodecylphosphonochloridite
3-phenoxy-2-chloro-2-butenyl phenylphosphonobromidite
methyl 4-chlorophenylphosphonochloridite
2-chloroethyl 2-chloroethylphosphonochloridite Another class of trivalent phosphorus halides which are presently useful are the hydrocarbylphosphonous dihalides of the formula $R'PX_2$ wherein R' is a hydrocarbyl radical of from 1 to 12 carbon atoms which may or may not have halogen and/or hydrocarbyloxy substitution, and X is halogen or bromine. Examples of such dihalides are the aromatic phosphonous dihalides such as phenylphosphonous dichloride, 2-, 3- or 4-chlorophenylphosphonous dichloride, phenoxyphenylphosphonous dibromide, α- or β-naphthylphosphonous dichloride, and 2-, 3- or 4-biphenylylphosphonous dichloride; the aliphatic phosphonous dichlorides such as methyl-, ethyl-, 2-chloroethyl-, isopropyl-, isopropenyl-, n-butyl-, tert-butyl-, trichlorobutyl-, 2-pentinyl, n-pentyl-, n-hexyl-hexadienyl, 2-ethylhexyl-, n-octyl-, octenyl, bromooctyl-, branched-chain nonyl-, 2-ethoxyethyl, isodecyl-, n-dodecyl-, 4-butoxy-2-chloro-2-butenyl and tert-dodecylphosphonous dichloride; the aliphatic-aromatic phosphonous dichlorides such as o-, m- or p-tolylphosphonous dichloride, 3-methoxyphenyl-phosphonous dibromide, diisopropyl-phenylphosphonous dichloride, 4-isopropenylphenylphosphonous dibromide, mesitylphosphonous dichloride, n-hexylphenylphosphonous dichloride, 3-phenoxy-2-chloropropylphosphonous dichloride, β-(2-chloroethyl)-α-naphthylphosphonous dichloride, 2-propinylphenylphosphonous dichloride, 4-chlorobenzylphosphonous dichloride, 2,4-dimethoxyphenylphosphonous dibromide, o-, m- or p-n-butyl-benzylphosphonous dichloride, 2-phenylethylphosphonous dichloride and β-naphthylmethylphosphonous dichloride; the cycloalkylphosphonous dichlorides such as cyclohexylphosphonous dichloride and 4-bromocyclopentylphosphonous dichloride, etc.

Also presently useful are nitrogenous halides of trivalent phosphorus which have the formula $>N-PX_2$, i.e., the phosphoramidous dichlorides. Particularly useful are the dialkylphosphoramidous dihalides having from 1 to 5 carbon atoms in the alkyl radical, e.g., dimethyl-, diethyl-, di-n-propyl-, diisopropyl-, di-n-butyl-, di-tert-butyl-, di-n-pentyl-, diisopentyl-, ethylmethyl-, butylpropyl- or methyl-n-pentyl-phosphoramidous dichloride. Another class of presently useful phosphoramidous dihalides includes the alkylphenylphosphoramidous dichlorides or dibromides and the alkyltolylphosphoramidous dichlorides or dibromides such as methyl- phenyl-, ethylphenyl-, phenyl-n-propyl-, isopropylphenyl-, n-butylphenyl-, or n-pentylphenylphosphoramidous dichloride or methyl-p-tolyl-, ethyl-o-tolyl-, n-propyl-p-tolyl-, n-butyl-m-tolyl, isobutyl-o-tolyl-, n-pentyl-p-tolyl-, isopentyl-o-tolyl-, methyl-o-tolyl-, or ethyl-p-tolylphosphoramidous dichloride or dibromide.

Still another class of presently useful nitrogenous dihalides includes the N-heterocyclic phosphonous dihalides of the formula

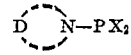

in which D represents the necessary atoms to make up a saturated N-hetero ring of from 3 to 6 members. This includes aziridinophosphonous dichloride

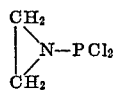

as well as the homologous 2-methylaziridino-, azetidino-, pyrrolidino- and piperidinophosphonous dichloride as well as morpholinophosphonous dichloride

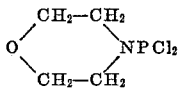

The corresponding dibromides are similarly useful.

The phosphonamidous halides of the formula

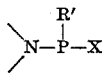

in which R' is a hydrocarbyl, or a hydocarbyloxyhydrocarbyl radical or such a radical carrying halogen substitution, and X is chlorine or bromine are also useful. Examples of these are N,N-diethylphenylphosphonamidous chloride and N-methyl-N-phenylethylphosphonamidous chloride, N-ethyl-N-phenyl(4-chlorocyclohexylphosphonoamidous)chloride or N,N-dipentyl(3-phenoxypropyl) - phosphonamidous bromide. Piperidino-4-chlorophenylphosphonous dichloride is illustrative of a compound in which the nitrogen is present as part of a heterocyclic ring.

Also presently useful are the phosphoramidohalidites and phosphoroamidohalidothioites of the formula

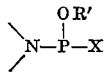

in which R' and X are as above defined. Examples of these are ethyl N,N-dimethylphosphoramidochloridite, cyclopentyl N,N - dimethylphosphoroamidobromidite, phenyl N,N-di-n-butylphosphoramidochloridite, 2-chloroethyl N-ethyl - N - phenylphosphoramidochloridothioite, and benzyl N,N - di - n-amylphosphoramidobromidite. Ethyl morpholinophosphonochloridite is illustrative of a compound in which the nitrogen is present as part of a heterocyclic ring.

Of pronounced utility in the presently provided process are cyclic esters of phosphorohalidous acid. Such esters have the formula

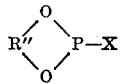

wherein R' is selected from the class consisting of bivalent hydrocarbylene radicals which are free of aliphatic unsaturation, and which contain from 2 to 4 carbon atoms in a chain and a total of 2 to 12 carbon atoms, and halogen substitution products of such radicals. Examples of compounds of the above formula are the various 2-halo dioxaphospholanes, dioxaphosphorinanes, and dioxaphosphepanes and benzodioxaphospholes, e.g., 2-chloro or 2-bromo-1,3,2-dioxaphospholane; 2-chloro-4-methyl-1,3,2-dioxaphospholane; 2-chloro-4,5-dimethyl-1,3,2-dioxaphospholane; 2-bromo-1,3,2-dioxaphosphorinane; 2-chloro-4-methyl - 1,3,2-dioxaphosphorinane; 2-chloro-1,3,2-dioxaphosphorinane; 2-chloro-1,3,2-dioxaphosphepane; 2-bromo-5-methyl-1,3,2-dioxaphosphepane; 2-chloro-1,3,2-benzodioxaphosphole; 2 - chloro-4,4,5,5-tetramethyl-1,3,2-dioxaphospholane; 2 - chloro - 4-chloromethyl-1,3,2-dioxaphospholane; 2-5-dichloro-1,3,2-dioxaphosphorinane, 2,6,7-trichloro-1,3,2-benzodioxaphosphole; 2,5-dibromo-1,3,2-dioxaphosphorinane; 2 - chloro-5-fluoro-1,3,2-dioxaphosphorinane, etc.

Any of the above-described halogen-containing trivalent phosphorus compounds can be reacted with a carbonylic compound and an ester of a phosphorus acid to give compounds containing a plurality of phosphorus ester groups. Useful carbonylic compounds are generally aldehydes of from 1 to 18 carbon atoms and ketones of from 3 to 4 carbon atoms; however, the aldehydes appear to participate in the reaction much more readily than the ketones. The commonly useful aldehydes for the present purpose have the formula

in which Y is selected from the class consisting of hydrogen, hydrocarbyl radicals of from 1 to 17 carbon atoms when $n$ is 2 and hydrocarbyl radicals of from 1 to 10 carbon atoms when $n$ is less than 2, the furyl radical and the thienyl radical and such radicals carrying as a substituent, when $n$ is 0 to 2, a radical which is selected from the class consisting of —CN, —NO$_2$, halogen, —CHO, methylenedioxy, —COO-alkyl, O-alkyl, —S-alkyl, —SS--alkyl, (alkyl)$_2$N- and alkyl—CONH- where the alkyl radical has from 1 to 5 carbon atoms, and also only when $n$ is 2, the —OH and COOH radical.

Owing to their easy availability, a particularly useful class of aldehydes includes the fatty aldehydes of from 1 to 14 carbon atoms, e.g., formaldehyde, acetaldehyde, propionaldehyde, butyraldehyde, isobutyraldehyde, valeraldehyde, isovaleraldehyde, hexanal, heptanal, 2-ethylhexanal, octanal, 2-butyloctanal, 6-methylheptanal, decanal, undecanal, 2-methylundecanal, lauraldehyde, myristaldehyde, palmitaldehyde, stearaldehyde, etc.

Also presently useful are the aliphatic unsaturated aldehydes, e.g., acrolein, methacrylaldehyde, crotonaldehyde, 2 - methylenebutyraldehyde, 2 - ethyl-2-hexenal, 2-6-dimethyl-5-heptenal, sorbaldehyde, citronellal, 2-ethyl-2-hexenal, 2-octynal, tetrolaldehyde, propiolaldehyde, 2-butyl-2-octenal, 2-allyl-4-pentenal, etc.

The presence of cyano, nitro, halogen, formyl, methylenedioxy, carboalkoxy, alkoxy, alkylthio-, alkyldithio, dialkylamino, and acylamido substituents in the saturated or unsaturated aliphatic aldehyde has no effect on the course of the reaction; hence, there may be employed such substituted aliphatic aldehydes as 3-cyanopropionaldehyde, chloroacetaldehyde, 2-bromoacrolein, 3-butoxybutyraldehyde, 4-nitrobutyraldehyde, 4-cyano-2,2-dimethylbutyraldehyde, 2,3-dichloropropionaldehyde, 4-cyanocrotonaldehyde, 3 - isopropoxypropionaldehyde, 3 - (ethylthio) - 3-methylbutyraldehyde, chloropropiolaldehyde, 3-fluoropropionaldehyde, 6-fluoro-2-hexenal, dichlorolauraldehyde, ethyl 11-formylundecanoate, 4-methoxy-2,4-dimethyl-2-pentenal, succinaldehydic acid methyl ester, ethyl 4-formylbutyrate, 4-methyl-2-nitrovaleraldehyde, iodoacetaldehyde, dichloroacetaldehyde, dimethylaminoacetaldehyde, N-(formylpentyl)acetamide, chloral, etc. When the phosphorus-halogen compound which is used as reactant has only one halogen atom attached to the phosphorus atom, there may be employed the hydroxy- and/or carboxy-substituted aldehydes, e.g., aldol, glyceraldehyde or adipaldehydic acid.

Presently useful alicyclic carboxaldehydes include, e.g., cyclohexanecarboxaldehyde, cyclohexenecrotonaldehyde, 6-methyl-3-cyclohexenecarboxaldehyde, 4-nitrocyclohexanecarboxaldehyde, 2-cyclohexene - 1 - carboxaldehyde, cyclohexadienecrotonaldehyde, cyclopentanecarboxaldehyde, 1-cyclohexene-1-carboxaldehyde, 3-isopropyl-1 - methylcyclohexanecarboxaldehyde, cyclohexeneacrolein, 5 - ethoxy-2-cyclopentene-1-carboxaldehyde, 4-isohexyl - 2-methylcyclohexanecarboxaldehyde, 1-bromo-2,2,6-trimethylcyclohexanecarboxaldehyde, perillaldehyde, phellandral, safranal, 1-cyclopentene-1-carboxaldehyde, 2 - bromo-bicyclo[2.2.1]-hept-5-ene-2-carboxaldehyde, 2,2,6-trimethylcyclohexanecarboxaldehyde, 2,2,6-trimethyl-2-cyclohexenecarboxaldehyde, etc.; and also, in the case of the mono-replacement reaction, 2-hydroxycyclohexanecarboxaldehyde or 4-formylcyclohexanecarboxylic acid, etc.

The presently useful benzenoid aldehydes may be purely, aromatic, aromatic-cycloaliphatic, or aliphatic-aromatic aldehydes, and they may or may not be further substituted, e.g., benzaldehyde, o-, m- or p-tolualdehyde, 3,3 - dimethyl - 2 - phenylbutyraldehyde, phenylacetaldehyde, 1- or 2-naphthaldehyde, biphenyl-4-carboxaldehyde, hydrocinnamaldehyde, cinnamaldehyde, atropaldehyde, 2,3-dichlorobenzaldehyde, 4'-formylacetanalide, 4-cyclohexylbenzaldehyde, phenylpropiolaldehyde, piperonal, 2-, 3- or 4-butoxybenzaldehyde, p-(dimethylamino)benzaldehyde, salicylaldehyde, 3-allylsalicylaldehyde, p-(ethoxy)benzaldehyde, 2-ethoxy-4-nitrobenzaldehyde, 3 - vinylbenzaldehyde, 3,4 - dipropoxybenzaldehyde, 4-(n-butylthio)benzaldehyde, o-, m- or p-iodobenzaldehyde, 3,4- or 3,5-dibromobenzaldehyde, 5-tert-butyl - m - tolualdehyde, 5 - tert-butyl-3-nitro-o-tolualdehyde, 4-(trifluoromethyl)benzaldehyde, 2-p-cymenecarboxaldehyde, 6-methoxy-2-naphthaldehyde, 2-nitro-1-naphthaldehyde, 4-cyclohexylbenzaldehyde, 4'-nitro-4-biphenylcarboxaldehyde, 6 - methoxy-3-biphenylcarboxaldehyde, etc. Also, when the reaction involves replacement of only one halogen atom, i.e., the phosphorus-halogen compound has only one chlorine or bromine atom attached to the phosphorus atom thereof, the aldehyde may carry a hydroxy and/or a carboxy group as substituent, e.g., there may be used 2-, 3- or 4-hydroxybenzaldehyde, phthalaldehydic acid, opianic acid, 3-hydroxyterephthaldehydic acid, etc.

The presently useful aldehyde may also be a heterocyclic aldehyde such as 2- or 3-furaldehyde, 5-acetamido-2-furaldehyde, 5-bromo- or chloro-2-furaldehyde, 5-nitro-2-furaldehyde, 5-ethoxy-2-furaldehyde, 5-methyl-2-furaldehyde, 5-vinyl-2-furaldehyde, 2- or 3-thiophenecarboxaldehyde, 5-tert-butyl-2-thiophenecarboxaldehyde, 5-decyl-2-thiophenecarboxaldehyde, 3,5-dimethyl-2-thiophenecarboxaldehyde, 4 - nitro - 2-thiophenecarboxaldehyde, 5 - (methylthio)-2-thiophenecarboxaldehyde, 2,5-dichloro - 3 - thiophenecarboxaldehyde, 2,5-diethyl-3-thiophenecarboxaldehyde, etc.

Ketones, generally, are not as reactive as the aldehydes with the trivalent phosphorus esters and trivalent phosphorus halides. While a wide variety of aldehydes undergo the present reaction, only the lower dialkyl ketones, e.g., acetone and ethyl methyl ketone, and cyclohexanone undergo the reaction.

Triorgano esters of trivalent phosphorus acids, generally, are useful with the phosphorus-halogen compound and the carbonylic compound in the present process. Thus, the triorgano phosphorus ester component may be a phosphite, a phosphonite or a phosphinite. Because the phosphites are most readily available, of particular importance for use in the present process are the triorgano esters of phosphorous acid. The more useful of these have the formula (R'O)$_2$—P—OT where R' denotes a radical selected from the class consisting of hydrocarbyl and hydrocarbyloxyhydrocarbyl radicals of from 1 to 12 carbon atoms and such radicals having halogen substitution, and T is selected from the class consisting of alkyl, alkenyl, aralkyl, and hydrocarbyloxyalkyl radicals of from 1 to 12 carbon atoms and such radicals having halogen substitution. They may be simple or mixed phosphites. Examples of useful phosphites are trimethyl, triethyl, triallyl, triisopropyl, tripropinyl, tri-n-propyl, tribenzyl, tri-n-butyl, tri-2-butenyl, tri-tert-amyl, tri-n-hexyl, trioctenyl, tri-n-heptyl, tris(2-ethylhexyl), tri-n-octyl, trinonyl, tridecyl, triundecyl, tritert-dodecyl, amyl diethyl, butyl di-p-tolyl, ethyl dicyclohexyl, ethyl octyl phenyl, amyl dibenzyl, tris(2-chloroethyl), tris(3-chloropropyl), tris(2-chloropropyl), tris-(2-chloro-2-butenyl), tris(3,4-dichlorobutyl), tris(2-bromoethyl), tris(3-iodopropyl), tris(2-fluoroethyl), tris-(dichlorododecyl), tris(2-ethoxyethyl), tris(2-phenoxypropyl), tris(4-chlorophenoxy)propyl, 2-chloroethyl diethyl, bis(allyloxybutyl) ethyl, diamyl trichlorooctyl, 2-chloroethyl 3-chloropropyl 4-chlorobutyl, 2-chloroethyl methyl propyl, tris(2,3-dichloropropyl), tris(3-methoxy-2-chloropropyl), and benzyl-bis(3-phenoxy-2-bromopropyl) phosphite.

When the aldehyde employed with the phosphorus trichloride or phosphorus tribromide and the triorgano phosphite is formaldehyde, products prepared according to the present process may be either tris[(dihydrocarbyloxyphosphinyl)methyl]phosphites, tris{[bis(halohydrocarbyloxy)phosphinyl]methyl}phosphite, tris{[bis(hydrocarbyloxyhydrocarbyloxy) - phosphinyl]methyl} - phosphites or tris{[bis(hydrocarbyloxyhalohydrocarbyloxy)phosphinyl]methyl}phosphites, depending upon whether there is employed a trihydrocarbyl phosphite or one having hydrocarbyloxy and/or halogen substitution. Thus, reaction of phosphorus trichloride, formaldehyde and trimethyl phosphite gives tris[(dimethoxyphosphinyl)methyl]phosphite; and reaction of phosphorus tribromide, formaldehyde and tris(2-chloroethyl) phosphite gives tris{[bis(haloalkoxy)phosphinyl]methyl}-phosphite. Tris[(diallyloxyphosphinyl)methyl]phosphite or tris{[bis(3 - phenoxypropoxy)phosphinyl] - methyl}phosphite are similarly obtained from triallyl or tris(3-phenoxypropyl)phosphite.

Alkanecarboxaldehydes with phosphorus trichloride and a trialkyl, trialkenyl, tris(araylkyl) or tris(hydrocarbyloxyalkly) phosphite yield compounds of the formula

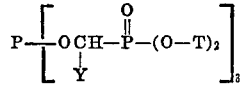

where T is an alkyl, alkenyl, aralkyl or hydrocarbyloxyalkyl radical of from 1 to 12 carbon atoms and Y is an alkyl radical of from 1 to 10 carbon atoms. Thus, reaction of phosphorus trichloride with acetaldehyde and tri - n - butyl phosphite gives tris[1 - (di - n-butoxyphosphinyl)ethyl]phosphite, i.e., a compound of the above formula in which Y is methyl and T is n-butyl. Other compounds of the above formula which are prepared according to the present process are, e.g., tris[1-(dimethoxyphosphinyl)ethyl] phosphite
tris[1-(di-2-butenyloxyphosphinyl)octyl] phosphite
tris[1-(dimethoxyphosphinyl)undecyl] phosphite
tris[1-(dibenzyloxyphosphinyl)octyl] phosphite
tris[1-(di - n - octyloxyphosphinyl)2-methylpropyl] phosphite
tris[1-(2-phenylethoxy)phosphinyl]pentyl phosphite
tris[1-diethoxyphosphinyl)butyl] phosphite
tris[1-(3-methoxypropoxy)phosphinyl]ethyl phosphite
tris[1-(di-n-butoxyphosphinyl)hexyl] phosphite
tris[1-(4-phenoxybutoxy)phosphinyl]propyl phosphite
tris[1-(dimethoxyphosphinyl)-2-ethylhexyl] phosphite
tris[1-(di-n-hexyloxyphosphinyl)ethyl] phosphite
tris[1-(didodecyloxyphosphinyl)propyl] phosphite
tris[1-(di-n-propoxyphosphinyl)heptyl]phosphite
tris{1 - [bis(2 - ethylhexyloxy)phosphinyl] - 2 - methylpropyl}phosphite Halogen-substituted alkyl, aralkyl or hydrocarbyloxyalkyl phosphites react similarly with phosphorus trichloride and an alkanecarboxaldehyde. Thus, reaction of tris(2-chloroethyl) phosphite with propionaldehyde and phosphorus trichloride gives tris{1-[bis(2-chloroethoxy)phosphinyl]propyl}phosphite; tris(3-methoxy-2-chloropropyl) phosphite, phosphorus trichloride and acetaldehyde yield tris{1-[bis(3-methoxy-2-chloropropoxy)phosphinyl]ethyl} phosphite; tris(tetrachlorohexyl) phosphite, phosphorus trichloride and butyraldehyde give tris{1-[bis(tetrachlorohexyloxy)phosphinyl]butyl} phosphite; tris(2-fluoroethyl) phosphite, 2-ethylhexanal and phosphorus trichloride give tris{1-[bis(2-fluoroethoxy)phosphinyl]-2-ethylhexyl} phosphite; tris(2,4-dichlorobenzyl) phosphite, acetaldehyde and phosphorus tribromide give tris{1-[bis(2,4-dichlorobenzyloxy)phosphinyl]ethyl}phosphite; tris(2-chlorobutenyl) phosphite, valeraldehyde and phosphorus trichloride give tris{1-[bis(2-chloro-2-butenyloxy)phosphinyl]pentyl} phosphite; and tris(2-iodoethyl) phosphite, propionaldehyde and phosphorus trichloride give tris{1-[bis(2-iodoethoxy)phosphinyl]propyl} phosphite.

When the aldehyde is benzaldehyde, the products with phosphorus trichloride and the phosphite have the formula

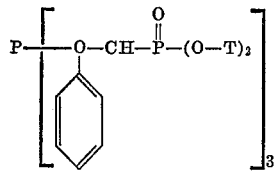

wherein T is as defined above. Depending upon the phosphite which is used, there are obtained e.g., tris{α-(dimethoxyphosphinyl)benzyl] phosphite from trimethyl phosphite, tris[α-(diethoxyphosphinyl)benzyl] phosphite from triethyl phosphite; tris[α-(allyloxyphosphinyl)benzyl] phosphite from triallyl phosphite; tris[α-(dibenzylphosphinyl)benzyl] phosphite from tribenzyl phosphite; tris{α-[bis(4-methoxybutyl)]benzyl} phosphite from tris-(4-methoxybutyl) phosphite; tris[α-(diisooctyloxyphosphinyl)benzyl] phosphite from triisooctyl phosphite; tris-{α - [2 - chloro - 3 - phenoxypropoxy)phosphinyl]benzyl} phosphite from tris(2-chloro-3-phenoxypropyl) phosphite; tris{α-[bis(2-chloroethoxy)phosphinyl]benzyl} phosphite from tris(2-chloroethyl) phosphite; and tris{α-[bis(3-bromopropoxy)phosphinyl]benzyl} phosphite from tris(3-bromopropyl) phosphite.

Examples of phosphinyl phosphites prepared according to the present process from phosphorus trichloride, a phosphite and an aldehyde other than an alkanecarboxaldehyde or benzaldehyde are tris[1-(diethoxyphosphinyl)-2-phenylethyl] phosphite which is prepared from phenylacetaldehyde, triethyl phosphite and phosphorus trichloride; tris[1-(di-n-octyloxyphosphinyl)-2-propenyl] phosphite which is obtained from acrolein, tri-n-octyl phosphite and phosphorus trichloride; tris{1-[bis(3-bromopropoxy)phosphinyl]-2-chlorobenzyl} phosphite which is prepared from 2-chlorobenzaldehyde, tris(3-bromopropyl) phosphite and phosphorus trichloride; tris{α-[bis(4-methoxybutoxy)phosphinyl] - 4-cyanobenzyl} phosphite which is prepared from 4-cyanobenzaldehyde, tris(methoxybutyl) phosphite and phosphorus trichloride; tris{α-[bis(2-chloroethoxy)phosphinyl]-2-methylbenzyl} phosphite which is obtained from o-tolualdehyde, tris(2-chloroethyl) phosphite and phosphorus trichloride; tris[α-(dibenzyloxyphosphinyl)-2,3-dinitrobenzyl] phosphite which is prepared from 2,3-dinitrobenzaldehyde, tribenzyl phosphite and phosphorus trichloride; tris[α-(didodecyloxyphosphinyl)-4-ethylbenzyl] phosphite which is prepared from 4-ethylbenzaldehyde, tridodecyl phosphite and phosphorus trichloride; and tris{α-[bis(chlorobutenyloxyphosphinyl]-4-acetamidobenzyl} phosphite which is prepared from 4-acetamidobenzaldehyde, tris(chlorobutenyl) phosphite and phosphorus trichloride.

Cycloalkanecarboxaldehydes give with phosphorus trichloride and the phosphites compounds such as tris[α-(diethoxyphosphinyl)cyclohexylmethyl] phosphite which is obtained from cyclohexanecarboxaldehyde, triethyl phosphite and phosphorus trichloride; and tris{α-[bis(3-chloropropoxy)phosphinyl]cyclopentylmethyl} phosphite which is obtained from cyclopentanecarboxaldehyde, tris-(3-chloropropyl) phosphite and phosphorus trichloride.

As herein disclosed, the lower dialkyl ketones such as acetone or ethyl methyl ketone react as do the aldehydes in preparing the phosphinyl phosphites. Products thus obtained with the phosphites and phosphorus trichloride have the formula

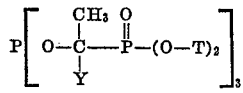

where Y is selected from the class consisting of the methyl and ethyl radical and T denotes an alkyl, alkenyl, aralkyl or hydrocarbyloxyalkyl radical of from 1 to 12 carbon atoms or such a radical having halogen substitution. Thus, acetone trimethyl phosphite and phosphorus trichloride give tris[2-(dimethoxyphosphinyl)-2-propyl] phosphite, i.e., a compound in which both Y and T are methyl; ethyl methyl ketone, tribenzyl phosphite and phosphorus trichloride yield tris[2-(dibenzyloxyphosphinyl)-2-butyl] phosphite; ethyl methyl ketone, tri-2-butenyl phosphite and phosphorus trichloride yield tris[2-(2-butenyloxyphosphinyl)-2-butyl] phosphite; acetone, ethyl dioctyl phosphite and phosphorus trichloride yield tris[2-(dioctyloxyphosphinyl)-2-propyl] phosphite; and acetone, tris(3-phenoxypropyl) phosphite and phosphorus trichloride yield tris{2-[bis(3-phenoxypropoxy)phosphinyl]-2-propyl} phosphite. Employing a halogenated phosphite, there are obtained, e.g., tris{2-[bis(2-chloroethoxy)phosphinyl]-2-propyl} phosphite from acetone, tris(2-chloroethyl) phosphite and phosphorus trichloride and tris{2-[bis(2-bromopropoxy)]butyl} phosphite from ethyl methyl ketone, tris(2-bromopropyl) phosphite and phosphorus trichloride.

Reaction of an organic phosphonous dihalide with formaldehyde and the triorgano, trivalent phosphorus ester yields bis[(dialkoxyphosphinyl)methyl] hydrocarbylphosphonites when a trialkyl phosphite is used or bis-{[bis(haloalkoxy)phosphinyl]methyl} hydrocarbylphosphonites when a tris(haloalkyl) phosphite is used. Generally, the compounds have the formula

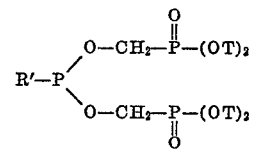

wherein R' is selected from the closs consisting of hydrocarbyl and hydrocarbyloxyhydrocarbyl radicals and such radicals having halogen substitution and T is selected from the class consisting of alkyl, alkenyl, aralkyl and hydrocarbyloxyalkyl of from 1 to 12 carbon atoms and such radicals having halogen substitution. Thus, from ethylphosphonous dichloride, and substantially 2 moles each of formaldehyde and of trimethyl phosphite there is obtained bis[(dimethoxyphosphinyl)methyl] ethylphosphonite, i.e., a compound of the above formula in which R' is ethyl and T is methyl. Similarly, from phenylphosphonous dichloride, formaldehyde and tris(2-chloroethyl) phosphite there is obtained bis{[bis(2-chloroethoxy)phosphinyl]methyl} phenylphosphonite; and from cyclohexylphosphonous dichloride, formaldehyde and triallyl, tribenzyl or tris(3-phenoxypropyl) phosphite there is obtained bis[bis(allyloxyphosphinyl)methyl] or bis[(dibenzyloxyphosphinyl)methyl] or bis{[bis(3 - phenoxypropoxy)phosphinyl]methyl} cyclohexylphosphonite.

The reaction of a phosphonous dihalide, an alkanecarboxaldehyde and a phosphite gives either bis[1-(dialkoxyphosphinyl)alkyl] hydrocarbylphosphonites or bis{1-[bis(haloalkoxy)phosphinyl]alkyl} hydrocarbylphosphonites, depending upon whether a trialkyl phosphite or a tris(haloalkyl) phosphite is used. Generally, the compounds have the formula

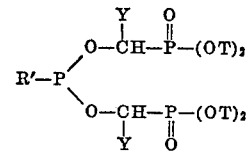

where R' and T are as defined above and Y is an alkyl radical of from 1 to 10 carbon atoms. Thus, the reaction product of pentylphosphonous dichloride, acetaldehyde and tri-n-propyl phosphite gives a compound in which R' of the above formula is pentyl, T is propyl and Y is methyl, i.e., bis[1-(dipropoxyphosphinyl)ethyl] pentylphosphonite. Other compounds prepared according to the present process from a phosphonous dichloride, an alkanecarboxaldehyde and a phosphite are as follows:

bis[1-(dibenzyloxyphosphinyl)propyl] phenylphosphonite
bis[1-(diethoxyphosphinyl)ethyl] α-naphthylphosphonite
bis[1-(di-2-butenyloxyphosphinyl)-2-ethylhexyl] ethylphosphonite
bis[1-(didodecyloxyphosphinyl)ethyl] biphenylphosphonite
bis{1-[bis(2-bromoethoxy)phosphinyl]undecyl} p-tolylphosphonite
bis{1-[bis(2-chloropropoxy)phosphinyl]butyl} benzylphosphonite
bis{1-[bis(2-ethoxyethoxy)phosphinyl]propyl} ethylphosphonite
bis{1-[bis(2-iodoethoxy)phosphinyl]ethyl} phenylphosphonite
bis[1-(diethoxyphosphinyl)ethyl] cyclohexylphosphonite
bis{1-[bis(2-phenylethoxy)phosphinyl]-2-methylpropyl} butadienylphosphonite
bis{1-[bis(2-chloroethoxy)phosphinyl]butyl} 2-pentenylphosphonite Employing a benzenoid carboxaldehyde with the hydrocarbylphosphonous dihalide and a phosphite gives, e.g., the bis[1-dialkoxyphosphinyl)aralkyl] hydrocarbylphosphonites when a trialkyl phosphite is used. Generally, the compounds have the formula

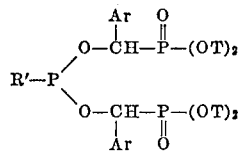

in which R' and T are as above defined and Ar denotes a hydrocarbon radical which contains an aromatic ring and has from 6 to 10 carbon atoms. Thus, phenylphosphonous dichloride, benzaldehyde and trimethyl phosphite give bis[α-(dimethoxyphosphinyl)benzyl] phenylphosphonite; n-propylphosphonous dichloride, p-tolualdehyde and tris(2-chloroethyl) phosphite gives bis{α-[bis(2-chloroethoxy)phosphinyl]-p-methylbenzyl} n-propylphosphonite; cyclohexanephosphonous dichloride, phenylacetaldehyde and triallyl phosphite gives bis[1-(diallyloxyphosphinyl)-2-phenylethyl] cyclohexylphosphonite; β-naphthylphosphonous dichloride, p-isopropylbenzaldehyde, and tris(2-chloroethyl) phosphite gives bis{α-[bis(2-chloroethoxy)]-p-isopropylbenzyl} β-naphthylphosphonite; 4-biphenylylphosphonous dichloride, benzaldehyde and tetrachlorododecyl phosphite gives bis{α-[bis(tetrachlorododecyloxy)phosphinyl]benzyl} 4-biphenylylphosphonite; benzylphosphonous dichloride, β-naphthaldehyde, and benzyl phosphite gives bis[(dibenzyloxyphosphinyl)(α-naphthyl)-methyl] benzylphosphonite; 2-butenylphenylphosphonous dichloride, benzaldehyde and tris(3-ethoxypropyl) phosphite gives bis{α-[bis(3-ethoxypropoxy)phosphinyl]benzyl} 2-butenylphenylphosphonite; phenylphosphonous dichloride, o-tolualdehyde, and tris(2-fluoroethyl) phosphite gives bis{α-[bis(2-fluoroethoxy)phosphinyl]-o-methylbenzyl}phenylphosphonite, etc.

Cycloalkanecarboxaldehydes react as do the alkanecarboxaldehydes or the aromatic carboxaldehydes with the hydrocarbylphosphonous dihalides and the triorgano phosphites. Thus, cyclohexanecarboxaldehyde, phenylphosphonous dichloride and trimethyl phosphite yield bis[(dimethoxyphosphinyl)(cyclohexyl)methyl] phenylphosphonite; and n-butylphosphonous dichloride, cyclohexanecarboxaldehyde and tris(2-chloroethyl) phosphite yields bis{[(2-chloroethoxy)phosphinyl](cyclohexyl)-methyl} n-butylphosphonite.

Unsaturation may be present in the aldehyde, e.g., the aldehyde component may be acrolein, crotonaldehyde, methacrylaldehyde, 2-pentenal, cinnamaldehyde, propiolaldehyde, 1-cyclohexene-1-carboxaldehyde, tetrolaldehyde, 3-phenylpropiolaldehyde, α-vinylnaphthaldehyde, ω-dodecenal, octadecadienal, etc. The aldehyde component may likewise be a furaldehyde or a thiophenecarboxaldehyde. Further, the aldehyde component may be substituted by one or more of the following radicals: —CN, $NO_2$, halogen, —CHO, methylenedioxy, —COO-alkyl, —S-alkyl, —SS-alkyl, —O-alkyl and alkyl-CONH— where the alkyl radical has from 1 to 5 carbon atoms. Hence, the process of this invention includes, e.g., the preparation of compounds of the following general formula from a phosphonous dihalide, an aldehyde and a triorgano phosphite

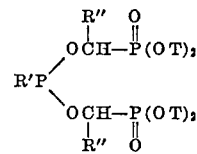

The R' of the above formula is derived from the phosphonous dichloride or dibromide, the R″ is derived from the aldehyde, and the T is derived from the phosphite. Examples of compounds of the above formula which are prepared from the unsaturated and/or substituted aldehydes are given in the table below.

| R'= | R″= | T= |
|---|---|---|
| phenyl | 2-phenylvinyl | ethyl |
| ethyl | 4-cyanobutyl | 3-chloropropyl |
| benzyl | 3-nitrophenyl | benzyl |
| dodecyl | 4-ethoxypentyl | dodecyl |
| α-naphthyl | 2-furyl | 3-phenoxypropyl |
| 2-propinyl | 4-ethylthiophenyl | methyl |
| cyclohexyl | 2-propinyl | 2-ethoxyethyl |
| butyl | vinyl | butyl |
| 3-butenyl | 2,3-dichlorophenyl | 2-chloroethyl |
| 2-phenylethyl | tetrabromobutyl | allyl |
| 4-biphenylyl | methyldithiobutyl | ethyl |
| 2-ethylhexyl | 4-acetamidophenyl | 2-butoxyethyl |
| 1-cyclopentenyl | 2-carbomethoxyethyl | 3-chloro-2-butenyl |
| 4-butylbenzyl | 4-formylphenyl | octenyl |
| methyl | methylenedioxyphenyl | 2-phenylethyl |
| propyl | 4-dimethylaminophenyl | 2-(2-propenyloxy)propyl |
| phenyl | 2-thienyl | n-hexyl |
| 4-tolyl | 3-chloro-2-butenyl | methyl |
| 2,3-xylyl | heptadienyl | pentyl |
| n-pentyl | 1-cyclohexenyl | 4-chlorobenzyl |
| n-hexyl | 2-chloro-3-nitrophenyl | 4-butylbenzyl |
| 4-isopropylphenyl | 2-hexinyl | 3-ethoxy-2-chloropropyl |
| benzyl | 3-thienyl | benzyl |
| cyclopentenyl | 3,5-dimethyl-2-thienyl | ethyl |
| isopropylphenyl | 5-methoxy-2-thienyl | allyl |
| biphenylyl | 5-chloro-2-thienyl | 2-chloroethyl |
| phenyl | 5-nitro-2-furyl | butyl |
| 2-pentenyl | 5-acetamido-2-furyl | 2-ethoxyethyl |
| ethyl | 5-bromo-2-furyl | 2-bromoethyl |

When employing as the dichloro phosphorus component a hydrocarbyl phosphorodichloridite and using as the aldehyde an alkanecarboxaldehyde, the products which are obtained with the trialkyl phosphites are bis-[(dialkoxyphosphinyl)alkyl] hydrocarbyl phosphites, i.e., they have the structure

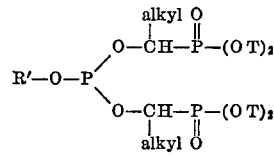

wherein R' is a hydrocarbyl radical which is free of aliphatic unsaturation and contains from 1 to 12 carbon atoms, alkyl has from 1 to 10 carbon atoms and T denotes an alkyl radical of from 1 to 12 carbon atoms. An example thereof is bis[1-(diethoxyphosphinyl)ethyl] ethyl phosphite which is prepared from ethyl phosphorodichloridite, acetaldehyde and triethyl phosphite. Variation of the ethyl phosphorochloridite to another phosphorochloridite, of acetaldehyde to another alkanecarboxaldehyde and of triethyl phosphite to another trialkyl phosphite or a trialkenyl phosphite or a tris(aralkyl)

phosphite or a tris(hydrocarbyloxyalkyl) or such a phosphite having halogen substitution gives, for example, bis[1-(diethoxyphosphinyl)propyl] phenyl phosphite; bis[1-(dibenzyloxyphosphinyl)hexyl] n-butyl phosphite; bis{[1-bis(methoxyethoxy)phosphinyl]butyl} p-tolyl phosphite; bis[1-(2-chloroethoxymethoxyphosphinyl)octyl] cyclohexyl phosphite; bis[1-(di-2-butenylphosphinyl)propyl] n-octyl phosphite; bis{1-[bis(2-ethylhexyloxy)phosphinyl]ethyl} allyl phosphite; bis[1-(diethoxyphosphinyl)-2-ethylhexyl] benzyl phosphite, etc.

When the dichloro phosphorus compound is a hydrocarbyl phosphorodihalidite, the aldehyde has an aromatic ring, and the phosphite is a trialkyl phosphite, the products are bis[1-(dialkoxyphosphinyl)aralkyl] hydrocarbyl phosphites. An example of a compound thus provided is bis[α-(diethoxyphosphinyl)benzyl] phenyl phosphite, which is prepared from phenyl phosphorodichloridite, benzaldehyde and triethyl phosphite. Other similarly prepared compounds from aldehydes containing an aromatic ring are: bis[α-(diallyloxyphosphinyl)benzyl] n-butyl phosphite; bis[1-diisopropoxyphosphinyl)-α-naphthylmethyl] dodecyl phosphite; bis{α-[(2-chloroethyloxy)phosphinyl]-p-ethylbenzyl} 2-butenyl phosphite; and bis[1-(dipropinyloxyphosphinyl)-3-phenylethyl] cyclohexyl phosphite. The reaction proceeds similarly with the unsaturated aliphatic or aromatic carboxaldehydes. Thus, acrolein or cinnamaldehyde gives with butyl phosphorochloridite and triethyl phosphite bis[1-(diethoxyphosphinyl)-2-propenyl] butyl phosphite or bis[1-(diethoxyphosphinyl)-3-phenyl-2-propenyl] butyl phosphite.

When the aldehyde is formaldehyde, the products obtained from a hydrocarbyl phosphorodihalidite and an alkyl phosphite are bis{1-[bis(haloalkoxy)phosphinyl]methyl} hydrocarbyl phosphites, e.g., bis{1-[bis(2-ethylhexyloxy)phosphinyl]methyl} phenyl phosphite which is prepared according to the invention from phenyl phosphorodichloridite, formaldehyde and tris(2-ethylhexyl) phosphite.

From furaldehyde or thiophenecarboxaldehyde there are obtained with the hydrocarbyl phosphorodihalidites and a trialkyl phosphite the bis[(dialkoxyphosphinyl)(furyl)methyl] hydrocarbyl phosphites or the bis[(dialkoxyphosphinyl)(thienyl)methyl] hydrocarbyl phosphites, e.g., bis[(diethoxyphosphinyl)(2-furyl)methyl] phenyl phosphite is prepared from phenyl phosphorodichloridite, furfural and triethyl phosphite and bis[(dibutoxyphosphinyl)(2-thienyl)methyl] benzyl phosphite is prepared from benzyl phosphorodichloridite, 2-thiophenecarboxaldehyde and tributyl phosphite.

As disclosed above, acetone or ethyl methyl ketone react as do the aldehydes in the presently provided process. With the hydrocarbyl phosphorodihalidites and the triorgano phosphites it proceeds according to the scheme:

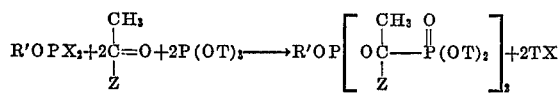

wherein R′ is selected from the class consisting of hydrocarbyl and hydrocarbyloxyhydrocarbyl radicals of from 1 to 12 carbon atoms and halogen-substitution products of such radicals, X is selected from the class consisting of chlorine and bromine, Z is selected from the class consisting of methyl and ethyl, and T is selected from the class consisting of alkyl, aralkyl, alkenyl and hydrocarbyloxyalkyl radicals of from 1 to 12 carbon atoms and halogen-substitution products thereof. Thus from phenyl phosphorodichloridite or phosphorodibromidite, ethyl methyl ketone and trimethyl phosphite there is obtained bis[2-(dimethoxyphosphinyl)butyl] phenyl phosphite, i.e., a compound of the above formula where R′ is phenyl, Z is ethyl and T is methyl. Similarly, from allyl phosphorodichloridite, acetone and tris(2,3-dichloropropyl) phosphite there is obtained bis{2-[bis(2,3-dichloropropoxy)phosphinyl]propyl} allyl phosphite; from benzyl phosphorodichloridite acetone and tri-2-butenyl phosphite there is obtained bis[2-(di-2-butenyloxyphosphinyl)propyl] benzyl phosphite; and from 3-(4-chlorophenoxy)propyl phosphorodichloridite, ethyl methyl ketone and tris[3-(4-chlorophenoxy)propyl] phosphite there is obtained bis{2-{bis[3 - (4 - chlorophenoxy)]propoxy}phosphinyl} 3-(4-chlorophenoxy)propyl phosphite.

The dihalo phosphorus compounds may have one or more halogen and/or hydrocarbyloxy substituents in the organic portion of the compound, the aldehyde may be substituted, and the phosphite may be either an alkyl, aralkyl, alkenyl or hydrocarbyloxyalkyl-phosphite and it may be halogen substituted. Thus, according to the invention, there are prepared bis[1-(dimethoxyphosphinyl)ethyl] o-, m- or p-chlorophenyl phosphite from o-, m- or p-chlorophenyl phosphorodichloridite, acetaldehyde and trimethyl phosphite; bis{α-[bis(2-chloroethoxy)phosphinyl]4-cyanobenzyl} dibromophenyl phosphite from dibromophenyl phosphorodichloridite, 4-cyanobenzaldehyde and tris(2-chloroethyl) phosphite; bis[1-(di-2-butenyloxyphosphinyl)-2-ethoxyhexyl] 4-(trifluoromethyl)phenyl phosphite from 4-(trifluoromethyl)phenyl phosphorodichloridite, 2-ethoxyhexanal and tri-2-butenyl phosphite; bis[α-(didodecyloxyphosphinyl)-4-nitrobenzyl] 2-chloroethyl phosphite from 2-chloroethyl phosphorodichloridite, 4-nitrobenzaldehyde and tridodecyl phosphite; bis[1-(dibenzyloxyphosphinyl)ethyl] octachlorobiphenylyl phosphite from octachlorobiphenylyl phosphorodichloridite acetaldehyde and tribenzyl phosphite; bis[(diethoxyphosphinyl)(3-chloro-5-nitro-2-furyl)methyl] 3,3-dibromopropyl phosphite from 3,3-dibromopropyl phosphorodichloridite, 3-chloro-5-nitro-2-furaldehyde and triethyl phosphite; bis{[bis(2-chloropropoxy)phosphinyl]-(5-methoxy-2-thienyl)methyl}2,5-dibromophenyl phosphite from 2,5-dibromophenyl phosphorodichloridite, 5-methoxy-2-thiophenecarboxaldehyde and tris-(2-chloropropyl)phosphite; {[bis(2-phenoxyethoxy)phosphinyl]-ethyl}α-chloro-β-napthyl phosphite from α-chloro-β-naphthyl phosphorodichloridite, acetaldehyde and tris(3-phenoxypropyl) phosphite; bis[1-(diamyloxyphosphinyl)-2-ethylhexyl] 4-iodobutyl phosphite from 4-iodobutyl phosphorodichloridite, 2-ethylhexanal and triamyl phosphite.

When the dichloro phosphorus reactant is a phosphorodihalidothioite, the compounds prepared according to the present process are esters of phosphorothious acid in which the —SH group is esterified with the organic residue of the phosphorodichloridothioite used in the reaction and each of the —OH groups by a (dialkoxyphosphinyl)hydrocarbyl or a [bis(hydrocarbyloxyalkyl)-phosphinyl]hydrocarbyl or the corresponding aralkyl or alkenyl radicals or such radicals carrying halogen substitution, i.e., they have the structural formula

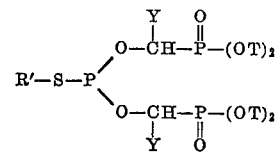

in which R′ and T are as defined above. The reaction of phenyl phosphorodichloridothioite, formaldehyde and trimethyl phosphite gives bis[(dimethoxyphosphinyl)methyl] S-phenyl phosphorothioite i.e., a compound of the above formula in which R′ is phenyl, R″ is hydrogen and T is methyl; and reaction of ethyl phosphorodichloridothioite, benzaldehyde and tris(2-chloroethyl) phosphite gives bis{α-[bis(2-chloroethoxy)phosphinyl]benzyl} S-ethyl phosphorothioite, i.e., a compound of the above formula in which R′ is ethyl, Y is phenyl and T is 2-chloroethyl. Examples of other compounds of the above formula which are prepared by the present process using either the hydrocarboncarboxaldehydes or such aldehydes carrying one or more substituents are shown in the table below:

| R' | Y | T |
|---|---|---|
| α-naphthyl | methyl | ethyl |
| 4-biphenylyl | 2-butenyl | 3-methoxypropyl |
| methyl | n-butyl | methyl |
| p-tolyl | 4-ethylthiobutyl | n-butyl |
| 4-bromophenyl | 2-thienyl | benzyl |
| benzyl | phenyl | 2-chloroethyl |
| 2-phenylethyl | vinyl | amyl |
| 3-chloropropyl | p-tolyl | dodecyl |
| 4-amylbenzyl | 2-phenylvinyl | ethyl |
| dibromobutyl | undecyl | benzyl |
| propinyl | benzyl | n-propyl |
| phenyl | 4-cyanobutyl | n-octyl |
| pentachlorophenyl | methyl | tetrachlorobutyl |
| 1-cyclopentenyl | 2-furyl | isopropyl |
| dodecyl | phenyl | ethyl |
| cyclohexyl | cyclohexyl | 2-chloro-3-butenyl |
| octachlorobiphenylyl | ethyl | 2-chloropropyl |
| 4-(trichloromethyl) phenyl | propyl | methyl |
| 2,3,4-trimethyl- phenyl | 2-carbomethoxy- phenyl | n-hexyl |
| 4-chloro-3-methyl- phenyl | phenyl | isodecyl |
| 2-pentenyl | 4-chlorophenyl | 2,4-dichlorobenzyl |
| 2-ethylhexyl | α-naphthyl | methyl |

Using either acetone or ethyl methyl ketone, instead of an aldehyde, with a phosphorodichloridothioite and a triorgano phosphite yields a compound of the formula

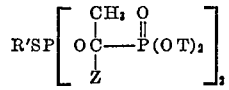

wherein R' and T are as above defined and Z is selected from the class consisting of methyl and ethyl. Thus, phenyl phosphorodichloridothioite, acetone and triethyl phosphite yields bis[2-(diethoxyphosphinyl)propyl] S-phenyl phosphorothioite, i.e., a compound in which R' of the above formula is phenyl, Z is methyl and T is ethyl. Similarly, reaction of S-chlorophenylphosphorodibromidothioite with ethyl methyl ketone and triallyl phosphite gives bis[2-(diallyloxyphosphinyl)butyl] S-chlorophenyl phosphorothioite.

When the trivalent phosphorus-halogen component is a phosphorohalidite, the products prepared according to the present process have the formula

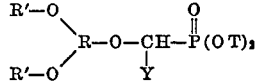

wherein R', Y and T are as above defined. Using a dihydrocarbyl phosphorochloridite, a hydrocarboncarboxaldehyde, and a trialkyl phosphite, the compounds are dihydrocarbyl phosphite of alkyl (1-hydroxyhydrocarbyl) phosphonates.

When the trivalent phosphorus halide is a phosphorohalidodithioite, the products have the formula

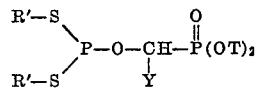

wherein R', Y and T are as defined above, e.g., the compounds are S,S-dihydrocarbyl phosphorodithioites of dialkyl (1-hydroxyhydrocarbyl) phosphonates when there are used a dihydrocarbyl phosphorochloridodithioite, a hydrocarboncarboxaldehyde and a trialkyl phosphite.

Similarly, when the phosphorus halide is a phosphorohalidothioite, the products have the formula

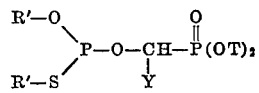

wherein R', Y and T are as herein defined, e.g., they are O-hydrocarbyl S-hydrocarbyl phosphorothioites of dialkyl (1-hydroxyhydrocarbyl)phosphonates when there are used an O-hydrocarbyl S-hydrocarbyl phosphorochloridothioite, a hydrocarbon carboxaldehyde and a trialkyl phosphite.

When the trivalent phosphorus halide is a phosphinous halide the products have the formula

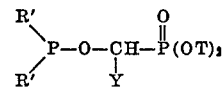

wherein R', Y and T are as defined above. Thus, using a dihydrocarbylphosphinous chloride or bromide, a hydrocarboncarboxaldehyde and a trialkyl phosphite, the products are dihydrocarbylphosphinites of dialkyl (1-hydroxyhydrocarbyl) phosphonates.

When the trivalent phosphorus halide is a hydrocarbyl hydrocarbylphosphonohalidite thereof, the presently prepared compounds have the formula

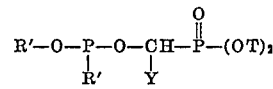

in which R', Y and T are as defined above, e.g., they are hydrocarbyl hydrocarbylphosphonites of dialkyl (1-hydroxyhydrocarbyl)phosphonates when there are employed as reactants a hydrocarbyl hydrocarbylphosphonochloridite, a hydrocarboncarboxaldehyde and a trialkyl phosphite.

When the trivalent phosphorus halide is a phosphonohalidothioite, the presently prepared compounds have the formula

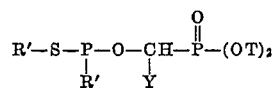

in which R', Y and T are as herein defined, e.g., they are S-hydrocarbyl hydrocarbylphosphonothioites of the (1-hydroxyhydrocarbyl)phosphonates when prepared from a hydrocarbyl hydrocarbyl phosphonochloridothioite, a hydrocarboncarboxaldehyde and a trialkyl phosphite.

An example of a compound of the formula

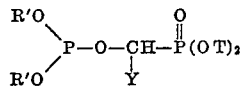

which is provided according to the present process is the dibutyl phosphite of diethyl (hydroxymethyl)phosphonate, i.e., it is a compound in which R' of the above formula is the butyl radical, Y is hydrogen, and T is the ethyl radical. It is prepared from dibutyl phosphorochloridite, formaldehyde and triethyl phosphite. Bis(4-chlorophenyl) phosphite of bis(2-chloroethyl) (α-hydroxybenzyl)phosphonate, i.e., a compound of the above formula in which R' is a 4-chlorophenyl radical, Y is the phenyl radical, and T is the 2-chloroethyl radical, is prepared from bis(4-chlorophenyl) phosphorochloridite, benzaldehyde and tris(2-chloroethyl) phosphite. Other compounds of this formula prepared according to invention are, for example:

Diethyl phosphite of diethyl (1-hydroxyethyl)phosphonate
Diphenyl phosphite of bis(3-phenoxypropyl) (1-hydroxy-2-ethylhexyl)phosphonate
Diethyl phosphite of diethyl (α-4-dihydroxybenzyl)phosphonate
Bis(4-chlorophenyl) phosphite of bis(2-chloroethyl) (1-hydroxy-2-propenyl)phosphonate
Di-α-napthyl phosphite of dibenzyl (1-hydroxypropyl)-phosphonate
Dibiphenylyl phosphite of dimethyl (1-hydroxy-4-cyanobutyl)phosphonate
Bis(2-chloro-4-ethoxyphenyl) phosphite of bis(2-phenylethyl) (α-hydroxy - 3,4 - methylenedioxybenzyl)phosphonate
Di-2-propinyl phosphite of diethyl (α-hydroxy-4-chloro-3-nitrobenzyl)phosphonate
Dicyclohexyl phosphite of dibutyl [cyclohexyl(hydroxymethyl)]phosphonate Bis(2-chloroethyl) phosphite of bis(2-chloroethyl) (1-hydroxyethyl)phosphonate Diallyl phosphite of bis(2-ethylphenyl) [hydroxy(2-thienyl)-methyl]phosphonate Bis(pentachlorophenyl) phosphite of branched-chain dinonyl (1-hydroxy-2-chloropropyl)phosphonate Diallyl phosphite of diallyl (1-hydroxydodecyl)phosphonate Bis(4-iodobenzyl)phosphite of di-2-butenyl (1-hydroxy-6-formylhexyl)phosphonate Dibenzyl phosphite of bis(2-chloropropyl) [hydroxy(α-naphthyl)methyl]phosphonate Dimethyl phosphite of dimethyl (α-hydroxy-4-carboxybenzyl)phosphonate Bis(2-bromo-4-ethylphenyl) phosphite of (1-hydroxy-2-carbomethoxyethyl)phosphonate Bis(3-ethoxypropyl) phosphite of bis(3-ethoxypropyl)-(cyclohexylhydroxymethyl)phosphonate Bis(octachlorobiphenylyl) phosphite of bis(3-chloro-2-butenyl) (1 - hydroxy - 4 - dimethylaminobenzyl)phosphonate Bis[4-(trichloromethyl)phenyl] phosphite of diisopropenyl (1-hydroxyethyl)phosphonate Diphenyl phosphite of dimethyl [hydroxy(2-furyl)methyl]phosphite 4-chlorophenyl ethyl phosphite of bis(trichloroethyl) (α-hydroxy-4-acetamidobenzyl)phosphonate An example of a compound of the formula

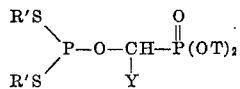

prepared according to the present process is the S,S-diphenyl phosphorodithioite of diethyl (hydroxymethyl)-phosphonate, i.e., it is a compound in which R' is the phenyl radical, Y is hydrogen, and both T's are ethyl radicals. It is prepared according to the invention from diphenyl phosphorochloridodithioite, formaldehyde and triethyl phosphite. Another compound of the above formula which is prepared according to the invention is the S,S-diethyl phosphorodithioite of bis(2-chloropropyl) (1-hydroxyethyl)phosphonate, i.e., it is a compound in which R' of the above formula is the ethyl radical, Y is the methyl radical and both T's are 2-chloropropyl radicals. It is prepared from diethyl phosphorochloridodithioite, acetaldehyde and tris(2-chloropropyl) phosphite. Other compounds of the above formula provided by the invention are conveniently set forth in the table below:

| R' | Y | T |
|---|---|---|
| phenyl | ethyl | methyl |
| dodecyl | n-butyl | n-butyl |
| 2-chloro-3-butenyl | 3-chloropropyl | 2-chloro-3-butenyl |
| pentachlorophenyl | phenyl | 2-chloroethyl |
| 3-phenoxypropyl | methyl | 3-phenoxypropyl |
| benzyl | 2-ethylpentyl | dodecyl |
| 2-ethylhexyl | methyl | benzyl |
| isopropyl | 2-phenylvinyl | isopropyl |
| p-tolyl | nonyl | 2-fluoroethyl |
| bis(2-phenylethyl) | 2-furyl | allyl |
| β-naphthyl | 2-methylpropyl | n-octyl |
| phenyl | 2-thienyl | isopropyl |
| 2-chloroethyl | ethyl | ethyl |
| cyclohexyl | cyclohexyl | benzyl |
| 4-iodobutyl | α-naphthyl | 2-iodoethyl |
| 2-butoxyethyl | 4-ethoxybutyl | 2-butoxyethyl |
| 2,4-dichlorobenzyl | methyl | decyl |
| 4-(trifluoromethyl)-phenyl | ethyl | n-propyl |
| 4-isopropylphenyl | 4-cyanophenyl | 2,3-dichloropropyl |
| octachlorobiphenylyl | phenyl | methyl |

Compounds of the formula

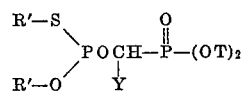

prepared according to the present process are, e.g., the O-phenyl S-phenyl phosphorothioite of di-n-butyl (hydroxymethyl)phosphonate ($R'$=phenyl, $T$=butyl and $Y$=H) which is prepared from diphenyl phosphorochloridothioite, formaldehyde and tri-n-butyl phosphite; the O-ethyl S-ethyl phosphorothioite of bis(2-chloroethyl) (1-hydroxypropyl)phosphonate which is prepared from diethyl phosphorochloridothioite, propionaldehyde and tris(2-chloroethyl)phosphite; and the O-butyl S-2,4-dichlorophenyl phosphorothioite of bis(3-bromopropyl) (α-hydroxybenzyl)phosphonate which is prepared from O-butyl S-2,4-dichlorophenyl phosphorochloridothioite, benzaldehyde and tris(3-bromopropyl) phosphite.

Compounds of the formula

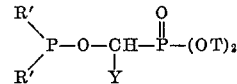

prepared according to the present process are, e.g., the diphenylphosphinite of diethyl (hydroxymethyl)phosphonate which is obtained from diphenylphosphinous chloride, formaldehyde and triethyl phosphite; the diethylphosphinite of bis(2-butenyl) (1-hydroxypropyl)phosphonate which is obtained from diethylphosphinous bromide, propionaldehyde and tris(2-butenyl) phosphite; the (4-chlorophenyl)-α-naphthylphosphinite of bis(2-chloroethyl) (α-hydroxybenzyl)phosphonate which is obtained from (4-chlorophenyl-α-naphthyl)phosphinous chloride, benzaldehyde and tris(2-chloroethyl) phosphite; the dibenzylphosphinite of didodecyl (α-naphthylhydroxymethyl)phosphonate which is obtained from dibenzylphosphinous chloride, α-naphthaldehyde and tridodecyl phosphite; and the bis[3-(4-chlorophenoxy)propyl] phosphite of dibenzyl (1-hydroxy-2-propenyl)phosphonate which is obtained from bis[3-(4-chlorophenoxy)propyl] phosphinous chloride, acrolein, and tribenzyl phosphite.

Examples of compounds of the formula

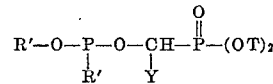

provided by the invention are the phenyl p-chlorophenylphosphonite of dimethyl (hydroxymethyl)phosphonate which is obtained from phenyl p-chlorophenylphosphonochloridite, formaldehyde and trimethyl phosphite; the ethyl β-naphthylphosphonite of bis(2-fluoroethyl)(α-hydroxy-2-phenyl)phosphonate which is prepared from ethyl β-naphthylphosphonobromidite, phenylacetaldehyde and tris-(2-fluoroethyl) phosphite; the allyl butylphosphonite of bis(2-ethoxyethyl)(1-hydroxypropyl)phosphonate which is prepared from trichloropropyl butylphosphonochloridite, propionaldehyde and tris(2-ethoxyethyl) phosphite; and the cyclohexyl-2-chloroethylphosphonite of dibenzyl (1-hydroxy-2-propenyl)phosphonate which is prepared from cyclohexyl 2-chloroethylphosphonochloridite, acrolein and tribenzyl phosphite.

Compounds of the formula

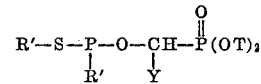

prepared according to the present process are, e.g., the S-p-bromophenyl phenylphosphonothioite of diisopropyl (1-hydroxy-2-butenyl)phosphonate which is prepared from p-bromophenyl phenylphosphonochloridothioite, crotonaldehyde and triisopropyl phosphite; the S-ethyl biphenylylphosphonothioite of bis(2-chloroethyl) (α-hydroxybenzyl)phosphonate which is prepared from ethyl biphenylylphosphonochloridothioite, benzaldehyde and tris(2-chloroethyl) phosphite; and the S-allyl dodecylphosphonothioite of diallyl (1-hydroxybutyl)phosphonate which is prepared from allyl dodecylphosphonochloridothioite, butyraldehyde and triallyl phosphite.

As herein disclosed, instead of using aldehydes as the carbonyl component of the present reaction, there may be used either acetone or ethyl methyl ketone. Compounds obtained with acetone or methyl ketone, a trivalent phosphorus compound having one chlorine or bromine atom attached to the phosphorus atom, and a triorgano phosphite have the general formula

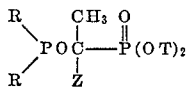

where R is selected from the class consisting of hydrocarbyl, hydrocarbyloxy, hydrocarbylthio, and (hydrocarbyloxy)hydrocarbyloxy radicals of from 1 to 12 carbon atoms and such radicals carrying halogen substitution, Z is selected from the class consisting of ethyl and methyl and T is selected from the class consisting of alkyl, aralkyl, alkenyl and hydrocarbyloxyalkyl radicals of from 1 to 12 carbon atoms and such radicals carrying halogen substitution.

When the phosphorus halogen compound is a phosphorochloridite, the compounds prepared therefrom with acetone or ethyl methyl ketone and the triorgano phosphite have the formula

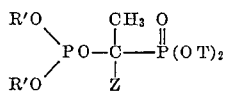

where R is selected from the class consisting of hydrocarbyl and hydrocarbyloxyhydrocarbyl radicals of from 1 to 12 carbon atoms and halogen substitution products thereof and Z and T are as defined above. When the phosphite is a trialkyl phosphite, they are the dihydrocarbyl or bis(hydrocarbyloxyhydrocarbyl) phosphites of dialkyl (2-hydroxypropyl)phosphonate or (2-hydroxybutane)phosphonate. For example, the reaction of diethyl phosphorochloridite, acetone and tribenzyl phosphite gives the diethyl phosphite of dibenzyl (2-hydroxypropyl)phosphonate, i.e., R' in the above formula is ethyl, Z is methyl and T is benzyl; and reaction of bis(4-chlorophenyl) phosphorochloridite with ethyl methyl ketone and trimethyl phosphite gives the bis(4-chlorophenyl) phosphite of dimethyl (2-hydroxybutyl)phosphonate.

Reaction of acetone or ethyl methyl ketone with the phosphorohalidodithioites and the triorgano phosphite gives compounds of the formula

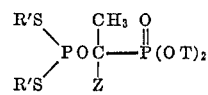

where R', Z and T are as above defined. For example, dibenzyl phosphorobromidodithioite or phosphorochloridodithioite, acetone and tributyl phosphite gives the dibenzyl phosphorodithioite of dibutyl (2-hydroxypropyl) phosphonate; reaction of bis(4-chlorophenyl) phosphorobromidodithioite, ethyl methyl ketone and tris(2-chloroethyl) phosphite gives the bis(4-chlorophenyl) phosphorodithioite of bis(2-chloroethyl) (2-hydroxybutyl)phosphonate; and reaction of bis(3-ethoxypropyl) phosphorochloridodithioite with acetone and triallyl phosphite gives the bis(3-ethoxypropyl)phosphite of diallyl (2-hydroxypropyl)phosphonate.

When the phosphorus-halogen compound is a phosphorohalidothioite, the products obtained from acetone or ethyl methyl ketone and a triorganophosphite have the formula

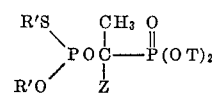

where R', Z and T are as above defined; e.g., the reaction of S-phenyl O-benzyl phosphorochloridothioite, ethyl methyl ketone and triethyl phosphite gives the S-phenyl O-benzyl phosphorothioite of diethyl (2-hydroxybutyl) phosphonate.

The phosphinous halides react with acetone or ethyl methyl ketone and a triorgano phosphite as do the phosphorohalidites. The products thus obtained have the formula

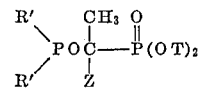

where R', Z and T are as herein defined. Thus, dibutylphosphinous chloride or bromide, acetone and tris(2,3-dichloropropyl) phosphite gives the dibutylphosphinite of bis(2,3 - dichloropropyl) (2 - hydroxypropyl)phosphonate; and dicyclohexylphosphinous chloride, ethyl methyl ketone and trimethyl phosphite gives the dicyclohexylphosphinite of dimethyl (2-hydroxybutyl)phosphonate.

From the phosphonohalidites, acetone or ethyl methyl ketone and a triorgano phosphite there are obtained compounds of the formula

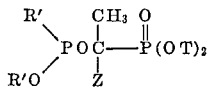

where R', Z and T are as above defined. Thus ethyl phenylphosphonobromidite, acetone and tribenzyl phosphite gives the ethyl phenylphosphonite of dibenzyl (2-hydroxypropyl)phosphonate. Reaction with the phosphonohalidothioites proceeds similarly to give compounds of the formula

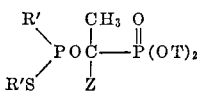

For example, allylthio cyclohexylphosphonobromidothioite, ethyl methyl ketone and triethyl phosphite give the allyl cyclohexylphosphonothioite of diethyl (2-hydroxybutyl)phosphonate.

When the phosphorus-halogen compound has only one halogen atom attached to the phosphorus atom thereof, I have found that cyclohexanone can be used in the present process instead of an aldehyde or acetone or ethyl methyl ketone. Using a phosphite as the triorgano, trivalent phosphorus compound, the products thus obtained have the formula:

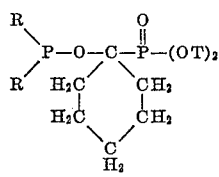

where R is selected from the class consisting of hydrocarbyl, hydrocarbyloxy, hydrocarbylthio, and hydrocarbyloxyhydrocarbyloxy radicals of from 1 to 12 carbon atoms and the halogen-substitution products of such radicals and T is selected from the class consisting of alkyl, aralkyl, alkenyl and hydrocarbyloxyalkyl radicals of from 1 to 12 carbon atoms and the halogen substitution products of such radicals.

The phosphorus halogen compound used with the cyclohexanone, as in the case of the aldehydes or acetone or ethyl methyl ketone can be a phosphorohalidite, a phosphorohalidodithioite, a phosphorohalidothioite, a phosphinous halide, a phosphonohalidite, or a phosphonohalidothioite.

When the phosphorus-halogen compound is a phosphorohalidite, the products obtained with cyclohexanone and a triorgano phosphite have the formula

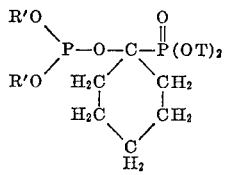

where R' is selected from the class consisting of hydrocarbyl and hydrocarbyloxyhydrocarbyl radicals of from 1 to 12 carbon atoms and the halogen-substitution products of such radicals and T is as defined above. Thus, reaction of diphenyl phosphorochloridite or phosphorobromidite with cyclohexanone and triethyl phosphite yields the diphenyl phosphite of diethyl (1-hydroxy-cyclohexyl)phosphonate; and reaction of dibutyl phosphorochloridite with cyclohexanone and tribenzyl phosphite gives the dibutyl phosphite of dibenzyl (1-hydroxycyclohexyl)phosphonate.

When the phosphorus-halogen compound is a phosphorohalidodithioite, the products have the formula shown immediately above, except that the two R's are linked to the phosphorus through sulfur instead of through oxygen; e.g., there is obtained from diethyl phosphorodithiochloridite, cyclohexanone and tris(2-chloroethyl) phosphite the diethyl phosphorodithioite of bis(2-chloroethyl)(1-hydroxycyclohexyl)phosphonate.

When the phosphorus-halogen compound is a phosphorohalidothioite, the products have the formula shown immediately above except that one of the R's is linked to the phosphorus atom through sulfur instead of oxygen; e.g., there is obtained from S-phenyl O-benzyl phosphorobromidothioite, cyclohexanone and trimethyl phosphite the S-phenyl O-benzyl phosphorothioite of dimethyl (1-hydroxycyclohexyl)phosphonate.

Products obtained from a phosphinous halide, cyclohexanone and a triorgano phosphite have the formula

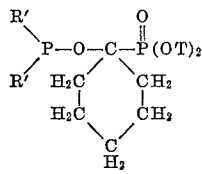

where R' and T are as above defined. Thus reaction of di-p-tolylphosphinous chloride or bromide, cyclohexanone and trimethyl phosphite gives the di-p-tolylphosphinite of diethyl (1-hydroxy-cyclohexyl)phosphonate.

Products obtained from a phosphonohalidite, cyclohexanone and a triorgano phosphite have the formula

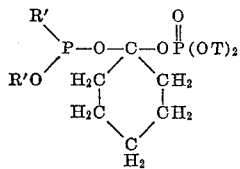

where R' and T are as above defined. An example thereof is the butyl 4-chlorophenylphosphonite of bis(3-chloropropyl) (1-hydroxycyclohexyl)phosphonate which is prepared from butyl 4-chlorophenylphosphonochloridite, cyclohexanone and tris(3-chloropropyl)phosphite.

Products similarly obtained from a phosphonohalididothioite, instead of a phosphonohalidite, have the formula shown immediately above, except that instead of being linked to the phosphorus atom through oxygen, the R' is linked through sulfur. An example of a compound prepared by the present process from a phosphonohalidodithioite is the 3-chlorobutenyl ethylphosphonothioite of dibenzyl (1-hydroxycyclohexyl)phosphonate which is obtained from 3-chlorobutenyl ethylphosphonobromidothioite, cyclohexanone and tribenzyl phosphite.

A particularly suitable class of trivalent phosphorus-containing reactants which react with a carbonyl compound according to the present process are the mixtures of bis(haloalkyl) phosphorohalidites and tris(haloalkyl) phosphites obtained by reaction of phosphorus trihalides with an alkylene oxide, e.g., the mixture of tris(2-chloroethyl) phosphite and bis(2-chloroethyl) phosphorohalidite, which is the reaction product of two moles of phosphorus trichloride with five moles of ethylene oxide. When the carbonylic compound employed with said mixture is a fatty aldehyde of from 2 to 18 carbon atoms, the products have the formula

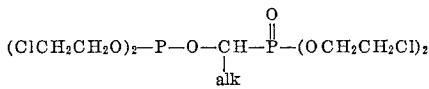

where alk denotes an alkyl radical of from 1 to 17 carbon atoms. Such products are bis(chloroethyl) phosphites of bis(chloroethyl) 1-hydroxyalkylphosphonates. The compound obtained from acetaldehyde is the bis(chloroethyl) phosphite of bis(chloroethyl) 1-hydroxyethylphosphonate. Other bis(chloroethyl) phosphites of bis(chloroethyl) 1-hydroxyalkylphosphonates provided by the invention are those wherein the 1-hydroxyalkyl portion of the molecule is 1-hydroxypropyl (from propionaldehyde), 1-hydroxybutyl (from butyraldehyde), 1-hydroxy-2-methylpropyl (from isobutyraldehyde), 1-hydroxyamyl (from valeraldehyde), 1-hydroxyhexyl (from hexanal), 2-ethyl-1-hydroxyhexyl (from 2-ethylhexanal), 1-hydroxynonyl (from nonanal), 1-hydroxy-2-butyloctyl (from 2-butyloctanal), 1-hydroxydodecyl (from lauraldehyde), 1-hydroxytetradecyl (from myristaldehyde), and 1-hydroxyoctadecyl (from stearaldehyde).

The presence of olefinic or acetylenic unsaturation in the aldehyde does not affect the course of the reaction. Thus, from acrolein and a mixture of bis(2-chloroethyl) phosphorochloridite and tris(2-chloroethyl) phosphite there is obtained the bis(2-chloroethyl) phosphite of bis-(2-chloroethyl)(1-hydroxy-2-propenyl) phosphonate and propioladehyde yields the bis(2-chloroethyl) phosphite of bis(2-chloroethyl)(1-hydroxy-2-propynyl)phosphonate.

As in the other instances shown above, the presence of substituent radicals in the aldehyde does not affect the course of the reaction of the aldehyde with a mixture of triorgano phosphite and diorgano phosphorohalidite. When said mixture consists of tris(2-chloroethyl) phosphite and bis(2-chloroethyl) phosphorochloridite, there are obtained with the substituted aliphatic aldehydes shown below, bis(2-chloroethyl) phosphites of the following substituted bis(2-chloroethyl) 1-hydroxyhydrocarbylphosphonates:

| Aldehyde | Substituted bis(2-chloroethyl) phosphonates |
|---|---|
| 2,3-dichloropropionaldehyde | 2,3-dichloro-1-hydroxypropyl. |
| 5-dibutylaminovaleraldehyde | 5-dibutylamino-1-hydroxypentyl. |
| 4-cyano-2-ethyl-2-methyl-butyraldehyde. | 4-cyano-2-ethyl-1-hydroxy-2-methylbutyl. |
| 6-hydroxy-2-heptenal | 1,6-dihydroxy-2-heptenyl. |
| 4-methoxybutyraldehyde | 1-hydroxy-4-methoxybutyl. |
| 3-(ethylthio)propionaldehyde | 3-(ethylthio)-1-hydroxypropyl. |
| ω-nitrooctanal | 1-hydroxy-ω-nitrooctyl. |
| 2-bromoheptanal | 2-bromo-1-hydroxyheptyl. |
| 8-methoxyoctanal | 1-hydroxy-8-methoxyoctyl. |
| 4-formylbutyric acid | 1-hydroxy-4-carboxybutyl. |
| 10-fluorodecanal | 10-fluoro-1-hydroxydecyl. |
| 3-cyanopropionaldehyde | 3-cyano-1-hydroxypropyl. |
| 3-chloropropiolaldehyde | 3-chloro-1-hydroxy-2-propynyl. |
| methyl 4-formylbutyrate | 4-carbomethoxy-1-hydroxybutyl. |
| iodoacetaldehyde | 2-iodo-1-hydroxyethyl. |
| succinic dialdehyde | 3-formyl-1-hydroxypropyl. |
| methylthioacetaldehyde | 1-hydroxy-2-(methylthio)ethyl. |
| chloral | 1-hydroxy-2,2,2-trichloroethyl. |

When an alicyclic carboxaldehyde is employed with the mixture of tris(2-chloroethyl) phosphite and bis(2-chloroethyl) phosphorochloridite, the products are bis-(2-chloroethyl) phosphites of bis(2-chloroethyl) (cycloalkyl)hydroxymethylphosphonates, e.g., said mixture reacts with cyclohexanecarboxaldehyde to give the bis(2-chloroethyl) phosphite of bis(2-chloroethyl) (cyclohexyl)hydroxymethylphosphonate and with 2-cyclopentene-1-carboxaldehyde to give the bis(2-chloroethyl) phosphite of bis(2-chloroethyl)(2-cyclopentene-1-yl)hydroxymethylphosphonate. As in the aliphatic series of aldehydes, the alicyclic carboxaldehyde may be substituted or unsubstituted; thus, 2-diethylamino-6-methyl-3-cyclohexene-1-carboxaldehyde gives with said mixture of chloroethyl esters the bis(2-chloroethyl) phosphite of bis(2-chloroethyl)(2-diethylamino - 6 - methyl - 3 - cyclohexen-1-yl)- hydroxymethylphosphonate; 2,4-diethylcyclohexanecarboxaldehyde gives the bis(2-chloroethyl) phosphite of bis(2 - chloroethyl) (2,4 - diethylcyclohexyl)hydroxymethylphosphonate; and 3-cyano-1,2-dimethylcyclopentanecarboxaldehyde gives the bis(2-chloroethyl) phosphite of bis(2-chloroethyl) (3-cyano-1,2-dimethylcyclopentyl)-hydroxymethylphosphonate.

Aldehydes containing an aromatic nucleus undergo like reaction with the mixture of bis(2-chloroethyl)phosphorochloridite and tris(2-chloroethyl) phosphite. Thus, benzaldehyde gives the bis(2-chloroethyl) phosphite of bis(2-chloroethyl) (α-hydroxybenzyl)phosphonate; phenylacetaldehyde gives the bis(2-chloroethyl) phosphite of (1-hydroxy-2-phenylethyl)phosphonate; cinnamaldehyde gives the bis(2-chloroethyl) phosphite of bis(2-chloroethyl) (1-hydroxy - 3 - phenyl - 2 - propenyl)phosphonate; p-tolualdehyde gives the bis(2-chloroethyl) phosphite of bis(2 - chloroethyl) (4 - methyl - α - hydroxybenzyl)phosphonate; phenyl-propiolaldehyde gives the bis(2-chloroethyl) phosphite of bis(2-chloroethyl) (1-hydroxy-3-phenyl-2-propynyl)phosphonate; 1-naphthaldehyde gives the bis(2-chloroethyl) phosphite of bis(2-chloroethyl)[(1-naphthyl)hydroxymethyl]phosphonate and 4-biphenylcarboxaldehyde gives the bis(2-chloroethyl) phosphite of bis(2 - chloroethyl)[(4 - biphenyl)hydroxymethyl]phosphonate. The aromatic aldehydes may or may not be substituted. Examples of products obtained from a mixture of tris(2-chloroethyl) phosphite and bis(2-chloroethyl) phosphorochloridite with variously substituted aromatic aldehydes are given below:

| Aldehyde used | bis(2-chloroethyl) phosphite of bis(2-chloroethyl)- |
| --- | --- |
| 2,3-dichlorobenzaldehyde | (2,3 - dichloro -α - hydroxybenzyl) - phosphonate. |
| 2-chloro-5-nitrobenzaldehyde | (2-chloro-α-hydroxy-5-nitro-benzyl)phosphonate. |
| p-cyanobenzaldehyde | (p-cyano-α-hydroxybenzyl)phosphonate. |
| m-bromobenzaldehyde | (α-hydroxy-m-bromobenzyl)phosphonate. |
| p-isobutoxybenzaldehyde | (p-isobutoxy-α-hydroxybenzyl)-phosphonate. |
| m-(methylthio)benzaldehyde | (m-(methylthio)-α-hydroxybenzyl)-phosphonate. |
| p-diethylaminobenzaldehyde | (p-diethylamino-α-hydroxybenzyl)phosphonate. |
| methyl phthaldehyde | (o-carbomethoxy-α-hydroxybenzyl)phosphonate. |
| 4-hydroxybenzaldehyde | (α,4-dihydroxybenzyl)phosphonate. |
| piperonal | (α-hydroxypiperonyl)phosphonate. |
| 4'-formyl-3''-propoxyacetanilide | (4-acetamido-α-hydroxy-3-propoxybenzyl)phosphonate. |
| 2,5-dimethoxy-1-naphthaldehyde | [(2,5-dimethoxy-1-naphthyl)-hydroxymethyl]phosphonate. |
| (p-nitrophenyl)acetaldehyde | [2-(p-nitrophenyl)-1-hydroxyethyl]phosphonate. |
| 4-carboxyhydrocinnamaldehyde | [3-(4-carboxyphenyl)-1-hydroxypropyl]phosphonate. |
| 2-(2-biphenylyl)butyraldehyde | [2-(2-biphenylyl)-1-hydroxybutyl]phosphonate. |
| 4-isopropenylbenzaldehyde | (α-hydroxy-4-isopropenylbenzyl)phosphonate. |
| 4'-nitro-4-biphenylcarboxaldehyde | [(4'-nitro-4-biphenylyl)-hydroxymethyl]phosphonate. |
| 2,6-difluorobenzaldehyde | (2,6-difluoro-α-hydroxybenzyl)phosphonate. |
| 1-naphthaleneacetaldehyde | [2-(1-naphthyl)-1-hydroxyethyl]phosphonate. |
| 5-bromo-8-nitronaphthaldehyde | [(5-bromo-8-nitro-1-naphthyl)hydroxymethyl]phosphonate. |
| 2,6-diiodo-3-methoxybenzaldehyde | (2,6-diiodo-α-hydroxy-3-methoxybenzyl)phosphonate. |

2- or 3-thiophenecarboxaldehyde and nuclear derivatives thereof similarly reacts with a mixture of tris(2-chloroethyl) phosphite and bis(2-chloroethyl) phosphorochloridite to give bis(2-chloroethyl) phosphites of bis(2-chloroethyl) substituted hydroxymethylphosphonates. For example, 3-thiophenecarboxaldehyde yields the bis(2-chloroethyl) phosphite of bis(2-chloroethyl) [(3-thienyl)hydroxymethyl]phosphonates; similarly 5-chloro-2-thiophenecarboxaldehyde gives the corresponding [(5-chloro-2-thienyl)hydroxymethyl]phosphonate; 3,5-dimethyl-2-thiophenecarboxaldehyde gives the corresponding [(3,5-dimethyl-2-thienyl)hydroxymethyl]phosphonate; 5-methoxy-2-thiophenecarboxaldehyde gives the corresponding [(5 - methoxy - 2 - thienyl)hydroxymethyl] phosphonate; 5-(methylthio)-2-thiophenecarboxaldehyde gives the corresponding {[(5-methylthio)-2-thienyl]hydroxymethyl}phosphonate, and 5-acetamido-2-thiophenecarboxaldehyde gives the corresponding [(5-acetamido-2-thienyl)hydroxymethyl]phosphonate.

The furaldehydes react as do the thiophenecarboxaldehydes. Thus, 2-furaldehyde, tris(2-chloroethyl) phosphite and bis(2-chloroethyl) phosphorochloridite give the bis(2-chloroethyl) phosphite of bis(2-chloroethyl) (2-furylhydroxymethyl)phosphonate and with the same phosphite and phosphorochloridite, 5-bromo-, 5-nitro-, or 5-acetamido-2-furaldehyde gives the bis(2-chloroethyl) phosphite of bis(2-chloroethyl) (5-bromo-, 5-nitro-, or 5-acetamido-2-furylhydroxymethyl)phosphonate.

The use of mixtures of other halogen-substituted triorgano phosphites and halogen-substituted di-organo phosphorohalidites gives compounds analogous to the above except that the 2-chloroethyl, i.e., the alcohol portion of the molecule, is replaced by a radical which corresponds to the organo residue of the phosphite and phosphorohalidite. Thus, when there is employed a mixture of tris(2-bromoethyl) phosphite and bis(2-bromoethyl) phosphorobromidite, the product with benzaldehyde is the bis(2-bromoethyl) phosphite of bis(2-bromoethyl) (α-hydroxybenzyl)phosphonate; that obtained from acrolein, tris(2-chloroethyl) phosphite and bis(2-chloroethyl) phosphorochloridite is the bis(2-chloroethyl) phosphite of bis(2 - chloroethyl) (1 - hydroxy - 2 - propenyl)phosphonate and that obtained from 4-ethoxybenzaldehyde, tris(2-iodoethyl) phosphite and bis(2-iodoethyl) phosphoroiodite is the bis(2-iodoethyl) phosphite of bis(2-iodoethyl) (4-ethoxy-α-hydroxybenzyl)phosphonate. The mixture of phosphite and phosphorochloridite obtained from two moles of phosphorus trichloride and five moles of propylene oxide, i.e., tris(2-chloropropyl) phosphite and bis(2-chloropropyl) phosphorochloridite, reacts with acetaldehyde to give the bis(2-chloropropyl) phosphite of bis(2-chloropropyl) (1-hydroxyethyl)phosphonate; with cyclohexanecarboxaldehyde to give the bis(2-chloropropyl) phosphite of bis(2-chloropropyl) (cyclohexylhydroxymethyl)phosphonate; and with 2-ethoxy-4-nitrobenzaldehyde to give the bis(2-chloropropyl) phosphite of bis(2 - chloropropyl) (2 - ethoxy - α - hydroxy - 4 - nitrobenzyl)phosphonate.

Similarly, mixtures of tris(2,3-dihalopropyl)phosphite and bis(2,3-dihalopropyl) phosphorohalides, e.g., the mixture of tris(2,3-dichloropropyl) phosphite and bis(2,3-dichloropropyl) phosphorochloridite prepared by reaction of two moles of phosphorus trichloride with five moles of epichlorohydrin reacts with, say, p-dimethylaminobenzaldehyde to give the bis(2,3-dichloropropyl) phosphite of bis(2,3-dichloropropyl) (p-dimethylamino-α-hydroxybenzyl)phosphonate; with crotonaldehyde to give the bis(2,3-dichloropropyl)phosphite of bis(2,3-dichloropropyl) (1-hydroxy-2-butenyl)phosphonate: with phenylacetaldehyde to give the bis(2,3-dichloropropyl) phosphite of bis(2,3 - dichloropropyl) (2 - phenyl - 1 - hydroxyethyl)phosphonate; and with 4-methyl-2-thiophenecarboxaldehyde to give the bis(2,3-dichloropropyl) phosphite of bis(2,3 - dichloropropyl) [(4 - methyl - 2 - thienyl)-hydroxymethyl]phosphonate. The mixture of tris(2,3-dibromopropyl) phosphite and bis(2,3-dibromopropyl) phosphorobromidite prepared by reaction of two moles of phosphorus tribromide with 5 moles of epibromohydrin reacts similarly; e.g., with butyraldehyde or cinnamaldehyde there are obtained the bis(2,3-dibromopropyl) phosphite of bis(2,3-dibromopropyl) (1-hydroxybutyl)phosphonate or (α-hydroxy-3-phenyl-2-propenyl)-phosphonate.

The mixture of tris(2-halo-2-phenylethyl) phosphite and bis(2-halo-2-phenylethyl) phosphorohalidite obtained by reaction of two moles of phosphorus trihalide with five moles of phenylethylene oxide is useful. Thus, when phosphorus trichloride is used the resulting mixture gives, e.g., with acetaldehyde, the bis(2-chloro-2-phenylethyl) phosphite of bis(2-chloro-2-phenylethyl) (1-hydroxyethyl) phosphonate; with acrolein to give the bis(2-chloro-2-phenylethyl) phosphite of bis(2-chloro-2-phenylethyl) (1-hydroxy-2-propenyl)phosphonate; with p-cyanobenzaldehyde the bis(2-chloro-2-phenylethyl) phosphite of bis(2 - chloro - 2 - phenylethyl)(p - cyano - α - hydroxybenzyl)phosphonate; and with 1-naphthaldehyde the bis-(2-chloro-2-phenylethyl) phosphite of bis(2-chloro-2-phenylethyl) [(1-naphthyl)hydroxymethyl]phosphonate.

The mixture of tris(2-halo-3-butenyl) phosphite and bis(2-halo-3-butenyl) phosphorohalidite obtained by the reaction of two moles of phosphorus trihalide with five moles of 1,2-epoxy-3-butene also gives a phosphite of a hydroxy phosphonate when reacted with aldehydes. Using the mixture of tris(2-chloro-3-butenyl) phosphite and bis(2-chloro-3-butenyl) phosphorochloridite obtained from two moles of phosphorus trichloride and 5 moles of 1,2-epoxybutene there is obtained with propionaldehyde the bis(2-chloro-3-butenyl) phosphite of bis(2-chloro-3-butenyl)(1-hydroxypropyl) phosphonate; with p-chlorobenzaldehyde there is obtained the bis(2-chloro-3-butenyl) phosphite of (p-chloro-α-hydroxybenzyl)phosphonate; and with 2-cyclohexenecarboxaldehyde there is obtained the bis(2-chloro-3-butenyl) phosphite of bis(2-chloro-3-butenyl) [(2-cycloxenyl)hydroxymethyl] phosphonate.

Mixtures of phosphites and phosphorohalidites obtained from glycidol ethers are also advantageously employed for the preparation of the present phosphite-phosphonates. Thus the mixture of tris(3-isoamyloxy-2-chloropropyl) phosphite and bis(3-isoamyloxy-2-chloropropyl) phosphorochloridite obtained from two moles of phosphorus trichloride and five moles of the isoamyl ether of glycidol, i.e. 1,2-epoxypropyl isoamyl ether, reacts with methyl 4-formylbutyrate to give the bis(3-isoamyloxy-2-chloropropyl) phosphite of bis(3-isoamyloxy-2-chloropropyl) (4 - carbomethoxy-1-hydroxybutyl)phosphonate; with piperonal to give the bis(3-isoamyloxy-2-chloropropyl) phosphite of bis(3-isoamyloxy-2-chloropropyl) (α-hydroxypiperonyl) phosphonate; with acrolein to give the bis(isoamyloxy-2-chloropropyl)phosphite of bis(isoamyloxy - 2 - chloropropyl)(1 - hydroxy - 2 - propenyl)phosphonate; and with 2-furaldehyde to give the bis(3-isoamyloxy-2-chloropropyl) phosphite of bis(3-isoamyloxy-2-chloropropyl)(α-hydroxyfurfuryl)phosphonate.

Phosphites of hydroxyphosphonates are likewise obtainable, according to the invention, by the reaction of an aldehyde with a mixture of halogenated tri-organo phosphite and halogenated di-organo phosphorohalidite in which the organo groups are dissimilar. Thus, reaction of benzaldehyde with a mixture of bis-(2,3-dichloropropyl) phosphorochloridite and tris(2-chloroethyl) phosphite yields the bis(2,3-dichloropropyl) phosphite of bis (2-chloroethyl) (α-hydroxybenzyl)phosphonate; crotonaldehyde reacts with a mixture of bis(2-chloroethyl) phosphorochloridite and tris(2-chloro-3-butenyl) phosphite to give the bis(2-chloroethyl) phosphite of bis(1-chloro-3-butenyl) (1-hydroxy-2-butenyl)phosphonate; a mixture of bis(3-methoxy-2-chloropropyl) phosphorochloridite and tris(3-phenoxy-2-bromopropyl) phosphite reacts with 3-cyanopropionaldehyde to give the bis(3-methoxy-2-chloropropyl) phosphite of bis(3-phenoxy-2-bromopropyl) 3-cyano-1-hydroxypropyl phosphonate; and a mixture of bis(2-bromobutyl) phosphorobromidite and tris(2-chloro-4-ethoxybutyl) phosphite reacts with propiolaldehyde to give the bis(2-bromobutyl) phosphite of bis(2-chloro-4-ethoxybutyl) (1 - hydroxy-2-propynyl)phosphonate.

As herein disclosed, the halogenated phosphite-phosphonates are also obtainable by employing, with the equimolar mixture of tri-organo phosphite and di-organo phosphorohalidite, not an aldehyde but a dialkyl ketone such as acetone or ethyl methyl ketone. Thus reaction of acetone with an equimolar mixture of tris(2-chloroethyl) phosphite and bis(2-chloroethyl) phosphorochloridite yields the bis(2-chloroethyl) phosphite of bis(2-chloroethyl) (2-hydroxypropyl)phosphonate; with an equimolar mixture of tris(2,3-dichloropropyl) phosphite and bis(2,3-dichloropropyl)phosphorochloridite acetone yields the bis(2,3-dichloropropyl) phosphite of bis(2,3-dichloropropyl) (2-hydroxypropyl)phosphonate; and ethyl methyl ketone and an equimolar mixture of tris(2-chloro-2-phenylethyl) phosphite and bis(2-chloro-2-phenylethyl) phosphorochloridite gives the bis(2-chloro-2-phenylethyl) phosphite of bis(2-chloro - 2 - phenylethyl) (2-hydroxybutyl)phosphonate.

Cyclohexanone reacts with the substantially equimolar mixture of halogenated tris-organo phosphite and bis-organo phosphorohalidite to give phosphite-phosphonates of the formula

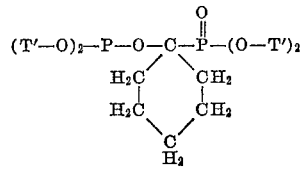

in which T' is selected from the class consisting of halogenated alkyl, alkenyl, aralkyl and hydrocarbyloxyalkyl radicals of from 1 to 12 carbon atoms.

Examples of phosphite phosphonates of the above formula are the bis(2-chloroethyl) phosphite of bis(2-chloroethyl) (1-hydroxycyclohexyl)phosphonate prepared from cyclohexanone and an equimolar mixture of tris(2-chloroethyl) phosphite and bis(2-chloroethyl)phosphorochloridite; and bis(3-chlorobutyl) phosphite of bis(3-chlorobutyl) (1-hydroxycyclohexyl)phosphonate prepared from cyclohexanone and an equimolar mixture of tris(3-chlorobutyl) phosphite and bis(3-chlorobutyl)phosphorochloridite; and bis(3-iodo-2-chloropropyl) phosphite of bis(3-iodo-2-chloropropyl) (1 - hydroxycyclohexyl)phosphonate prepared from cyclohexanone and an equimolar mixture of tris(3-iodo-2-chloropropyl)phosphite and bis(3-iodo-2-chloropropyl)phosphorochloridite; the bis(2-chloro-3-butenyl) phosphite of bis(2-chloro-3-butenyl) (1-hydroxycyclohexyl) phosphonate prepared from an equimolar mixture of tris(2-chloro-3-butenyl) phosphite, bis(2-chloro-3-butenyl) phosphorochloridite and cyclohexanone; and the bis [(α-chloromethyl)benzyl] phosphite of bis[(α-chloromethyl)benzyl] (1-hydroxycyclohexyl)phosphonate prepared from an equimolar mixture of tris[(α-chloromethyl)-benzyl] phosphite, and bis[(α-chloromethyl)benzyl]-phosphorochloridite and cyclohexanone.

Particularly valuable phosphorus halide reactants are the cyclic esters of phosphorochloridic or phosphorobromidic acids. Thus, 2-chloro-1,3,2-dioxaphospholane as the cyclic ester halide, a triorgano phosphite, and an aliphatic carboxaldehyde as the carbonylic compound, yields, according to the present process, hydroxy phosphonates having the formula

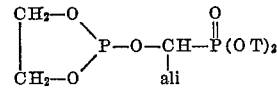

where T is selected from the class consisting of alkyl, alkenyl, aralkyl and hydrocarbyloxyalkyl radicals of from 1 to 12 carbon atoms and such radicals having halogen substitution and ali denotes an aliphatic hydrocarbon radical of from 1 to 17 carbon atoms. Such compounds are ethylene glycol phosphite (cyclic esters) of (1-hydroxyalkyl)phosphonates, of (1-hydroxyalkenyl)-phosphonates or of (1-hydroxyalkynyl)phosphonates. Examples of such esters are the ethylene glycol phosphite (cyclic ester) of dimethyl (1-hydroxyethyl)phosphonate, of diethyl (1-hydroxybutyl)phosphonate, of dibenzyl (1-hydroxyoctyl)phosphonate of didodecyl (1-hydroxy-2-pentenyl)phosphonate, of diallyl (1-hydroxy-2-propynyl) phosphonate, of bis(2-chloroethyl) (1-hydroxyamyl)

phosphonate, of bis(2,3-dichloropropyl) (1-hydroxyethyl) phosphonate, of bis(3-phenoxypropyl) (1-hydroxymethyl) phosphonate, of bis(2-chloro-3-butenyl) (1-hydroxydecyl)phosphonate, etc.

When the halogenated ring compound of phosphorus is 2-chloro-1,3,2-dioxaphosphorinane, the phosphorus ester is a phosphite, and the carbonylic compound is an aliphatic carboxaldehyde, the products are 1,3-propanediol phosphite (cyclic esters) of (1-hydroxyalkyl)phosphonates, of (1-hydroxyalkenyl)phosphonates or of (1-hydroxyalkynyl)phosphonates. Examples of such esters are the 1,3-propanediol (cyclic esters) of diethyl (1-hydroxy-2-propenyl)phosphonate, bis(3-ethoxypropyl) (1-hydroxybutyl)phosphonate, bis(2-phenylethyl) (1-hydroxy-tert-dodecyl)phosphonate, bis(2-chloroethyl (1-hydroxyhexyl)phosphonate, bis(dichlorononyl) (1-hydroxy-2-butynyl)phosphonate, bis(2,4-dichlorobenzyl) (1-hydroxyisopropyl)phosphonate, 2-chloroethyl 3-bromopropyl (1-hydroxyheptyl)phosponate, etc.

When the halogenated ring compound is 2-chloro-1,3,2-benzodioxaphosphole, the phosphorus ester is a phosphite and the carbonylic compound is an aliphatic carboxaldehyde aldehyde, the products are pyrocatechol phosphite (cyclic esters) of (1-hydroxyalkyl)phosphonates, (1-hydroxyalkenyl)phosphonates or (1-hydroxyalkynyl)phosphonates. Examples of such esters are the pyrocatechol phosphite (cyclic ester) of dibutyl (1-hydroxy-2-butenyl)phosphonate, of bis(2-chloroethyl) (1-hydroxy-2-ethylhexyl)phosphonate, of 3-chloropropyl n-propyl (1-hydroxydodecyl)phosphonate, of bis(3-phenoxypropyl) (1-hydroxy-2-pentynyl)phosphonate, etc.

Employing, instead of the aliphatic aldehyde, an aromatic aldehyde such as benzaldehyde or its nuclear derivatives, the products are cyclic phosphites of α-hydroxybenzyl phosphonates, e.g., the reaction of 2-chloro-1,3,2-benzodioxaphosphole, triethyl phosphite and benzaldehyde gives the pyrocatechol phosphite (cyclic ester) of (α-hydroxybenzyl)phosphonate. Employing as the aldehyde constituent a cyclic aldehyde such as naphthaldehyde, furfuryl or thiophenecarboxaldehyde, the products are cyclic phosphites of hydroxymethylphosphonates having the appropriate cyclic nucleus as a substituent in the methyl radical; e.g., the reaction of 2-chloro-4-methyl-1,3,2-dioxaphospholane, α-naphthaldehyde, and trimethyl phosphite gives the 1,2-propylene glycol ester of dimethyl [(hydroxy)(naphthyl)methyl]phosphonate; the reaction of 2-chloro-1,3,2-dioxaphosphorinane, tris(2-chloroethyl) phosphite and furfural gives the 1,3-propanediol phosphite (cyclic ester) of bis(2-chloroethyl) (α-hydroxyfurfuryl)phosphonate and that of 2-chloro-4-chloromethyl-1,3,2-dioxaphospholane, tri-n-butyl phosphite and 2-thiophenecarboxaldehyde gives the 3-chloro-1,2-propanediol phosphite (cyclic ester) of dibutyl (α-hydroxythenyl)phosphonate.

Alicyclic aldehydes react as do the aliphatic and other aldehydes mentioned above. The products according to the invention are cyclic phosphites of 1-hydroxymethylphosphonates carrying the appropriate alicyclic radical as a substituent in the methyl radical, e.g., the reaction of 2-chloro-1,3,2-dioxaphospholane, triamyl phosphite and cyclohexanecarboxaldehyde yields the ethylene glycol phosphite (cyclic ester) of diamyl (cyclohexylhydroxymethyl)phosphonate and the reaction of 2-chloro-1,3,2-benzodioxaphosphole, tris(2-chloroethyl) phosphite and 2,3-dimethyl-2-cyclopentenecarboxaldehyde gives the pyrocatechol phosphite (cyclic ester) of bis(2-chloroethyl) [(2,3-dimethyl-2-cyclopentenyl)hydroxymethyl]phosphonate, etc.

As hereinbefore disclosed, the presence of such substituents as the alkoxy, halogen, carboalkoxy, thio, aldehydo, and alkyl radicals in the aldehyde constituent does not effect the course of the reaction. Thus, when instead of a fatty aldehyde there is employed, e.g., an alkoxy-substituted aldehyde such as 3-butoxybutyraldehyde, the reaction product with a phosphite such as triethyl phosphite and a halogen-containing ring compound of phosphorus such as 2-chloro-1,3,2-dioxaphospholane, is the ethylene glycol phosphite (cyclic ester) of diethyl (3-butoxy-1-hydroxybutyl)phosphonate; with a substituted benzaldehyde such as 2,4-dichlorobenzaldehyde, the same phosphorus-containing reactants give the ethylene glycol phosphite (cyclic ester) of diethyl (2,4-dichloro-α-hydroxybenzyl)phosphonate, etc.

When a ketone, instead of an aldehyde, is reacted with the halogen-containing ring compound of phosphorus and the trivalent phosphorus ester, the products are cyclic phosphites of hydroxyalkylphosphonates wherein the hydroxy radical is present in the position which corresponds to the position of the carbonyl radical in the ketone which has been used. Thus, with aliphatic ketones the products have the formula

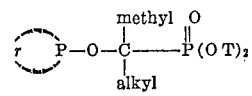

in which the alkyl radical has from 1 to 2 carbon atoms, T is as herein defined and r denotes a bivalent —O—hydrocarbylene—O— or —O—halohydrocarbylene—O— radical which is free of aliphatic unsaturation, which contains from 2 to 4 carbon atoms in a chain, and a total of 2 to 12 carbon atoms.

The reaction product of 2-chloro-1,3,2-benzodioxaphosphole, trimethyl phosphite and acetone, for example, is the pyrocatechol phosphite (cyclic ester) of dimethyl(2-hydroxypropyl)phosphonate. As hereinbefore stated the two valences of the carbon in the above formula may be satisfied by the cyclohexane ring, i.e., the products obtained from cyclohexanone have the formula

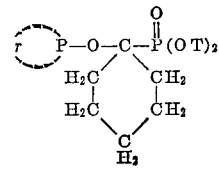

Thus, the reaction product of 2-chloro-1,3,2-dioxaphospholane, tris(2-chloroethyl) phosphite and cyclohexanone yields the ethylene glycol phosphite (cyclic ester) of bis-(2-chloroethyl) (1-hydroxycyclohexyl)phosphonate.

Nitrogenous trivalent phosphorus halides are likewise very useful in the present process. Reaction of the dihydrocarbylphosphoramidous dichlorides with formaldehyde and a triorgano phosphite or a tris(haloalkyl) phosphite yields bis[(dialkoxyphosphinyl)methyl] dihydrocarbylphosphoramidites when a trialkyl phosphite is used or bis{[bis(haloalkoxy)phosphinyl]methyl} dihydrocarbylphosphoramidites when a tris(haloalkyl) phosphite is used, i.e., compounds of the formula

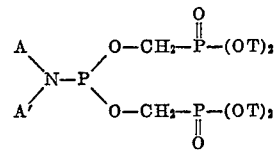

wherein A is an alkyl radical of from 1 to 5 carbon atoms, A′ is selected from the class consisting of A and benzenoid radicals of from 6 to 7 carbon atoms and T is selected from the class consisting of alkyl, alkenyl, aralkyl and hydrocarbyloxyalkyl radicals of from 1 to 12 carbon atoms and such radicals carrying halogen substitution. Thus, from methylpropylphosphoramidous dichloride and substantially two moles each of formaldehyde and of trimethyl phosphite there is obtained bis[(dimethoxyphosphinyl)-methyl] methylpropylphosphoramidite, i.e., a compound of the formula in which A is methyl, A′ is propyl and T is ethyl. Similarly, from diethylphosphoramidous dichloride, formaldehyde and tris(2-chloroethyl) phosphite there is obtained bis{[bis(2-chloroethoxy)phosphinyl]methyl} diethylphosphoramidite; and from ethyl-p-tolylphosphoramidous dichloride and tribenzyl phosphite there is obtained bis[(dibenzyloxyphosphinyl)methyl] ethyl-p-tolylphosphoramidite.

The reaction of a dihydrocarbylphosphoramidous dichloride with an aliphatic hydrocarbon carboxaldehyde and a trialkyl or tris-(haloalkyl) phosphite gives either bis[1 - (dialkoxyphosphinyl)alkyl]dihydrocarbylphosphoramidites or bis{1-[bis(haloalkoxy)phosphinyl]-alkyl}dihydrocarbylphosphoramidites, depending upon whether a trialkyl phosphite or a tris(haloalkyl)phosphite is used, i.e., the products thus obtained have the formula

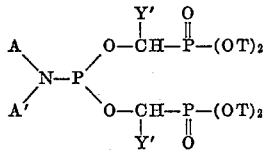

where A is an alkyl radical of from 1 to 5 carbon atoms, A' is selected from the class consisting of A and benzenoid radicals of from 6 to 7 carbon atoms, Y' is an aliphatic hydrocarbon radical of from 1 to 10 carbon atoms and T is as above defined. Thus, the reaction product of ethylpentylphosphoramidous dichloride, acetaldehyde and tri-n-propyl phosphite gives a compound in which A of the above formula is ethyl, A' is pentyl, T is propyl and Y is methyl, i.e., bis[1(dipropoxyphosphinyl)ethyl]ethylpentylphosphoramidite. Other compounds prepared according to the present process from a dihydrocarbylphosphoramidous dichloride, an aliphatic hydrocarbon carboxaldehyde and a trialkyl or tris-(haloalkyl) phosphite are as follows:

bis[1 - (dimethoxyphosphinyl)propyl] dimethylphosphoramidite
bis[1 - (diethoxyphosphinyl)ethyl]diethylphosphoramidite
bis[1 - (diethoxyphosphinyl)-2-ethylhexyl]methylphenylphosphoramidite
bis[1-(dihexyloxyphosphinyl) - 2 - propenyl]di - n - butylphosphoramidite
bis{1 - [bis(2 - bromoethoxy)phosphinyl]dodecyl}ethyl-p-tolylphosphoramidite
bis{1 - [bis(2 - chloropropoxy)phosphinyl] - 2 - hexenyl}di-n-pentylphosphoramidite
bis{1 - [bis(2 - ethylhexyloxy)phosphinyl]propyl}isopentylphenylphosphoramidite
bis{1 - [bis(2 - iodoethoxy)phosphinyl] - 2 - propynyl}methylphenylphosphoramidite
bis[1 - (diethoxyphosphinyl)ethyl dimethylphosphoramidite
bis{1 - [bis(2 - chloropropoxy)phosphinyl] - 2 - methylpropyl}n-di-n-propylphosphoramidite
bis{1 - [bis(2 - chloroethoxy)phosphinyl]butyl}methylo-tolylphosphoramidite Employing cyclic carboxaldehydes with the dihydrocarbylphosphoramidous dichloride and a triorgano phosphite yields the bis[1-(dialkoxyphosphinyl)Cy-alkyl]dihydrocarbylphosphoramidites, i.e., compounds of the formula

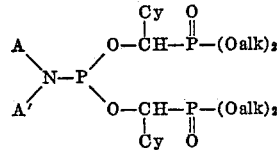

in which A and A' are the hydrocarbyl radicals defined above, Cy denotes a cyclic hydrocarbyl radical of from 6 to 10 carbon atoms or the furyl or thienyl radical. Thus, methylphenylphosphoramidous dichloride, benzaldehyde and trimethyl phosphite give bis[α-(dimethoxyphosphinyl)benzyl]methylphenylphosphoramidite; di-n-propylphosphoramidous dichloride, p-tolualdehyde and tris(2-chloroethyl) phosphite gives bis{α-[bis(2-chloroethoxy)phosphinyl] - p - methylbenzyl} di - n - propylphosphoramidite; methyl - p - tolylphosphoramidous dichloride, phenylacetaldehyde and triethyl phosphite gives bis [α-(diethoxyphosphinyl) - 2 - phenylethyl]-methyl-p-tolylphosphoramidite; diethylphosphoramidous dichloride, cyclohexanecarboxaldehyde, and tri-n-butyl phosphite gives bis[α-(di-n-butoxyphosphinyl(cyclohexylmethyl)]diethylphosphoramidite; ethylphenylphosphoramidous dichloride, 2-thiophenecarboxaldehyde and tetrachlorododecyl phosphite gives bis{α-[bis(tetrachlorododecyloxy) - phosphinyl] - 2 - thienyl}ethylphenylphosphoramidite; dipentylphosphoramidous dichloride, furfural and triethyl phosphite gives bis[α-(diethoxyphosphinyl)furfuryl]dipentylphosphoramidite; pentylphenylphosphoramidous dichloride, benzaldehyde and tris-(2-bromoethyl) phosphite gives bis[α-[bis(2-bromoethoxy)-phosphinyl]-benzyl}pentylphenylphosphoramidite; butylphenylphosphoramidous dichloride, β-naphaldehyde and tris(2-fluoroethyl) phosphite gives bis{α-[bis(2-fluoroethoxy)phosphinyl] - β - naphthylmethyl}butylphenylphosphoramidite, etc.

The substituted aldehydes react as do the hydrocarboncarboxaldehydes or the furfural or the thiophenecarboxaldehydes, i.e., the aldehyde component may be substituted by one or more of the following radicals: halogen, —NO₂, —CHO, methylenedioxy, —CN, (alkyl)₂N—, —COO-alkyl, —S-alkyl, —SS-alkyl, —O-alkyl and alkyl-CONH— where the radical has from 1 to 5 carbon atoms. Thus diethylphosphoramidous dibromide, tribenzyl phosphite and 4-cyanobutyraldehyde give bis[(dibenzyloxyphosphinyl)(4-cyanobutyl)]diethylphosphoramidite; 2,4-dichlorobenzaldehyde, methylphenylphosphoramidous dichloride and trimethyl phosphite yield bis[(dimethoxyphosphinyl)(2,4-dichlorobenzyl)]methylphenylphosphoramidite, di-n-butylphosphoramidous dichloride, piperonal and tris(2-chloroethyl) phosphite yield bis{[(2-chloroethoxy)phosphinyl][methylenedioxybenzyl]}di - n - butylphosphoramidite; diethylphosphoramidous dibromide, furfural and tribenzyl phosphite give bis[α-(dibenzyloxyphosphinyl)furfuryl]diethylphosphoroamidite, etc. The ketones: acetone, ethyl methyl ketone and cyclohexanone are similarly useful as the carbonyl component.

When the dichloroamido phosphorus compound is an N-heterocyclic phosphonous dichloride, e.g., aziridino-, azetidino-, piperidino-, or pyrrolidinophosphonous dichloride, the products with formaldehyde and the triorgano phosphite such as a trialkyl or a tris(haloalkyl) phosphite are bis[(dialkoxyphosphinyl)methyl] or bis{[bis(haloalkyl)phosphinyl]methyl}aziridino-, azetidino-, piperidino- or pyrrolidinophosphonites. Compounds thus obtained with the various triorgano phosphites have the formula

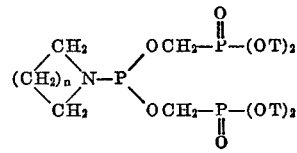

in which n is an integer of 0 to 3 and T is selected from the class consisting of alkyl, alkenyl, aralkyl and hydrocarbyloxyalkyl radicals of from 1 to 12 carbon atoms and halogen substitution products of such radicals. Thus, piperidinophosphonous dichloride, formaldehyde and triethyl phosphite or tris(2-chloroethyl) phosphite yield either the bis[(diethoxyphosphinyl)methyl] or the bis{[bis(2 - chloroethoxy)phosphinyl]methyl}piperidinophosphonite; and pyrrolidinophosphonous dichloride, formaldehyde, and tri-n-octyl phosphite or tris(2-chloropropyl) phosphite give either the bis[(di-n-octyloxyphosphinyl)methyl] or the bis{[bis(2-chloropropoxy)phosphinyl[methyl}pyrrolidinophosphonite. Other N-heterocyclic phosphonium dihalides, e.g., aziridino-, 2-methylaziridino-, azetidino-, or morpholinophosphonous dichloride or dibromide react in the same manner.

Employing a hydrocarbon carboxaldehyde with the triorgano phosphite and N-heterocyclic phosphonous dihalide in the present process there are obtained with the aziridino-, azetidino-, pyrrolidino-, or piperidinophosphonous dihalide compounds of the formula

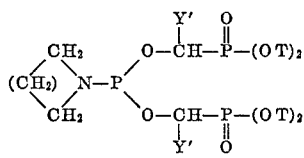

wherein n is an integer of 0 to 3, Y' is a hydrocarbyl radical of from 1 to 10 carbon atoms, and T is as above identified, e.g., from a trialkyl or tris(haloalkyl)phosphite there are provided either the bis[1-dialkoxyphosphinyl)-hydrocarbyl] or the bis{1-[bis(haloalkoxy)phosphinyl]-hydrocarbyl}piperidinophosphonites, or pyrrolidinophosphonites, or azetidinophosphonites, or aziridinophosphonites. Thus, the reaction of piperidinophosphonous dichloride, acetaldehyde and triethyl phosphite gives bis[1-(diethoxyphosphinyl)ethyl] piperidinophosphonite; aziridinophosphonous dichloride, benzaldehyde and triisooctyl phosphite gives bis[α-(diisooctyloxyphosphinyl)benzyl]-aziridinophosphonite; tris (2-chloroethyl)phosphite, acrolein and azetidinophosphonous dichloride gives bis{1-[bis-(2 - chloroethoxy)phosphinyl]-2-propenyl}azetidinophosphonite; trimethyl phosphite, propiolaldehyde and pyrrolidinophosphonous dichloride gives bis[1-(dimethoxyphosphinyl) - 2 - propynyl]pyrrolidinophosphonite; tri-n-butyl phosphite, cyclohexanecarboxaldehyde and pyrrolidinophosphonous dichloride gives bis[α-(di-n-butoxyphosphinyl)cyclohexylmethyl]pyrrolidinophosphonite; and tris(2-chloroethyl)phosphite, decanal and 2-methylaziridinophosphonous dichloride gives bis{1-[bis(2-chloroethoxy)-phosphinyl]decyl}aziridinophosphonite. The hydrocarbon carboxaldehyde may carry one or more substituents, e.g., there may be used 4-cyanobutyraldehyde, 2,4-dichlorophenylacetaldehyde, 3-nitrobenzaldehyde, piperonal, 2-ethylthio-4-tolualdehyde, or the other aldehydes disclosed above to be suitable for the presently provided process, including thiophenecarboxaldehyde and furfural and such aldehydes carrying innocuous substituents. Formaldehyde and the ketones: acetone, ethyl methyl ketone and cyclohexanone are likewise useful as the carbonyl components of the reaction.

When the amido phosphorus compound is morpholinophosphonous dichloride the products prepared according to the invention from a hydrocarbon carboxaldehyde and a triorgano phosphite such as a trialkyl phosphite are bis-[1-(dialkoxyphosphinyl)alkyl]morpholinophosphonites of the formula

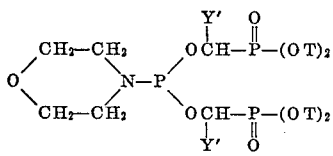

wherein Y is a hydrocarbon radical free of aliphatic unsaturation and containing from 1 to 10 carbon atoms and T is as above defined. Thus the reaction of morpholinophosphonous dichloride with acetaldehyde and triethyl phosphite gives bis[1-diethoxyphosphinyl)ethyl]morpholinophosphonite; with benzaldehyde and tributyl phosphonite said dichloride gives bis[α-(dibutoxyphosphinyl)benzyl]-morpholino phosphonite. Furfural and the thiophenecarboxaldehydes undergo the reaction in like manner, and these aldehydes as well as the hydrocarbon carboxaldehydes (which may or may not be unsaturated) may carry one or more substituents which do not react with the phosphorus-halogen reactant more rapidly than does the carbonyl group of the aldeyhde, e.g., there may be used 3,4-dichlorobenzaldehyde, 4-nitrocyclohexanecarboxaldehyde, 5-methoxyfurfural, 4-cyanocinnamaldehyde, etc. The carbonyl compound which is used with the morpholinophosphonous dichloride and the triorgano phosphite may also be one of the ketones: actone, ethyl methyl ketone or cyclohexanone.

Esters of phosphonous and phosphinous acids having at least one alkoxy or haloalkoxy radical attached to the phosphorus atom may also be reacted with the phosphorus-halogen compound and carbonylic compound in the present process. Examples of esters of phosphonous acids that may be used are, e.g., dimethyl methylphosphonite, di-n-propyl propylphosphonite, diethyl amylphosphonite, ethyl octyl propylphosphonite, diethyl 2,4-dichlorophenylphosphonite, dinonyl methylphosphonite, 2-chloroethyl butyl propylphosphonite, bis(tetrachlorohexyl)ethylphosphonite, 2-chlorobutyl 2-bromobutyl cyclohexylphosphonite, bis(6-bromoundecyl)benzylphosphonite, diethyl allylphosphonite, bis(2 - bromopropyl)4-undecenylphosphonite, bis(ethoxyethyl) ethoxyethylphosphonite, methyl ethyl 6-hexynylphosphonite, 2-chlorobutyl butyl butenylphosphonite, bis(2-chloro-6-octenyl) 6-octenylphosphonite, bis(4 - dodecynyl)4 - dodecynylphosphonite, ethyl phenyl phenylphosphonite, dibenzyl benzylphosphonite, di - 2 - butenyl 2-phenylethylphosphonite, 4-bromohexyl naphthyl 2-bromonaphthylphosphonite, methyl allyl phenylphosphonite and heptyl biphenyl biphenylylphosphonite. Examples of phosphinite esters that may be used are methyl dimethylphosphinite, isopropyl diethylphosphinite, 3-phenoxypropyl n-hexyloctylphosphinite, 2-chloroamyl dicyclophentylphosphinite, ethyl bis(4 - methoxybutyl)-phosphinite, benzyl diallylphosphinite, 2-bromopropyl bis-(2-hexynyl)phosphinite, methyl bis(4-chlorophenyl)phosphinite, ethyl phenylbenzylphosphinite, 2-chloropropyl dinaphthylphosphinite, 2-pentenyl phenylbenzylphosphinite, and methyl bis(biphenylyl)phosphinite. Mixturts of phosphite, phosphonite, and phosphinite esters may also be used.

When phosphorus trichloride or phosphorus tribromide is reacted with an alkanecarboxaldehyde, say, for example acetaldehyde, and a triorgano phosphonite ester, products prepared according to the process of this invention may be either tris[(hydrocarbyloxyhydrocarbylphosphinyl)-ethyl] phosphites, tris[(halohydrocarbyloxyhalohydrocarbylphosphinyl)ethyl] phosphites, or tris[(halohydrocarbyloxyhydrocarbylphosphinyl)ethyl]phosphites, or tris-[(hydrocarbyloxyhalohydrocarbylphosphinyl)ethyl] phosphites, depending on whether there is employed a phosphonite ester with or without halogen in either the hydrocarbyloxy or the hydrocarbyl group of the phosphonite. Thus, reaction of phosphorus trichloride, acetaldehyde, and diethyl ethylphosphonite gives tris[(ethoxyethylphosphinyl)ethyl] phosphite; and reaction of phosphorus tribromide, acetaldehyde and bis(2-chloropropyl)propylphosphonite gives tris{[(2 - chloropropoxy)propylphosphinyl]ethyl}phosphite. Similarly, tris[(allyloxyallylphosphinyl)ethyl]phosphite is obtained from phosphorus trichloride or tribromide, acetaldehyde, and diallyl allylphosphonite, whereas tris[(phenoxypropoxyphenoxypropylphosphinyl)ethyl]phosphite is obtained by reacting phosphorus trichloride or tribromide, acetaldehyde, and ethyl phenoxypropyl phenoxypropylphosphonite.

Products obtained by reacting alkanecarboxaldehydes, phosphorus trichloride or phosphorus tribromide, and phosphonite esters are those having the general formula $$P\left[-OCH-\overset{O}{\underset{R'}{\overset{\|}{P}}}-OR'\right]_3$$

where Y is the residue of the alkanecarboxaldehyde having from 1 to 10 carbons and each R' denotes a member of the group consisting of hydrocarbyl and hydrocarbyloxyhydrocarbyl radicals having from 1 to 12 carbon atoms and halogen-substitution products thereof. Thus, reaction of phosphorus tribromide, hexaldehyde, and dipropyl propylphosphonite gives tris[1-(propoxypropylphosphinyl)-hexyl]phosphite, i.e., a compound of the above formula wherein Y is pentyl, and each R' is propyl. Other compounds of the above formula which are prepared according to the present process are, e.g., tris[1-(methoxymethylphosphinyl)butyl]phosphite,
tris{1-[(2-chloropropoxy)(2-chloropropyl)phosphinyl]-octyl}phosphite,
tris{1-[(2-chlorooctyl)cyclohexylphosphinyl]decyl}-phosphite,
tris{1-[(2-butenyloxy)(2-butenyl)phosphinyl]amyl}-phosphite,
tris{1-[(6-hexynyloxy)(6-hexynyl)phosphinyl]ethyl}-phosphite,
tris[(phenoxyphenylphosphinyl)methyl]phosphite,
tris[1-(octyloxybenzylphosphinyl)-2-methylpropyl]-phosphite,
tris{1-[(2-phenylethoxy)(4-biphenylyl)phosphinyl]-butyl}phosphite,
tris{1-[(2-chloro-4-heptenyloxy)ethylphosphinyl]-metheyl}phosphite,
tris{1-[(ethoxyethoxy)(ethoxyethyl)phosphinyl]nonyl}-phosphite,
tris{1-[(dodecycloxy)(3-dodecenyl)phosphinyl]propyl}-phosphite,
tris{1-[(2-ethylhexyloxy)(2-naphthyl)phosphinyl]butyl}-phosphite,
tris{1-[(4-chlorobenzyloxy)(4-chlorobenzyl)phosphinyl]-amyl}phosphite.

Phosphonite esters may also be used with phosphorus trichloride or phosphorus tribromide and the various aldehydes described in detail for use with the triorgano phosphite esters, i.e., aldehydes which have no substituents that react with the phosphorus atom in preference to the carbonyl group. Examples of such compounds that may be prepared according to the process of this invention are:

tris[α-(hexyloxyhexylphosphinyl)furfuryl]phosphite,
tris[α-(allyloxyallylphosphinyl)thenyl]phosphite,
tris[1-(3-hexynyloxyhexylphosphinyl)-3-fluorobutyl]-phosphite,
tris{1-[(2-chlorobutoxy)(2-butenyl)phosphinyl]-4-cyano-butyl}phosphite,
tris[1-(methoxyphenylphosphinyl)-6-methoxyhexyl]-phosphite,
tris[α-(phenoxyphenylphosphinyl)benzyl]phosphite,
tris{1-[phenoxy(4-chlorophenyl)phosphinyl]3-methyl-thiopropyl}phosphite,
tris[1-(benzyloxyhexylphosphinyl)-7-(diethylamino)-heptyl]phosphite,
tris{α-[(2-chloroethoxy)ethylphosphinyl]naphthyl}-phosphite,
tris[1-(phenoxyethoxyethylphosphinyl)-4-carboethoxy-butyl]phosphite,
tris{[1-(4-chlorophenoxy)phenylphosphinyl]-2-pro-penyl}phosphite,
tris{[1-(butoxyethoxy)ethylphosphinyl]-4-ethyldithio-butyl}phosphite,
tris[(methoxyethylphosphinyl)(cyclohexyl)-2-propynyl]-phosphite.

Phosphonites react with phosphorus trichloride or phosphorus tribromide and simple ketones such as acetone, methyl ethyl ketone, and cyclohexanone as do the phosphite esters. Examples of such products prepared according to the process of this invention are:

tris[2-(ethoxyethylphosphinyl)propyl]phosphite,
tris[2-(allyloxypropylphosphinyl)butyl]phosphite,
tris{[(2-chloropropoxy)propylphosphinyl]cyclohexyl} phosphite.

Reaction of an organic phosphonous dihalide with an aldehyde and a phosphonite ester yields bis[(alkoxyalkyl-phosphinyl)methyl] hydrocarbylphosphonites when a hydrocarbylphosphonous dichloride or dibromide and a dialkkyl alkylphosphonite are used with formaldehyde as the aldehyde or bis{[(haloalkoxy)alkyphosphinyl]methyl} hydrocarbylphosphonites when the hydrocarbylphosphonous dihalide, a bis(haloalkyl)alkylphosphonite and formaldehyde are used. Generally, the compounds have the formula

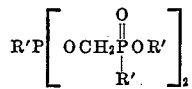

wherein R' is selected from the class consisting of hydrocarbyl and hydrocarbyloxyhydrocarbyl radicals having from 1 to 12 carbon atoms, and such radicals having halogen substitution.

A few additional examples of products obtained according to this invention when hydrocarbylphosphonous dichlorides or dibromides are reacted with aldehydes and phosphonite esters are:

bis[1-(propoxypropylphosphinyl)hexyl]phenylphos-phonite,
bis[α-(allyloxyethylphosphinyl)benzyl]ethylphosphonite,
bis{1-[(2-chlorobutoxy)butylphosphinyl]octyl}-2-pro-pynylphosphonite,
bis{1-[(6-hexynyloxy)(6-hexynyl)phosphinyl]amyl} cyclohexylphosphonite,
bis{α-[(butenyloxy)phenylphosphinyl]-4-chlorobenzyl} 1-naphthylphosphonite,
bis[1-(phenoxyphenylphosphinyl)-3-cyanopropyl]2-pro-penylphosphonite,
bis[1-(dodecycloxydodecyclophosphinyl)ethyl]biphenyl-ylphosphonite,
bis{α-[(ethoxyethoxy)(ethoxyethyl)phosphinyl]furfuryl} butadienylphosphonite,
bis{α-[2-chloroethoxy)ethylphosphinyl]-3-methylthenyl} 2-pentenylphosphonite.

Reaction of a hydrocarbyloxyphosphorous dihalide or a hydrocarbylthiophosphonous dihalide with an aldehyde and a phosphonite proceeds in a manner identical to that when a hydrocarbylphosphonous dihalide is used. Examples of products prepared when hydrocarbyl-oxyphosphonous dichloride or dibromide is reacted with various aldehydes and various phosphonite esters are bis[1-(propoxypropylphosphinyl)ethyl]ethyl phosphite,
bis[α-(decycloxyallylphosphinyl)benzyl] phenyl phosphite,
bis{1-[(4-dodecenyloxy)(4-dodecenyl)phosphinyl]-4-butoxyoctyl} propyl phosphite,
bis{α-[(3-bromohexyloxy)(hexyl)phosphinyl]furfuryl} 3-heptenyl phosphite.

When phosphonites are reacted with phosphorodihali-dothioites and aldehydes, compounds are prepared having the general formula

a few examples of which are:

bis[1-(methoxymethylphosphinyl)propyl] S-ethyl phosphorothioite,
bis{[α-(6-chlorooctyloxy)(octyl)phosphinyl]benzyl} S-phenyl phosphorothioite,
bis{1-[(2-chloro-4-heptenyloxy)(4-heptenyl)phosphinyl]-nonyl} S-naphthyl phosphorothioite,
bis[α-(pentachlorophenoxyethylphosphinyl)furfuryl] S-allyl phosphorothioite.

Phosphonite esters react with phosphorohalidites and carbonyl compounds in the same manner as do phosphite esters except that the compounds thus prepared by the present process have the formula

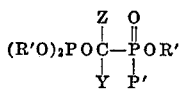

where R', Y and Z are as above defined. When dihydrocarbyl phosphorochloridites are reacted with hydrocarbylcarboxaldehydes and phosphonite esters, the compounds prepared are (hydrocarbyloxyhydrocarbylphosphinyl)hydrocarbyl dihydrocarbyl phosphites, examples of which are:

1-(propoxypropylphosphinyl)ethyl dihexyl phosphite,
α-[(2-chloroethoxy)(ethyl)phosphinyl]benzyl dinaphthyl phosphite, and
1-(allyloxypropylphosphinyl)decyl phenyl 2-chloroethyl phosphite.

When a phosphonite ester is reacted with a phosphorohalidodithioite and an aldehyde, the product obtained has the general formula $$\text{(R'S)}_2\text{POC}-\overset{\overset{\displaystyle Z}{|}}{\underset{\underset{\displaystyle Y}{|}}{}}\overset{\overset{\displaystyle O}{\|}}{\underset{\underset{\displaystyle R'}{|}}{P}}\text{OR'}$$

where R', Y and Z are as above defined. A few examples of such compounds are 1-(phenoxyphenylphosphinyl)-2-propyl S,S-diethyl phosphorodithioite,
α-[(2-bromooctyloxy)ethylphosphinyl]benzyl S-phenyl S-hexyl phosphorodithioite, and
1 - [(2 - butenyloxy)(2 - butenyl)phosphinyl] - 2 - ethylhexyl S,S-didodecyl phosphorodithioite.

Similarly, when the phosphorus halide is a phosphorohalidothioite, the products have the formula $$\text{R'OPOC}-\overset{\overset{\displaystyle Z}{|}}{\underset{\underset{\displaystyle Y}{|}}{}}\overset{\overset{\displaystyle O}{\|}}{\underset{\underset{\displaystyle R'}{|}}{P}}\text{OR'}$$
$$\text{R'S}$$

wherein R', Y and Z are as herein defined, e.g., they are O - hydrocarbyloxyhydrocarbylphosphinylhydrocarbyl O-hydrocarbyl S-hydrocarbyl phosphorothioites when there are used an O-hydrocarbyl S-hydrocarbyl phosphorochloridothioite, a hydrocarbylcarboxaldehyde, and a dialkyl alkylphosphonite. Examples are:

O-[1 - (butoxybutylphosphinyl)ethyl] O - ethyl S - ethyl phosphite,
O-[α-(isopropenyloxypropylphosphinyl)benzyl] O-decyl S-decyl phosphite, and
O - {[(2 - chloroethoxy)ethylphosphinyl]methyl} O - biphenyl S-ethyl phosphite.

Similarly, when phosphonites are reacted with a phosphinous chloride or bromide and an aldehyde, the compounds prepared have the formula $$\text{R'}_2\text{POC}-\overset{\overset{\displaystyle Z}{|}}{\underset{\underset{\displaystyle Y}{|}}{}}\overset{\overset{\displaystyle O}{\|}}{\underset{\underset{\displaystyle R'}{|}}{P}}\text{OR'}$$

wherein R', Y and Z are as above defined. Thus, when diallyl ethylphosphonite is reacted with dihexylphosphinous chloride and propionaldehyde, 1-(allyloxyethylphosphinyl)propyl dihexylphosphinite is obtained.

Products having the formula $$\text{R'OPOC}-\overset{\overset{\displaystyle Z}{|}}{\underset{\underset{\displaystyle Y}{|}}{}}\overset{\overset{\displaystyle O}{\|}}{\underset{\underset{\displaystyle R'}{|}}{P}}\text{OR'}$$
$$\text{R'}$$

wherein R', Y and Z are as above defined, are obtained when phosphonites are reacted with a hydrocarbyl hydrocarbylphosphonohalidite and a carbonyl compound. A few examples are:

1-(ethoxyethylphosphinyl)cyclohexyl nonyl nonylphosphonite,
α-[(2-ethylhexyloxy)(4-hexenyl)phosphinyl]benzyl ethyl 2-phenoxyethylphosphonite, and
1 - (trichlorophenoxyphenylphosphinyl)decyl naphthyl naphthylphosphonite.

Examples of products obtained when phosphonites are reacted with a S-hydrocarbyl hydrocarbylphosphonohalidite and a carbonyl compound are:

1-(dodecyloxydodecylphosphinyl)-2-propenyl S-butyl 2-butenyl-phosphonothioite,
α - [(2 - chloropropoxy)(propyl)phosphinyl] thenyl S-phenyl ethylphosphonothioite, and
1-(allyloxyallylphosphinyl)-4-methoxybutyl S-(6-octynyl) octynylphosphonothioite.

Phosphonite esters also react with cyclic esters of phosphorochloridic and phosphorobromidic acids and carbonyl compounds according to the process of this invention to prepare useful compounds. Thus 2-bromo-1,3,2-dioxaphospholane as the cyclic ester halide, a phosphonite ester, and an aldehyde as the carbonylic compound yields 2 - (hydrocarbyloxyhydrocarbylphosphinylhydrocarbyloxy)-1,3,2-dioxaphospholanes, i.e., compounds having the formula $$\begin{array}{c}\text{CH}_2-\text{O}\\|\\\text{CH}_2-\text{O}\end{array}\!\!\!\diagdown\!\!\!\text{POCHP}\!\!\!\overset{\overset{\displaystyle O}{\|}}{\underset{\underset{\displaystyle R''}{|}}{}}\text{OR''}$$

wherein R'' is as defined above and Y is the —CHO free residue of the aldehyde component. Additional examples of similar cyclic esters are:

2 - [1 - (allyloxypropylphosphinyl) - 2 - butenyloxy]-1,3,2-dioxaphosphorinane,
2 - [α - (phenoxyethylphosphinyl)naphthyloxy] - 1,3,2-dioxaphosphepane, and
2 - {1 - [(2 - chloropropoxy)(propyl)phosphinyl] - 2 - ethylhexyloxy} - 5,5 - dimethyl - 1,3,2 - dioxaphosphorinane.

Phosphonites react with nitrogenous trivalent phosphorus halides and carbonyl compounds as do triorgano phosphites. A few examples of compounds prepared according to the process of this invention involving the reaction of a phosphonite, a carbonyl compound, and a nitrogenous trivalent phosphorus halide are given below. The compounds are similar to those prepared as indicated above in describing the triorgano phosphite reactions except that here the phosphonite residue replaces the phosphite residue.

When a phosphonite is reacted with an aldehyde, say, acetaldehyde, and a dihydrocarbylphosphoramidous dichloride, compounds are obtained having the formula $$\begin{bmatrix}\text{A'NP}\\|\\\text{A''}\end{bmatrix}\begin{bmatrix}\text{OCHP}\overset{\overset{\displaystyle O}{\|}}{\underset{\underset{\displaystyle R'}{|}}{}}\!\!\!\diagup\!\!\!\overset{\text{OR'}}{}\\|\\\text{CH}_3\end{bmatrix}_2$$

wherein A' is an alkyl radical having from 1 to 5 carbon atoms, A'' is selected from the class consisting of A' and benzenoid radicals having from 6 to 7 carbon atoms, and each R' is as defined above. Examples of such compounds are:

bis[1 - (phenoxyphenylphosphinyl)butyl] diethylphosphoramidite
bis{α - [(2 - bromoethoxy)ethylphosphinyl]benzyl} propylphenylphosphoramidite, and
bis[1 - (allyloxyallylphosphinyl) - 4 - carboethoxybutyl] dimethylphosphoramidite.

When the phosphonites are reacted with an N-heterocyclic phosphonous dichloride and a carbonyl compound, the products obtained have the general formula $$\text{D}\!\!\!\diagup\!\!\!\text{NP}\begin{bmatrix}\text{OCPOR'}\overset{\overset{\displaystyle Z O}{| \|}}{\underset{\underset{\displaystyle YR'}{| }}{}}\end{bmatrix}_2$$

in which D represents the necessary atoms to make up a saturated N-hetero ring of from 3 to 6 members and Z, Y and R' are as herein defined. Examples of such compounds are:

bis{1 - [(4 - bromooctyloxy)(octyl)phosphinyl]propyl}-piperidinophosphonite,
bis[α - (phenoxyethylphosphinyl)benzyl]pyrrolidinophosphonite, and bis{[1 - (4 - heptenyloxy)(4 - heptenyl)phosphinyl]cyclohexyl}morpholinophosphonite.

As stated above, esters of phosphinous acid, i.e., phosphorous esters having two P-C bonds and one alkoxy or haloalkoxy radical attached to the phosphorous atom, may also be used in the process of the present invention. When such esters are used the compounds prepared will have a general formula of the type

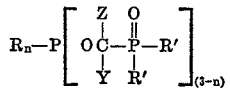

wherein R, R', Y, Z, and $n$ are as defined above. The phosphinite ester, the trivalent phosphorous halide, and the carbonyl compound react according to the equations given above, giving the dihydrocarbylphosphinylhydrocarbyl ester of the trivalent phosphorus halide reactant and a halide by-product. The types of radicals attached to the phosphorus atom of the phosphinite reactant can be the same types as those described above as being attached to the phosphorous atom of the phosphonite reactants, except that, of course, they are not attached to the phosphorus atom through an oxygen atom. The phosphinites may be reacted with the same phosphorus halide reactants and the same carbonyl compounds as was illustrated above for the phosphite and phosphinite ester reactants. Therefore, to avoid undue repetition, only a few examples of some of the simple types of products obtained according to this invention are given to illustrate the proudcts obtained when phosphinite esters are reacted with trivalent phosphorous halides and carbonyl compounds.

When phosphinite esters, say for example, an alkyl dialkylphosphinite ester is reacted with phosphorous trichloride or phosphorus tribromide and an aldehyde, say propionaldehyde, the product obtained is tris[1-(dialkylphosphinyl)propyl] phosphite. Other examples are tris-[1-(diethylphosphinyl)ethyl]phosphite and tris[1-(allylphenylphosphinyl)-2-ethylhexyl]phosphite.

When the phosphinite esters are reacted with a carbonyl compound and a phosphorous dichloride or dibromide reactant, the remaining valence of which is satisfied by a hydrocarbyl, hydrocarbyloxy, hydrocarbylthio radical or such a radical carrying halogen substitution, or a dihydrocarbylamido radical or an N-heterocyclic radical, the products obtained have two phosphinyl groups, for example, bis[1-(dipropylphosphinyl)hexyl]ethylphosphonite,
bis[α-(diallylphosphinyl)benzyl]hexyl phosphite,
bis{1-[bis(3-methylbutyl)phosphinyl]2-propenyl} S-naphthylphosphorothioite,
bis{α - [(2 - butenyl)phenylphosphinyl]furfuryl}diethylphosphonamidite.
bis[1 - (dibenzylphosphinyl) - 4 - chlorobutyl]dimethylphosphoramidite,
bis[α - (dimethylphosphinyl) - 4 - ethoxybenzyl]morpholinophosphonite.

Examples of products obtained according to the process of this invention when a phosphinite ester is reacted with a carbonyl compound and a monochloro or monobromo trivalent phosphorus reactant are:

1-(didodecylphosphinyl)hexyl diphenylphosphinite,
α-[(4-bromophenyl)phenylphosphinyl]naphthyl dihexyl phosphite,
1-[bis(ethoxyethyl)phosphinyl]pentadecyl S,S,-diphenyl phosphorodithioite,
α-(dihexylphosphinyl)-p-tolyl methyl methylphosphonite,
1-[bis(3-hexynyl)phosphinyl]ethyl S-decyl decylphosphonothioite,
1-[(4-ethylphenyl)propylphosphinyl]tridecyl O-biphenylyl S-phenyl phosphorothioite,
2 - [1 - dipropylphosphinyl)octyloxy] - 1,3,2 - dioxaphosphorinane, and 2-(diethylphosphinyl)propyl ethyl (N-diethyl)phosphonamidite.

Reaction of the trivalent phosphorus halogen compound, the carbonyl compound and the triorgano phosphorus ester takes place readily by mixing together the three reactants at ordinary, decreased, or increased temperatures and allowing the resulting reaction mixture to stand until formation of the trivalent phosphorus ester of an α-hydroxy phosphorus ester. Thus, the two phosphorus-containing compounds may be first mixed together and the carbonyl compound added to the resulting mixture, or the aldehyde and the triorgano phosphorus ester may first be mixed and the phosphorus-halogen compound added thereto. In a continuous process, one of the three reactants is added to a mixture of the other two reactants while separating the product. Because the reaction may be exothermic, gradual contact of the reactants is usually recommended in order to obtain smooth reaction. However, as will be apparent to those skilled in the art, the exothermal nature of the reaction becomes less of a factor as the molecular weight of the reactants, and particularly of the triorganophosphorus ester, is increased. Also, when the aldehyde is either a higher alkanecarboxyldehyde or an aralkyl or alkaryl aldehyde, reaction is generally not so rapid as it is with the lower aliphatic aldehydes or with benzaldehyde. It is thus recommended that in each initial run, the three reactants be mixed gradually at low temperatures and that external heating be employed only when there appears no spontaneous increase in temperature as a consequence of the mixing. In most instances, the reaction is mildly exothermic initially. Whether the reaction goes to completion without the use of extraneous heat is determined by the nature of the reactants. Completion of the reaction, in any event, can be readily ascertained by noting cessaiton in change of viscosity, refractive index, or the quantity of by-product alkyl or haloalkyl halide. Using the lower alkanecarboxaldehydes, which aldehydes are generally very reactive, external cooling is usually advantageous. When working with such active aldehydes optimum conditons comprise gradual addition of the aldehyde to the mixture of phosphite and phosphorus-halogen compound with application of external cooling and thorough stirring. Usually it suffices to maintain the reaction temperature at, say, from 10° C. to 50° C. during addition of the aldehyde. When all of the aldehyde has been added to said mixture and there is no longer any evidence of exothermic reaction, completion of the reaciton may be assured by heating the reaction mixture to a temperature of from, say, 50° C. to 150° C. With the more sluggish aldehydes, e.g., 2-phenylacetaldehyde or lauraldehyde, it may be necessary to heat the reaction mixture moderately, say, to a temperature of about 50° C. before an exothermic reaction is initiated. Employing naphthaldehyde as the aldehyde reactant and a high molecular weight phosphite and phosphorus-halogen compound, even higher temperatures may be required, e.g., temperatures of from 100° C. to 150° C. appear to give the best yields.

The reactants are advantageously employed in stoichiometric proportions, i.e., one of the phosphorus-halogen compound in which halogen is linked to the phosphorus atom and substantially one mole each of the carbonylic compound and of the triorgano phosphorus ester per halogen atom present in said phosphorus-halogen compound. Thus with a phosphorus trihalide such as phosphorus trichloride there are advantageously used three moles each of carbonyl compound and triorgano phosphite; with a dihalide, e.g., an alkyl phosphorochloridite (alkyl-O-PCl$_2$), there are used two moles each of carbonyl compound and triorgano phosphite; and with a monohalide, e.g., a diarylphosphinous chloride (aryl$_2$PCl)

there are used one mole each of the carbonyl compound and triorgano phosphite. While, as will be appreciated by those skilled in the art, said stoichiometric proportions are advantageously employed in that thereby good yields of desired product result and there arises substantially no problem of separating any excess reactant or reactants, the carbonyl compound and the triorgano phosphite may generally be present in excess with respect to said phosphorus halogen compound. However, when the phosphorus halogen compound has attached to the phosphorus atom thereof at least one alkoxy or substituted alkoxy group the use of a substantial excess of the phosphorus halogen compound and a corresponding excess of the carbonyl compound with respect to the triorgano phosphorus ester will lead to the formation of higher condensation products having a plurality of phosphorus ester groups. The use of such substantial excesses of the phosphorus halogen compound and of the carbonyl compound and the condensation products thereby obtained form the subject of my copending application Serial No. 820,618, filed June 16, 1959.

Formation of the presently desired product, i.e., the trivalent phosphorus ester of an α-hydroxy phosphorus ester is accompanied by the formation of a halogenated alkane as a by-product. Thus, the reaction of, say, diphenyl phosphorochloridite, acetaldehyde and triethyl phosphite gives ethyl chloride as a by-product:

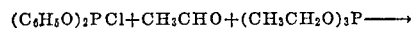

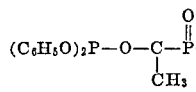

The by-product thus consists of one of the alcohol residues of the triorgano phosphorus ester reactant plus the halogen atom present in the initially employed phosphorus halogen compound. This by-product is readily removed from the desired product by volatilization. The by-product halogenated alkanes which are obtained when the phosphorus ester is one which is derived from an alkanol or a haloalkanol, are generally articles of commerce for which many applications exist. Thus, while many currently employed processes for the manufacture of organic compounds of phosphorus entail substantial waste of halogen in that by-products of little commercial importance are often formed, in the present instance all of the halogen constituent of the raw materials can be converted to products of economic importance.

The process of the present invention is readily conducted in the absence of an inert diluent or catalyst. However, catalysts and diluents or solvents may be employed. The use of diluents may be particularly advantageous when working with the highly active aldehydes; such diluents may be, e.g., benzene, toluene, dioxane, methylene chloride, or hexane. When employing no diluent and using substantially the stoichiometric proportion of reactants, the reaction product may be used directly for a variety of industrial and agricultural purposes without purification, i.e., it consists essentially of the trivalent phosphorus ester of an α-hydroxy phosphonate dissolved in the halogenated alkane which is produced as a by-product in the reaction.

The compounds generally provided by this process are stable, usually high-boiling materials which range from viscid liquids to waxy or crystalline solids. They are advantageously used as biological toxicants, e.g., as insecticides, fungicides, nematocides and bacteriostats; as hydrocarbon oil lubricants and gasoline additives; as functional fluids, e.g., in force-transmission media and dielectric applications; as plasticizers for synthetic resins and plastics; as rubber-compounding chemicals; and as flame-proofing agents for cellulosic and carbonaceous combustible materials, e.g., synthetic resins and polymeric materials, generally.

The invention is further illustrated by, but not limited to, the following examples.

Example 1

To a mixture consisting of 150.5 g. (0.45 mole) of tri-n-hexyl phosphite and 47.8 g. (0.45 mole) of benzaldehyde there was added, during about 12 minutes, with cooling, 20.6 g. of phosphorus trichloride. When all of the aldehyde had been added and cooling discontinued, the temperature of the reaction mixture rose spontaneously to 52° C. The whole was then warmed to 90–100° C. for 30 minutes and subsequently allowed to stand overnight at room temperature. Concentration of the resulting reaction mixture to a pot temperature of 100° C./0.05 mm., gave 52.9 g. (97.5% of theory) of by-product n-hexyl chloride in the Dry-Ice trap which formed a part of the equipment and, as residue, 166.3 g. of the substantially pure, almost colorless, viscous tris[α-(di-n-hexyloxyphosphinyl)benzyl] phosphite, of the structure

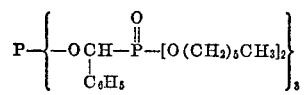

Example 2

To a mixture consisting of 265.2 g. (1.0 mole) of tris(2-chloroethyl) phosphite and 58 g. (1.0 mole) of propionaldehyde there was gradually added 45.8 g. (0.333 mole) of phosphorus trichloride. The exothermic reaction mixture was maintained at below 25° C. by ice-cooling. When all of the chloride had been added, the reaction mixture was warmed to 90° C., cooled to 40° C., placed under water-pump vacuum, and warmed to 81° C. to remove by-product 1,2-dichloroethane and any unreacted material. Concentration to a pot temperature of 150° C./1 mm., gave as residue 289.5 g., $n_D^{25}$ 1.4901, of the substantially pure tris{1-[bis(2-chloroethoxy)-phosphinyl]propyl} phosphite of the structure

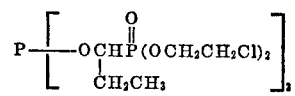

Example 3

To a mixture consisting of 68.7 g. of phosphorus trichloride and 445 g. of tris(2-chloroethyl) phosphite there was added, during a 20-minute period, 70 g. of acetaldehyde while maintaining the temperature of the reaction mixture at 8–20° C. The colorless reaction mixture was then warmed to 50° C., a 4 g. test sample was removed from the reaction mixture, and the remainder was concentrated to a pot temperature of 180° C./0.01 mm. By-product ethylene dichloride and excess tris(2-chloroethyl) phosphite collected in the Dry Ice trap during concentration. There was thus obtained as residue 401.8 g. of the substantially pure, colorless, viscous tris{1-[bis-(2-chloroethoxy)phosphinyl]ethyl} phosphite of the structure

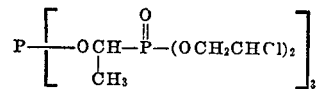

Example 4

To an ice-cooled mixture of 34.6 g. (0.6 mole) of acetone and 83 g. (0.5 mole) of triethyl phosphite there was added, during 0.2 hour, 22.8 g. (0.166 mole) of phosphorus trichloride. After warming the whole to a maximum temperature of 92° C. and maintaining it at 90–92° C. for 0.5 hour, it was distilled to remove material boiling below a pot temperature of 108° C./0.7 mm. There was thus obtained as residue 97.2 g. (95% theoretical yield) of the substantially pure tris[2-(diethoxyphosphinyl)-2-propyl] phosphite, analyzing 40.39% carbon and 7.83% hydrogen as against 41.0% and 7.9% the calculated values, and having the structure

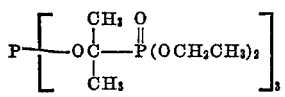

Example 5

To an externally ice-cooled mixture consisting of 265.2 g. (1.0 mole) of tris(2-chloroethyl) phosphite and 89.5 g. (0.5 mole) of phenylphosphonous dichloride there was added, during 0.3 hour, 64.5 g. of propionaldehyde. The temperature of the reaction mixture during the aldehyde addition was maintained at 18–20° C. When all of the aldehyde had been added, the reaction mixture was warmed to 90° C., cooled to 40° C., and placed under water-pump vacuum and warmed to 80° C. in order to remove by-products. Concentration to a pot temperature of 150° C./2.6 mm., gave as residue 313.0 g. (100% theoretical yield) of the substantially pure bis{1 - [bis(2 - chloroethoxy)phosphinyl] propyl} phenylphosphonite, $n_D^{25}$ 1.5170, analyzing 38.22% carbon and 5.39% hydrogen as against 37.8% and 5.23% the calculated values, and having the structure

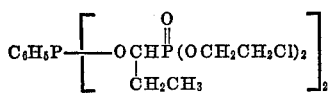

Example 6

To a mixture consisting of 62.7 g. (0.35 mole) of phenylphosphonous dichloride and 234 g. (0.70 mole) of trihexyl phosphite there was gradually added 74.3 g. (0.70 mole) of benzaldehyde. The reaction mixture was cooled moderately in order to maintain the temperature below 35° C. When no further rise in temperature was evidenced, it was slowly warmed to 97° C. and finally concentrated to a pot temperature of 183° C./1 mm. There was thus obtained as residue 273 g. (95% theoretical yield) of the substantially pure bis[α-(dihexyloxyphosphinyl) benzyl] phenyl phosphonite, $n_D^{25}$ 1.5068, of the structure

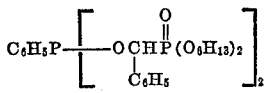

Example 7

To a mixture consisting of triethyl phosphite (10.0 g., 0.06 mole) and 4.6 g. (0.079 mole) of propionaldehyde there was added under a nitrogen atmosphere and with cooling, 4.49 g. (0.028 mole) of n-butylphosphonous dichloride at a temperature of 9–15° C. during a time of about 6 minutes. The colorless reaction mixture was warmed to 70° C., transferred to a distilling flask, and concentrated to a pot temperature of 110° C./0.3 mm., to give as residue 12.0 g. (90% theoretical yield) of the substantially pure bis[1-(diethoxyphosphinyl)propyl] n-butylphosphonite of the formula

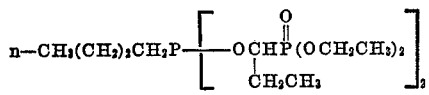

Example 8

To a mixture consisting of 30.9 g. (0.70 mole) of acetaldehyde and 181.9 g. (0.675 mole) of tris(2-chloroethyl) phosphite, there was added, during 20 minutes at a temperature of 10–20° C., 62.4 g. (0.32 mole) of phenyl phosphorodichloridite. When all of the chloridite had been added, the reaction mixture was stirred, with ice-cooling, for 15 minutes and then at room temperature for another 15 minutes. It was then heated to 70° C. in order to insure complete reaction, placed under water-pump vacuum, and heated to 105° C. to remove by-product, 1,2-dichloroethane and any unreacted material. Concentration to 120° C./1.0 mm., gave as residue 219 g. of the substantially pure bis{1 - [bis-(2-chloroethoxy)phosphinyl] ethyl} phenyl phosphite, $n_D^{25}$ 1.5067, analyzing 34.02% carbon and 4.87% hydrogen as against 34.69% and 4.69%, the calculated values, and having the structure

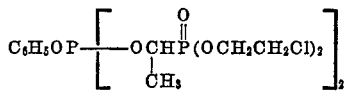

Example 9

Acetaldehyde (26.4 g., 0.6 mole) was added to 62.0 g. (0.5 mole) of trimethyl phosphite in an ice-cooled flask. To the resulting mixture there was then added 49.1 g. (0.2 mole) of p-chlorophenyl phosphorodichloridothioite during about 10 minutes while maintaining the temperature at 5–10° C. When external cooling was discontinued, the temperature rose spontaneously to 47° C. The addition of 5 g. more of the acetaldehyde caused no further heat of reaction. Accordingly, the colorless reaction mixture was warmed to 70° C. and concentrated to 98° C./0.5 mm., to give as residue 90.1 g. (94% theoretical yield) of the substantially pure bis-[1-(dimethoxyphosphinyl)ethyl] S-p-chlorophenyl phosphorothioite, $n_D^{25}$ 1.5451, and having the structure

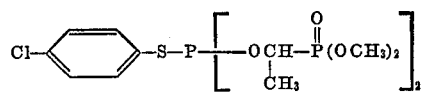

Example 10

To a cooled (1° C.) mixture consisting of 84.7 g. (0.682 mole) of triethyl phosphite and 40 g. (0.91 mole) of acetaldehyde there was added, during 15 minutes, 50 g. (0.341 mole) of ethyl phosphorodichloridite. During the addition, the temperature of the mixture was maintained at 15–17° C. The whole was then stirred, with cooling, for 45 minutes and for another 45 minutes in the absence of external cooling (temperature reached 37° C.). It was finally heated to 80° C. in order to insure complete reaction. Volatile by-products and impurities were removed by subjecting the reaction mixture to water-pump vacuum and heating it to 100° C. Concentration of the residue to 110° C./0.8 mm., gave 110.5 g. (84.5% theoretical yield) of the substantially pure bis[1-diethoxyphosphinyl)ethyl] ethyl phosphite of the structure

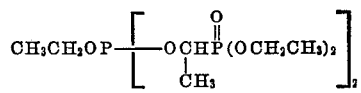

Example 11

To a cooled mixture of 37.1 g. (0.35 mole) of benzaldehyde and 58.2 g. (0.35 mole) of triethyl phosphite, there was added, during 0.2 hour at 10–25° C., 22.1 g. (0.15 mole) of ethyl phosphorodichloridite. When all of the chloridite had been added, external cooling was discontinued and the temperature of the reaction mixture was noted to increase spontaneously to 59° C. Completion of the reaction was effected by warming the mixture to 75° C. Distillation in vacuo to remove material boiling below 36° C./1 mm., gave as residue 79.9 g. of the substantially pure bis[α - (diethoxyphosphinyl)benzyl] ethyl phosphite, $n_D^{25}$ 1.5101, of the structure

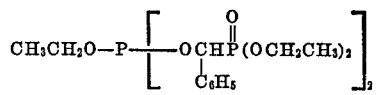

The presently provided phosphite analyzed as follows:

|  | Found | Calcd. for $C_{24}H_{37}O_9P_3$ |
| --- | --- | --- |
| Percent C | 51.12 | 51.3 |
| Percent H | 6.72 | 6.6 |
| Percent P | 16.56 | 16.5 |

Example 12

To a mixture consisting of 59.9 g. (0.36 mole) of triethyl phosphite and 91.0 g. (0.36 mole) of diphenyl phosphorochloridite, there was added, dropwise, 21.0 g. (0.36 mole) of propionaldehyde. The temperature rose exothermally to 38° C., at which point ice-cooling was applied and the remainder of the aldehyde was added while maintaining the temperature at from 20–25° C. When all of the aldehyde had been added, the reaction mixture was heated to 70° C. in order to insure complete reaction. By-product ethyl chloride and any unreacted material were removed by placing the reaction mixture under water-pump vacuum and heating it to 100° C. Concentration to a pot temperature of 176° C./0.2 mm., gave as residue 139.5 g. (94% theoretical yield) of the substantially pure diphenyl phosphite of diethyl (1-hydroxypropyl)-phosphonate, $n_D^{25}$ 1.5222, analyzing 55.00% carbon and 6.48% hydrogen, as against 55.39% and 6.36%, the calculated values, and having the structure

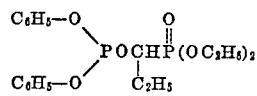

Example 13

Acetaldehyde (21.2 g., 0.48 mole) was added, dropwise, to a mixture consisting of 121.1 g. (0.45 mole) of tris(2-chloroethyl) phosphite and 108.8 g. (0.43 mole) of diphenyl phosphorochloridite. During addition of the aldehyde, the temperature was maintained, by ice-cooling, at from 21–23° C. When all of the aldehyde had been added, stirring was continued, first with cooling and subsequently at room temperature, until cessation in temperature rise. The reaction mixture was then heated to 80° C. in order to insure complete reaction, placed under water-pump vacuum and heated to 100° C. in order to remove by-product 1,2-dichloroethane and any unreacted material, and finally concentrated to 170° C./0.6 mm. There was thus obtained as residue 210.4 g. of the substantially pure 1-[bis(2-chloroethoxy)phosphinyl]ethyl diphenyl phosphite, $n_D^{25}$ 1.5351, of the following structure

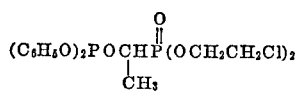

Example 14

Diphenyl phosphorochloridite (78.2 g., 0.31 mole) was added, dropwise, to a mixture consisting of 132.9 g. (0.31 mole) of tris(2-ethylhexyl) phosphite and 29.2 g. (0.31 mole) of benzaldehyde. During addition to the chloridite, the temperature of the reaction mixture rose spontaneously to 35° C., at which point cooling was applied and the remainder of the chloridite was added at a temperature of 27–35° C. The reaction mixture was then stirred without external cooling until cessation in temperature rise. The reaction was completed by heating to 105° C., and by-product 2-ethylhexyl chloride and any unreacted material was removed by subjecting the mixture to water-pump vacuum and heating it to 120° C. Concentration to 160° C./1.0 mm., gave as residue 195 g. (100% theoretical yield) of the substantially pure diphenyl phosphite of bis(2-ethylhexyl) (α-hydroxybenzyl)-phosphonate, $n_D^{25}$ 1.5150, analyzing 65.26% carbon and 8.11% hydrogen as against 66.91% and 8.01%, the calculated values, and having the structure

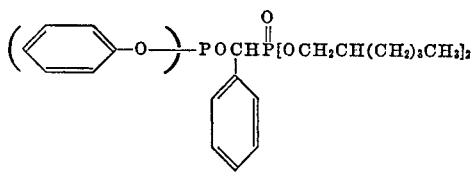

Example 15

Triethyl phosphite (26.6 g., 0.16 mole) was added to a solution of 49.5 g. (0.14 mole) of bis(p-chlorophenyl) phosphorochloridodithioite in 75 ml. of benzene. To the resulting mixture there was gradually added, with cooling, 11.6 g. (0.2 mole) of propionaldehyde. The temperature of the reaction mixture during the addition of the aldehyde was maintained at from 18° C. to 35° C. When all of the aldehyde had been added, the mixture was warmed to 44° C. and an additional 5 g. portion of the propionaldehyde was added. This caused a rapid rise to 47° C. The reaction mixture was then refluxed (68–75° C.) for 0.5 hour, cooled to 25° C., and concentrated to a pot temperature of 105° C./0.1 mm., to give 75.1 g. (theory, 71.8 g.) of the substantially pure bis(S-p-chlorophenyl) phosphorodithioite of diethyl (1-hydroxypropyl)-phosphonate, analyzing 14.23% Cl and 11.66% S as against 13.8% and 12.5%, the calculated values for $C_{19}H_{24}Cl_2O_4P_2S_2$, and having the formula

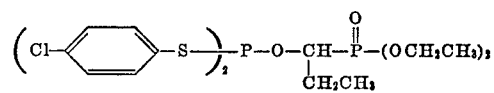

Example 16

To an ice-cooled mixture consisting of 22.1 g. (0.10 mole) of diphenylphosphinous chloride and 16.6 g. (0.10 mole) of triethyl phosphite there was added, during 6 minutes, 7.0 g. (0.12 mole) of propionaldehyde. Heat of reaction was evidenced during the addition, and when cooling was discontinued, the reaction temperature rose spontaneously to 33° C. The colorless reaction mixture was warmed to 65° C. and then concentrated to a pot temperature of 82° C./0.05 mm., to give 37.5 g. (99% theoretical yield) of the substantially pure diphenylphosphinite of diethyl (1-hydroxypropyl)phosphonate of the structure

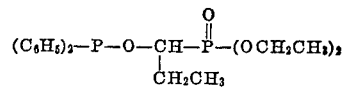

The present compound analyzed as follows:

|  | Found | Calcd. for $C_{19}H_{26}O_4P_2$ |
|---|---|---|
| Percent C | 59.07 | 60.0 |
| Percent H | 7.03 | 6.9 |

Example 17

To 166 g. of an ice-cooled mixture consisting of substantially equimolar quantities of tris(2-chloroethyl) phosphite and bis(2-chloroethyl) phosphorochloridite there was added, dropwise, 35 g. (0.333 mole) of benzaldehyde. The resulting reaction mixture was warmed to 90° C., placed under water-pump vacuum and heated to 130° C. in order to remove by-product 1,2-dichloroethane and any unreacted material, and finally distilled to remove material boiling below 150° C./0.6 mm. There was thus obtained as residue 167.8 g. (100% theoretical yield) of the substantially pure bis (2-chloroethyl) phosphite of bis(2-chloroethyl) (α-hydroxybenzyl)phosphonate, $n_D^{25}$ 1.5249, of the structure

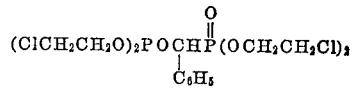

The presently obtained phosphonate analyzed as follows:

|  | Found | Calcd. for $C_{15}H_{22}Cl_4O_6P_2$ |
|---|---|---|
| Percent C | 35.77 | 35.9 |
| Percent H | 4.54 | 4.4 |
| Percent Cl | 27.91 | 28.2 |
| Percent P | 12.22 | 12.35 |

Example 18

A portion (216.6 g.) of a substantially equimolar mixture of bis(2-chloropropyl) phosphorochloridite and tris(2-chloropropyl) phosphite was charged to a reaction vessel and there was added thereto, dropwise and with stirring, 22.3 g. (0.382 mole) of propionaldehyde. The temperature of the reaction mixture was maintained at 24–28° C. by ice-cooling. After addition of the aldehyde had been completed, the reaction mixture was heated to 75° C., subjected to water-pump vacuum, and heated to 100° C. in order to remove the more volatile by-products. There was thus collected 41.7 g. (96.5% of theory) of by-product 1,2 dichloro-propane. Distillation of the residue to remove material boiling below 145° C./0.25 mm., gave as residue 194.5 g. (99.5% theoretical yield) of the substantially pure bis(2-chloropropyl) phosphite of bis(2-chloropropyl) (1-hydroxypropyl)phosphonate, $n_D^{25}$ 1.4784, of the structure

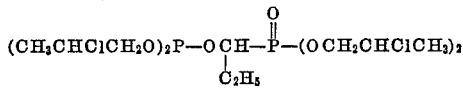

The presently provided phosphonate analyzed as follows:

|  | Found | Calcd. for $C_{15}H_{30}Cl_4O_6P_2$ |
|---|---|---|
| Percent C | 35.56 | 35.28 |
| Percent H | 5.98 | 5.93 |
| Percent Cl | 27.70 | 27.79 |

Example 19

To a substantially equimolar mixture of tris(2-bromo-3-chloropropyl) phosphite and bis(2-bromo-3-chloropropyl) phosphorobromidite prepared by the reaction of 2 moles of phosphorus tribromide with substantially 5 moles of epichlorohydrin, there was added, with cooling and during 0.1 hour, a molar equivalent of acetaldehyde based on the phosphite. During addition of the aldehyde, the temperature of the reaction mixture was maintained at 20–30° C. by cooling. When all of the aldehyde had been added, the reaction mixture was kept at below ca. 55° C. by cooling, and when there was no further evidence of exothermal reaction, the whole was warmed to 80° C. and then concentrated to 100° C./0.5 mm. There was thus obtained as residue a solution of by-product 1,2-dibromo-3-chloropropane and bis(2-bromo-3-chloropropyl) phosphite of bis(2-bromo-3-chloropropyl) (1-hydroxyethyl)phosphonate of the structure:

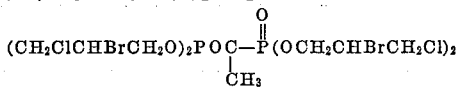

Example 20

To 249.8 g. of a substantially equimolar mixture of tris(2-bromopropyl) phosphite and bis(2-bromopropyl) phosphorobromidite there was added, with cooling, 13.3 g. (0.3 mole) of propionaldehyde, during a period of 0.3 hour, and at a temperature of 15–22° C. After addition of the aldehyde had been complete, external cooling was discontinued and the temperature rose rapidly to 29° C., whereupon cooling was resumed. When the temperature increase had ceased, cooling was discontinued and the mixture stirred at 25° C. for 45 minutes. It was then concentrated to 98° C./0.1 mm., to obtain as residue 210 g. of the substantially pure bis(2-bromopropyl) phosphite of bis(2-bromopropyl) (1-hydroxypropyl)phosphonate, $n_D^{25}$ 1.5161, analyzing 24.10% carbon and 4.30% hydrogen, as against 24.99% and 4.18%, the calculated values, and having the structure

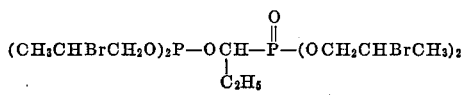

Example 21

Phenylacetaldehyde (18 g., 0.15 mole) and 110.5 g. of a substantially equimolar mixture of bis(2,3-dichloropropyl) phosphorochloridite and tris(2,3-dichloropropyl) phosphite were placed in a 500 cc. flask and stirred. The temperature increased spontaneously to 44° C. The reaction mixture was then warmed to 90° C. and concentrated to a pot temperature of 150° C./1.0 mm., to give as residue 118.0 g. of the substantially pure bis(2,3,dichloropropyl) phosphite of bis(2,3-dichloropropyl) (1-hydroxy-2-phenylethyl)phosphonate, $n_D^{25}$ 1.5304, and having the structure

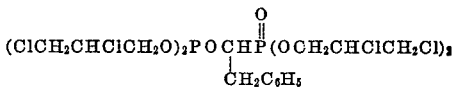

Example 22

To 147.5 g. of a substantially equimolar mixture of bis-(2,3-dichloropropyl) phosphorochloridite and tris(2,3-dichloropropyl) phosphite there was added, with cooling during 0.2 hour, 24.5 g. of propionaldehyde. When addition was complete, the reaction mixture was warmed to 120° C. and concentrated to a pot temperature of 150° C./1.0 mm., to give as residue 138 g. of the substantially pure bis(2,3-dichloropropyl) phosphite of bis(2,3-dichloropropyl) (1 - hydroxypropyl)phosphonate, $n_D^{25}$ 1.5044, and having the structure

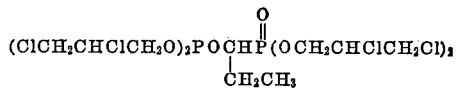

Example 23

To 243.8 g. of a substantially equimolar mixture consisting of bis(2-chloroethyl) phosphorochloridite and tris-(2-chloroethyl) phosphite there was added, during 0.3 hour, 30.8 g. (0.7 mole) of acetaldehyde. During addition of the aldehyde, the temperature of the reaction mixture was maintained by ice-cooling at 10–15° C. After all of the aldehyde had been added, cooling was required for several minutes in order to maintain the temperature of the mixture below 20° C. It was then stirred at room temperature for one hour and allowed to stand overnight. Concentration to a pot temperature of 102° C./1.0 mm., gave as residue 219 g. (100% theoretical yield) of the substantially pure bis(2-chloroethyl) phosphite of bis(2-chloroethyl) (1-hydroxyethyl)-phosphonate, $n_D^{25}$ 1.4904, of the structure

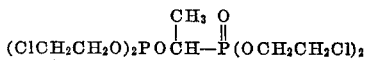

The presently provided phosphonate analyzed as follows:

|  | Found | Calcd. for $C_{10}H_{20}Cl_4O_6P_2$ |
|---|---|---|
| Percent C | 28.16 | 27.3 |
| Percent H | 4.78 | 4.6 |
| Percent P | 13.23 | 14.1 |

Example 24

To a 2,000 ml. flask equipped with a stirrer, thermometer, reflux condenser fitted with a drying tube, and a dropping funnel there was charged a substantially equimolar mixture (total of 1,320 g.) of bis(2-chloroethyl) phosphorochloridite and tris(2-chloroethyl) phosphite. After cooling the mixture to 2° C., there was added, dropwise, during 0.45 hour, 168.1 g. (3.82 moles) of acetaldehyde. During addition of the aldehyde, extraneous cooling was discontinued momentarily to facilitate initiation of the reaction, but when the temperature reached 14° C., cooling was again employed and the remainder of the aldehyde was added while maintaining the temperature of the reaction mixture at from 10° C. to 16° C. When all of the aldehyde had been added, the mixture was stirred at room temperature for one hour, during which period the temperature rose to 30° C. The whole was then heated to 60° C., subjected to water-pump vacuum, and subsequently heated to 110° C. in order to remove 255.8 g. of by-product 1,2-dichloroethane and unreacted material. Concentration of the residue to 140° C./0.15 mm., gave 1,188.3 g. of the substantially pure bis(2-chloroethyl) phosphite of bis(2-chloroethyl)(1-hydroxyethyl) phosphonate, $n_D^{25}$ 1.4906, of the structure

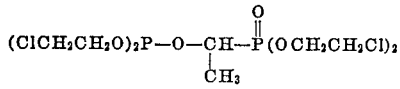

The presently provided phosphonate analyzed 28.45% carbon and 5.07% hydrogen as compared to 27.38% and 4.57%, the calculated values.

Example 25

To 223.8 g. of a substantially equimolar mixture of bis-(2-chloroethyl) phosphorochloridite and tris(2-chloroethyl) phosphite there was added, dropwise with stirring, 27.1 g. (0.47 mole) of redistilled propionaldehyde. During addition of the aldehyde, cooling was applied when the temperature of the reaction mixture reached 30° C., and the remainder of the aldehyde was added at a temperature of 20–28° C. The whole was heated to 75° C. to insure complete reaction, and then placed under water-pump vacuum and heated to 90° C. for removal of impurities and by-products. Concentration of the residue to 140° C./0.1 mm., gave as residue 201.2 (98.5% theoretical yield) of the substantially pure bis(2-chloroethyl) phosphite of bis(2-chloroethyl) (1-hydroxypropyl)phosphonate, $n_D^{25}$, 1.4910, of the structure

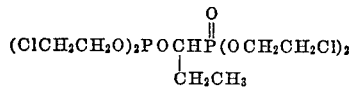

The presently provided phosphonate analyzed 29.12% carbon and 5.22% hydrogen as against 29.15% and 4.88%, the calculated values.

Example 26

To 178.9 g. of a substantially equimolar mixture consisting of bis(2-chloroethyl) phosphorochloridite and tris-(2-chloroethyl) phosphite there was added, with cooling during 0.3 hour, 32.6 g. (0.45 mole) of n-butyraldehyde. During addition of the aldehyde, the temperature of the reaction mixture was maintained at 15–22° C. and after all of the aldehyde had been added, cooling was necessary for a few minutes in order to keep the temperature of the reaction mixture below room temperature. The colorless reaction mixture was then warmed to 65° C. and concentrated to a pot temperature of 145° C./0.2 mm.. to give as residue 172.0 g. of the substantially pure bis(2-chloroethyl) phosphite of bis(2-chloroethyl)(1-hydroxybutyl)phosphonate, $n_D^{25}$ 1.4880, of the structure

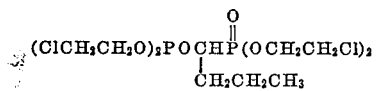

Example 27

2-ethylhexaldehyde (64.1 g., 0.50 mole) was added, with cooling and during an 0.2-hour period, to 245 g. of a substantially equimolar mixture of bis(2-chloroethyl) phosphorochloridite and tris(2-chloroethyl) phosphite. The exothermal nature of the reaction was evidenced by the fact that the temperature of the reaction mixture rose to 43° C. when all of the aldehyde had been added and ice-cooling was discontinued. The reaction mixture was then warmed at 95–103° C. for a period of 0.3 hour and distilled to remove material boiling below 182° C./1 mm. The residue was taken up in toluene, washed with aqueous sodium bicarbonate and then with water, dried, and finally concentrated to a pot temperature of 151° C./0.05 mm., to give as residue the substantially pure bis(2-chloroethyl) phosphite of bis(2-chloroethyl) (2-ethyl-1-hydroxyhexyl)phosphonate, $n_D^{25}$ 1.4858, analyzing 11.9% phosphorus as against a theoretical of 11.8%.

Example 28

To 198 g. of a substantially equimolar mixture consisting of bis(2-chloroethyl) phosphorochloridite and tris-(2-chloroethyl) phosphite there was added, during 0.1 hour and with cooling, 51.3 g. (0.4 mole) of 2-ethylhexaldehyde. When all of the aldehyde had been added, cooling was discontinued and the whole stirred until cessation in temperature rise (40° C. maximum). Subsequent concentration of the reaction mixture to a pot temperature of 140° C./0.1 mm., gave as residue 207.1 g. (99% theoretical yield) of the substantially pure bis(2-chloroethyl) phosphite of bis(2-chloroethyl) (2-ethyl-1-hydroxyhexyl)phosphonate, $n_D^{25}$ 1.4858, of the structure

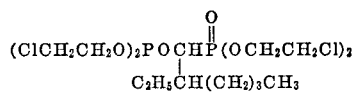

The presently obtained phosphonate analyzed as follows:

| | Found | Calcd. for $C_{16}H_{33}Cl_4O_6P_2$ |
| --- | --- | --- |
| Percent C | 36.57 | 36.7 |
| Percent H | 6.26 | 6.15 |
| Percent Cl | 27.32 | 27.1 |
| Percent P | 12.01 | 11.8 |

Example 29

To 198 g. of an equimolar mixture consisting of bis(2-chloroethyl) phosphorochloridite and tris(2-chloroethyl) phosphite there was added, with cooling during 0.2 hour, 68.2 g. (0.4 mole) of undecylaldehyde. After all of the aldehyde had been added, cooling was discontinued and the temperature of the reaction mixture increased spontaneously to 40° C. Concentration to a pot temperature of 148° C./0.2 mm., gave as residue 226.0 g. (100% theoretical yield) of the substantially pure bis(2-chloroethyl) phosphite of bis(2-chloroethyl) (1-hydroxyundecyl)phosphonate, $n_D^{25}$ 1.4808, of the structure

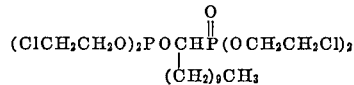

The presently provided phosphonate analyzed as follows:

| | Found | Calcd. for $C_{19}H_{38}Cl_4O_6P_2$ |
| --- | --- | --- |
| Percent C | 39.77 | 40.3 |
| Percent H | 6.72 | 6.8 |
| Percent Cl | 25.15 | 25.1 |

Example 30

A mixture consisting of 12.5 g. (0.1 mole) of 2,2-dimethyl-4-cyanobutyraldehyde and 49.5 g. of a substantially equimolar mixture of bis(2-chloroethyl) phosphorochloridite and tris(2-chloroethyl) phosphite was gradually warmed to 156° C. and then concentrated to a pot temperature of 130° C./0.5 mm. to give as residue 43.0 g. of the substantially pure bis(2-chloroethyl) phosphite of bis(2-chloroethyl) (4-cyano-2,2-dimethyl-1-hydroxybutyl)phosphonate, $n_D^{25}$ 1.4950, and having the structure

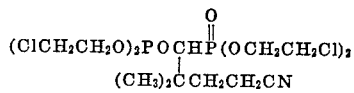

Example 31

Glutaraldehyde (22.5 g., 0.225 mole) was added, during a period of 0.1 hour at 15–20° C., to 245 g. of an equimolar mixture of bis(2-chloroethyl) phosphorochloridite and tris(2-chloroethyl) phosphite. The temperature of the colorless reaction mixture rose exothermally to 44° C. Completion of the reaction was effected by warming the mixture for one hour at 90–100° C. Distillation to remove material boiling below a maximum pot temperature of 191° C./1.2 mm., gave as residue 131.7 g. of the substantially pure bis(2-chloroethyl) phosphite of bis(2-chloroethyl) (1-hydroxy-4-formylbutyl)phosphonate of the following structure

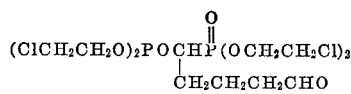

the presently obtained phosphonate analyzed as follows:

|  | Found | Calcd. for $C_{13}H_{24}Cl_4O_7P_2$ |
| --- | --- | --- |
| Percent C | 30.22 | 31.5 |
| Percent H | 5.10 | 4.9 |
| Percent Cl | 28.44 | 28.6 |

Example 32

Ethyl 4-formylbutyrate (14.4 g., 0.1 mole) and 49.5 g. of an equimolar mixture of bis(2-chloroethyl) phosphorochloridite and tris(2-chloroethyl) phosphite were placed in a flask and allowed to stand while the temperature rose spontaneously to 72° C. When there was no further evidence of exothermic reaction, the mixture was warmed to 120° C. and distilled to a pot temperature of 140° C./2.0 mm., to give as residue 54.0 g. (100% theoretical yield) of the substantially pure bis(2-chloroethyl) phosphite of bis(2-chloroethyl) (4-carboethoxy-1-hydroxybutyl)phosphonate, $n_D^{25}$ 1.4856, and having the structure

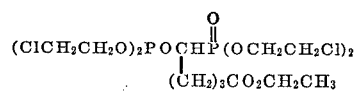

Example 33

Benzaldehyde (45.6 g., 0.43 mole) was added, dropwise with stirring during a period of 0.8 hour, to 198.9 g. of an equimolar mixture of bis(2-chloroethyl) phosphorochloridite and tris(2-chloroethyl) phosphite. After one-third of the benzaldehyde had been added, the temperature of the reaction mixture had risen to 34° C.; at this point, the mixture was cooled to 19° C. and by the time the remainder of the aldehyde was added, the temperature rose to 35° C. In order to insure complete reaction, the mixture was heated to 75° C., then placed under water-pump vacuum and heated to 105° C. in order to remove volatile impurities and by-products. Concentration of the residue to 140° C./0.1 mm., gave 199.6 g. (99.3% theoretical yield) of the substantially pure bis(2-chloroethyl) phosphite of bis(2-chloroethyl) (α-hydroxybenzyl)phosphonate, $n_D^{25}$ 1.5290, of the structure

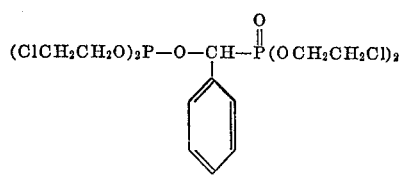

The presently provided phosphonate analyzed as follows:

|  | Found | Calcd. for $C_{15}H_{22}Cl_4O_6P_2$ |
| --- | --- | --- |
| Percent C | 36.43 | 35.89 |
| Percent H | 4.54 | 4.42 |
| Percent Cl | 27.12 | 28.21 |

Example 34

To a mixture consisting of 49.5 g. of bis(2-chloroethyl) phosphorochloridite and tris(2-chloroethyl) phosphite in substantially equimolar proportions, there was added 12.0 g. (0.1 mole) of 4-tolualdehyde. The temperature of the reaction mixture increased from 25° C. to 60° C. during addition of the aldehyde. The whole was then warmed to 130° C. and concentrated to a pot temperature of 40° C./1.0 mm., to give as residue 52.1 g. of the substantially pure bis(2-chloroethyl) phosphite of bis(2-chloroethyl) (α-hydroxy-4-methylbenzyl)phosphonate, $n_D^{25}$ 1.5169, and having the structure

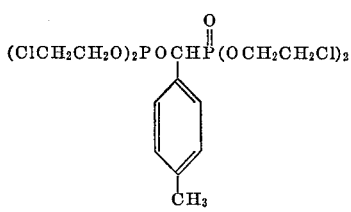

Example 35

To 49.5 g. of a substantially equimolar mixture of bis(2-chloroethyl phosphorochloridite and tris(2-chloroethyl) phosphite there was gradually added 15.1 g. (0.1 mole) of 3-nitrobenzaldehyde. The whole was warmed to about 40° C. at which point an exothermic reaction was initiated and heating was discontinued while the temperature rose spontaneously to 72° C. When no further rise in temperature was observed, the reaction mixture was heated to 120° C. and then concentrated to a pot temperature of 126° C./1.0 mm., to give as residue 57.2 g. of the substantially pure bis(2-chloroethyl) phosphite of bis(2-chloroethyl) (3-nitro-α-hydroxybenzyl)phosphonate, $n_D^{25}$ 1.5300, and having the structure

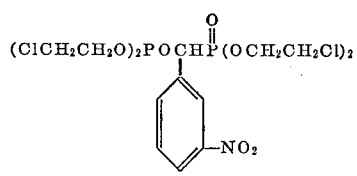

Example 36

An equimolar mixture consisting of 2,4-dichlorobenzaldehyde, bis(2-chloroethyl) phosphorochloridite and tris-(2-chloroethyl) phosphite was allowed to stand while the temperature rose spontaneously to 42° C. It was then warmed to 120° C. and concentrated to a pot temperature of 148° C./1.0 mm., to give as residue 42.1 g. (94% theoretical yield) of the substantially pure bis(2-chloroethyl) phosphite of bis(2-chloroethyl) (2,3-dichloro-α-hydroxybenzyl)phosphonate, $n_D^{25}$ 1.5295, and having the structure

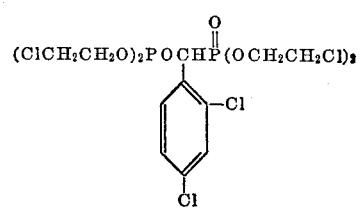

Example 37

A mixture consisting of 49.5 g. of a substantially equimolar mixture of bis(2-chloroethyl) phosphorochloridite and tris(2-chloroethyl) phosphite was treated with 15.2 g. (0.1 mole) of vanillin. The temperature of the reaction mixture increased spontaneously from 25° C. to 80° C. When no further temperature rise was observed, the mixture was warmed to 124° C. and concentrated to 130° C./0.1 mm., to give as residue 55.8 g. of the substantially pure bis(2-chloroethyl) phosphite of bis(2-chloroethyl) (α,4-dihydroxy-3-methoxybenzyl)phosphonate, $n_D^{25}$ 1.5289, and having the structure

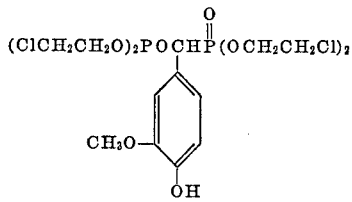

*Example 38*

To 49.5 g. of a substantially equimolar mixture of bis-(2-chloroethyl) phosphorochloridite and tris(2-chloroethyl) phosphite there was gradually added 14.9 g. (0.1 mole) of 4-(dimethylamino)benzaldehyde. When the mixture was warmed to about 50° C., an exothermic reaction was initiated and the temperature increased spontaneously to 124° C. It was then concentrated to a pot temperature of 140° C./1.0 mm., to give as residue the substantially pure bis(2-chloroethyl) phosphite of bis-(2-chloroethyl) [4-(dimethylamino)-α-hydroxybenzyl]-phosphonate, $n_D^{25}$ 1.5452, and having the structure

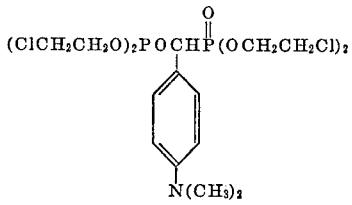

*Example 39*

The addition of 16.3 g. (0.1 mole) of 4-acetamidobenzaldehyde to 49.5 g. of a substantially equimolar mixture of bis(2-chloroethyl) phosphorochloridite and tris-(2-chloroethyl) phosphite caused no noticeable heat of reaction at room temperature. When warmed, an exothermic reaction was initiated and the temperature increased to 124° C. When no further temperature rise was observed, the whole was concentrated to 144° C./1.0 mm., to give as residue 56.2 g. (100% theoretical yield) of the substantially pure bis(2-chloroethyl) phosphite of bis(2-chloroethyl) (4-acetamido-α-hydroxybenzyl)phosphonate, $n_D^{25}$ 1.5409, and having the structure

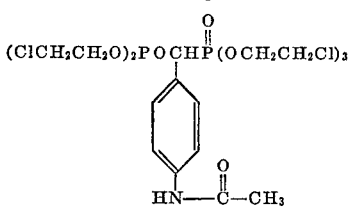

*Example 40*

Piperonal (15.0 g., 0.1 mole) and 24.7 g. of a substantially equimolar mixture of bis(2-chloroethyl) phosphorochloridite and tris(2-chloroethyl) phosphite were placed in a 100 cc. flask and warmed to about 40° C., at which point an exothermic reaction was initiated and the temperature was allowed to increase spontaneously to 55° C. When the exothermic reaction had ceased, the mixture was warmed to a pot temperature of 140° C./1 mm., to give as residue 25.5 g. (94% theoretical yield) of the substantially pure bis(2-chloroethyl) phosphite of bis(2-chloroethyl) (α-hydroxypiperonyl)phosphonate, $n_D^{25}$ 1.5330, and having the structure

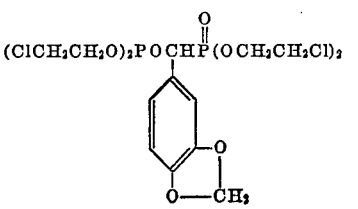

*Example 41*

Furfural (9.6 g., 0.1 mole) was gradually added to 49.5 g. of a substantially equimolar mixture of bis(2-chloroethyl) phosphorochloridite and tris(2-chloroethyl) phosphite. No exothermic reaction was noted. When all of the aldehyde had been added, the whole was heated to 124° C. and concentrated to a pot temperature of 136° C./1.0 mm., to give as residue 48.6 g. (95% theoretical yield) of the substantially pure bis(2-chloroethyl) phosphite of bis(2-chloroethyl) (α-hydroxyfurfuryl)phosphonate, $n_D^{25}$ 1.5069, and having the structure

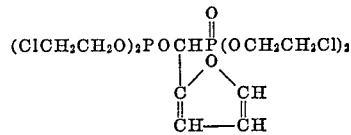

*Example 42*

6-methyl-3-cyclohexenecarboxaldehyde (12.3 g., 0.1 mole) was gradually added to 33.0 g. of an equimolar mixture of bis(2-chloroethyl) phosphorochloridite and tris(2-chloroethyl) phosphite. During addition of the aldehyde, the temperature of the reaction mixture rose from 26° C. to 46° C. The resulting reaction mixture was then warmed to 136° C. and concentrated to a pot temperature of 140° C./1.0 mm., to give as residue 34.0 g. (98% theoretical yield) of the substantially pure bis-(2-chloroethyl) phosphite of bis(2-chloroethyl) [(6-methyl-3-cyclohexenyl)hydroxymethyl]phosphonate, $n_D^{25}$ 1.5034, and having the structure

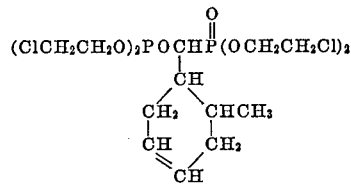

*Example 43*

To about 488.5 g. of a substantially equimolar mixture of bis(2-chloroethyl) phosphorochloridite and tris-(2-chloroethyl) phosphite there was added 100 g. (1.02 moles) of cyclohexanone at a temperature of 22–24.5° C. The whole was stirred at room temperature for 0.5 hour and then at 49–50° C. for 0.3 hour. There was thus obtained an ethylene dichloride solution of the substantially pure bis(2-chloroethyl) phosphite of bis(2-chloroethyl) (1-hydroxycyclohexyl)phosphonate of the structure

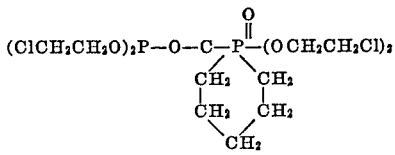

The above structure was confirmed by nuclear magnetic resonance studies conducted on said solution. NMR chemical shifts for phosphorus showed characteristic positions for the phosphite and phosphonate structures.

*Example 44*

To a cooled mixture consisting of 145 g. (1.05 moles) of phosphorus trichloride and 300 ml. of methylene chloride there was added, during one hour at 20–25° C., 184.5 g. (2.64 moles) of butadiene monoxide. The resulting mixture was stirred at room temperature for 30 minutes and then concentrated first under water-pump vacuum and finally to 55° C./4 mm., to give as residue 320.5 g. (97.5% theoretical yield) of a substantially equimolar mixture of tris (2-chloro-3-butenyl) phosphite and bis(2-chloro-3-butenyl) phosphorochloridite.

A 156.3 g. portion of the above mixture (containing about 0.25 mole each of said phosphite and said phosphorochloridite) was treated with 17.4 g. (0.30 mole) of propionaldehyde for about 12 minutes at 20–30° C. Upon warming the whole to 75° C., and concentrating to a pot temperature of 105° C./2 mm., there was obtained as residue the substantially pure bis(2-chloro-3-butenyl) phosphite of bis(2-chloro-3-butenyl) (1-hydroxypropyl) phosphonate.

Example 45

123.8 g. of a substantially equimolar mixture of tris(2-chloroethyl) phosphite and bis(2-chloroethyl) phosphorochloridite was warmed to 50° C. and 14.4 g. of formaldehyde which had been depolymerized by heating, was distilled into the mixture while applying external cooling to maintain the temperature at between 55–65° C. Concentration to 142° C./1.0 mm., gave as residue 109.4 g. of the substantially pure bis(2-chloroethyl) phosphite of bis-(2-chloroethyl)(hydroxymethyl) phosphonate. During the concentration, 25.1 g. of by-product ethylene chloride was obtained in the trap which formed a part of the reaction equipment.

Example 46

To a solution of 93.7 g. (0.683 mole) of phosphorus trichloride in 175 ml. of methylene chloride, there was added 198.3 g. (1.71 moles) of isopropyl glycidyl ether over a 45-minute period while maintaining the temperature of the reaction mixture at between 17–35° C. The whole was then stirred at room temperature for about 30 minutes to obtain a substantially equimolar mixture of tris(2-chloro-3-isopropoxypropyl) phosphite and bis(2-chloro-3-isopropoxypropyl) phosphorochloridite.

After a 6.0 g. portion of said mixture had been removed for analysis the remainder of the mixture of phosphite and phosphorochloridite was reacted with propionaldehyde by adding the aldehyde (28 g., 0.49 mole) thereto during about 12 minutes at 22–30° C. while employing moderate cooling. When all of the aldehyde had been added and cooling was discontinued, the temperature of the reaction mixture rose spontaneously to 54° C. When no further increase in temperature was noted, the whole was warmed to 58° C. and maintained at this temperature for 30 minutes. Concentration first at water-pump vacuum and then to 140° C./2.0 mm., gave as residue 238.2 g. of the substantially pure bis(2-chloro-3-isopropoxypropyl) phosphite of bis(2-chloro-3-isopropoxypropyl) (1-hydroxypropyl)phosphonate, analyzing 19.11% chlorine as against 20.5%, the calculated value for $C_{27}H_{54}Cl_4O_{10}P_2$.

Example 47

To 123.8 g. of a substantially equimolar mixture consisting of 0.25 mole each of tris(2-chloroethyl) phosphite and bis(2-chloroethyl)phosphorochloridite there was added in one portion, 18 g. (0.30 mole) of methyl ethyl ketone. The temperature rose from 24° C. to 27° C. The reaction mixture was then warmed at 100–110° C. for two hours and distilled to give as residue 59.2 g. of the substantially pure bis(2-chloroethyl) phosphite of bis(2-chloroethyl) (1-hydroxy-1-methylpropyl)phosphonate.

Example 48

To 123.8 g. of a substantially equimolar mixture consisting of 0.25 mole each of tris(2-chloroethyl) phosphite and bis(2-chloroethyl) phosphorochloridite there was added, during about 12 minutes, 58 g. of a 55% solution of 2,3-dichloropropionaldehyde in benzene. External cooling was applied to maintain the reaction temperature at between 25–30° C. When all of the aldehyde had been added, the mixture was warmed to 80° C. and distilled to a maximum pot temperature of 152° C./0.2 mm. to give the substantially pure bis(2-chloroethyl) phosphite of bis(2-chloroethyl) (2,3-dichloro-1-hydroxypropyl)phosphonate as residue. The distillate was largely bis(2-chloroethyl) 3-chloroallyl phosphate which was formed by the direct reaction of the aldehyde with the phosphite without the participation of the phosphorochloridite in the reaction.

Example 49

To a solution of 68.7 g. (0.50 mole) of phosphorus trichloride in 150 ml. of methylene chloride there was added, during about 25 minutes, 120.1 g. (1.0 mole) of (epoxyethyl)benzene while maintaining the temperature of the reaction mixture at from 13–20° C. The whole was then stirred at room temperature for 30 minutes to obtain the substantially pure bis(2-chloro-2-phenylethyl) phosphorochloridite.

To the above obtained phosphorochloridite, there was added 135 g. (0.50 mole) of tris(2-chloroethyl) phosphite and to the resulting mixture there was introduced during about 18 minutes, 33 g. (0.57 mole) of propionaldehyde. External cooling was applied in order to maintain the temperature of the reaction mixture at 25–28° C. during addition of the aldehyde. The whole was then refluxed (58° C.) for 30 minutes and concentrated under water-pump pressure to 70° C. Distillation to remove material boiling below 120° C./0.3 mm., gave as residue 302.1 g. (99.7% theoretical yield) of the substantially pure bis(2-chloro-2-phenylethyl) phosphite of bis(2-chloroethyl) (1-hydroxypropyl)phosphonate.

Example 50

To 94 g. of a substantially equimolar mixture consisting of 0.166 mole each of bis(2-chloropropyl) phosphorochloridite and tris(2-chloropropyl) phosphite, there was added 11.6 g. of acetone. A slight temperature rise (25.5–27.0° C.) was observed. The whole was refluxed (95–112° C.) for 14 hours and then distilled to remove material boiling below 132° C./0.1 mm. There was thus obtained as residue 34.3 g. of the substantially pure bis(2-chloropropyl) phosphite of bis(2-chloropropyl) (1-hydroxy-1-methylethyl)phosphonate.

Example 51

To 124 g. of a substantially equimolar mixture consisting of about 0.25 mole each of tris(2-chloroethyl) phosphite and bis(2 - chloroethyl)phosphorochloridite, there was added, during about 12 minutes, 36.9 g. (0.25 mole) of chloral. External cooling was employed to maintain the exothermic reaction at 22–30° C. When all of the aldehyde had been added, the reaction mixture was warmed to 70° C. and then distilled to remove material boiling below 142° C./0.1 mm. There was thus obtained as residue 120.1 g. (88.5% theoretical yield) of the substantially pure bis(2-chloroethyl) phosphite of bis(2-chloroethyl) (1-hydroxy-3,3,3-trichloroethyl)phosphonate, analyzing 22.05% carbon and 3.54% hydrogen as against 22.1% and 3.15%, the respective calculated values for $C_{10}H_{17}Cl_7O_6P_2$. The distillate was largely bis(2-chloroethyl) 2,2-dichlorovinyl phosphate which resulted from the reaction of chloral with tris(2-chloroethyl) phosphite without the participation of bis(2-chloroethyl) phosphorochloridite.

Example 52

Phosphorus trichloride (137.3 g., 1.0 mole) and 300 ml. of methylene chloride were placed in a reaction vessel and stirred as 376 g. (2.5 mole) of phenyl glycidyl ether was added thereto, during 1.25 hours at 22–30° C. Because reaction appeared to be very slow at first, after addition of about 60 g. of the ether, about 5 drops of 85% phosphoric acid was added to the reaction mixture in order to accelerate the reaction. When all of the ether had been added, the whole was warmed to reflux (54° C.) to obtain a substantially equimolar mixture of tris(2-chloro-3-phenoxypropyl) phosphite and bis(2-chloro-3-phenoxypropyl) phosphorochloridite.

To all but 5 g. of the above mixture of phosphite and phosphorochloridite, there was added, during about 12 minutes, 31.9 g. (0.55 mole) of propionaldehyde while

59 maintaining the temperature of the reaction mixture at 25–30° C. When all of the aldehyde had been added and cooling was discontinued, the temperature of the reaction mixture rose spontaneously to 38° C. The whole was then warmed to reflux (54° C.), concentrated at water-pump pressure to 97° C., and finally distilled to remove material boiling below 114° C./0.2 mm. There was thus obtained as residue 477 g. of the substantially pure bis(2-chloro-3-phenoxypropyl) phosphite of bis(2-chloro-3-phenoxypropyl) (1-hydroxypropyl)phosphonate.

Example 53

To 85 g. of a substantially equimolar mixture consisting of about 0.15 mole each of tris(2-chloropropyl) phosphite and bis(2-chloropropyl) phosphorochloridite, there was added 17.0 g. (0.15 mole) of dichloroacetaldehyde while maintaining the temperature of the reaction mixture at from 22–30° C. The whole was then warmed to 80° C. and distilled to remove material boiling below a pot temperature of 165° C./0.20 mm., to give as residue 59.4 g. of the substantially pure bis(2-chloropropyl) phosphite of bis(2-chloropropyl) (1-hydroxy-2,2-dichloroethyl)phosphonate. The distillate was largely bis(2-chloropropyl) 2-chlorovinyl phosphate.

Example 54

To 226.1 g. (0.4 mole) of a substantially equimolar mixture of tris(2-chloropropyl) phosphite and bis(2-chloropropyl) phosphorochloridite, there was added, with cooling, 20.7 g. of acetaldehyde (0.44 mole) at a temperature of 10–13° C. during 10 minutes. When all of the aldehyde had been added, cooling was discontinued and the reaction mixture was stirred for 0.3 hour. During this time the temperature reached 85° C. before cooling brought it under control. The reaction mixture was then warmed to 85° C. to insure complete reaction, then placed under vacuum and concentrated to remove material boiling below 120° C./0.7 mm. There was thus obtained as residue 198.6 g. (100% theoretical yield) of the substantially pure bis(2-chloropropyl) phosphite of bis(2-chloropropyl) (1-hydroxyethyl)phosphonate, $n_D^{25}$ 1.4782, of the structure $$(CH_3CHClCH_2O)_2POCH-\overset{O}{\overset{\|}{P}}(OCH_2CHClCH_3)_2$$
$$\overset{|}{CH_3}$$

and analyzing as follows:

|  | Found | Calcd. for $C_{14}H_{28}Cl_4O_6P_2$ |
|---|---|---|
| Percent C | 33.66 | 33.86 |
| Percent H | 5.96 | 5.68 |
| Percent Cl | 28.95 | 28.51 |

Example 55

To a mixture consisting of 41.4 g. (0.33 mole) of trimethyl phosphite and 22 g. (0.5 mole) of acetaldehyde, there was added, dropwise, 58.2 (0.33 mole) of 2-chloro-1,3,2-benzodioxaphosphole. During the addition, the temperature of the reaction mixture was kept at 18–25° C. by occasional ice-cooling. The whole was then stirred until cessation of rise in temperature. It was then heated to 85° C. in order to insure complete reaction, cooled to 75° C., placed under water-pump vacuum, and heated to 90° C. in order to remove volatile impurities. Distillation of the residue gave 85.8 g. (88.2% theoretical yield) of the substantially pure pyrocatechol (cyclic ester) of dimethyl (1-hydroxyethyl)phosphonate, B.P. 151–153° C./0.04 mm., $n_D^{25}$ 1.5140, of the following structure

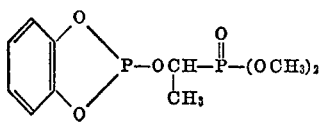

60

Example 56

Redistilled triethyl phosphite (99.5 g., 0.6 mole) and 33 g. (0.75 mole) of acetaldehyde were placed in a 500 ml. flask and cooled in ice as 63.2 g. (0.5 mole) of 2-chloro-1,3,2-dioxaphospholane was added thereto, during a period of 0.3 hour, at 5–10° C. When all of the phospholane had been added, the reaction mixture was gradually warmed to 50° C. and then submitted to distillation in vacuo to obtain 121.7 g. of the substantially pure ethylene glycol phosphite (cyclic ester) of diethyl (1-hydroxyethyl)phosphonate, B.P. 109–115° C./0.05–0.1 mm., of the structure

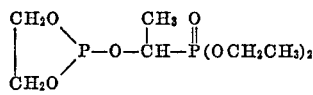

The compound analyzed as follows:

|  | Found | Calcd. for $C_8H_{19}O_6P_2$ |
|---|---|---|
| Percent C | 35.83 | 35.3 |
| Percent H | 7.01 | 6.67 |
| Percent P | 22.64 | 22.8 |

Example 57

To a cooled (2° C.) mixture consisting of 140 g. (0.56 mole) of tributyl phosphite and 67.3 g. (0.532 mole) of 2-chloro-1,3,2-dioxaphospholane there was added dropwise, with stirring during 0.2 hour, 28.2 g. (0.64 mole) of redistilled acetaldehyde. During addition of the aldehyde the temperature of the reaction mixture rose to 25° C. By-product butyl chloride and any unreacted material was removed by heating the reaction mixture to 90° C. under water-pump vacuum. Vacuum distillation of the residue gave 134.6 g. of the substantially pure ethylene glycol phosphite (cyclic ester) of dibutyl (1-hydroxyethyl) phosphonate, B.P. 140° C./0.35 mm., 154° C./0.50 mm., $n_D^{25}$ 1.4528, and analyzing 44.27% carbon and 8.22% hydrogen as against 43.9% and 7.98%, the calculated values, and having the structure

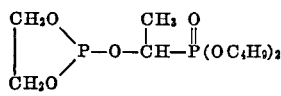

Example 58

To a 500 ml. flask equipped with stirrer, thermometer, reflux condenser fitted with a drying tube, and a dropping funnel, there was first charged 170 g. (0.631 mole) of tris(2-chloroethyl) phosphite and then 75.9 g. (0.60 mole) of 2-chloro-1,3,2-dioxaphospholane. The resulting solution was cooled to 3° C. by means of an ice bath, and to the cooled mixture there was added, dropwise, 31.6 g. (0.718 mole) of acetaldehyde. During the aldehyde addition the temperature gradually rose to 18° C. When the temperature began to drop, the ice bath was removed and the mixture heated to 80° C. in order to insure complete reaction. The whole was then cooled and the mixture subjected to water-pump vacuum while gradually raising the temperature in order to remove any unreacted acetaldehyde and by-product 1,2-dichloroethane. Distillation of the residue to remove material boiling below 140° C./0.05 mm., gave as residue 211.0 g. of the substantially pure ethylene glycol phosphite (cyclic ester) of bis(2-chloroethyl) (1-hydroxyethyl)-phosphonate, $n_D^{25}$ 1.4909, and having the structure

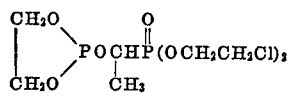

Example 59

To a cooled (10° C.) mixture consisting of 57.9 g. (0.411 mole) of 2-chloro-1,3,2-dioxaphosphorinane and 66.0 g. (0.411 mole) of triethyl phosphite, there was added dropwise, with stirring, 24.9 g. (0.411 mole) of propionaldehyde. During addition of the aldehyde the temperature of the reaction mixture rose exothermally to 25° C. The whole was then heated to 70° C. to insure complete reaction, and volatile impurities and by-products were removed by subjecting the mixture to water-pump vacuum and heating it to 100° C. Distillation of the residue gave 58.7 g. of the substantially pure 1,3-propanediol phosphite (cyclic ester) of diethyl (1-hydroxypropyl)phosphonate, B.P. 150° C./0.3 mm., $n_D^{25}$ 1.4563, analyzing 39.57% carbon and 7.48% hydrogen, as against 39.94% and 7.36%, the calculated values, and having the structure

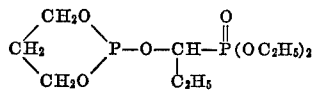

*Example 60*

Propionaldehyde (28.6 g., 0.49 mole) was added dropwise, with stirring, during a period of 0.3 hour at a temperature of 15–31° C., to a mixture consisting of 60.9 g. (0.49 mole) of trimethyl phosphite and 85.6 g. (0.49 mole) of 2 - chloro-4-chloromethyl-1,3,2 - dioxaphospholane. In order to insure complete reaction, the whole was heated to 75° C. Volatile impurities and byproduct methyl chloride was removed by heating the reaction mixture to 100° C. under water-pump vacuum. Subsequent concentration of the reaction mixture to 140° C./0.25 mm., gave as residue 142.9 g. (95% theoretical yield) of the substantially pure 3-chloro-1,2-propanediol phosphite (cyclic ester) of dimethyl (1-hydroxypropyl)-phosphonate, $n_D^{26}$ 1.4770, of the structure

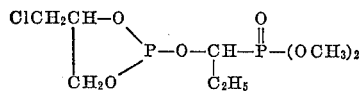

The presently provided phosphonate analyzed as follows:

|  | Found | Calcd. for $C_8H_{17}ClO_6P_2$ |
|---|---|---|
| Percent C | 31.87 | 31.32 |
| Percent H | 5.62 | 5.68 |
| Percent Cl | 12.20 | 11.57 |

*Example 61*

To a cooled (0° C.) mixture of 122.2 g. (0.735 mole) of triethyl phosphite and 88.5 g. (0.70 mole) of 2-chloro-1,3,2-dioxaphospholane there was added, dropwise during 30 minutes, 58.0 g. (0.805 mole) of butylraldehyde. During addition of the aldehyde, the temperature of the reaction mixture rose to 22° C. The whole was then subjected to water-pump vacuum and heated to 85° C. in order to remove by-product ethyl chloride and any unreacted material. Distillation of the residue in vacuo gave 127.0 g. of the substantially pure ethylene glycol phosphite (cyclic ester) of diethyl (1-hydroxybutyl)phosphonate, B.P. 132–136° C./0.35 mm., (maximum pot temperature 180° C./0.5 mm.) analyzing 40.89% carbon and 7.76% hydrogen, as against 40.1% and 7.46%, the calculated values, and having the structure

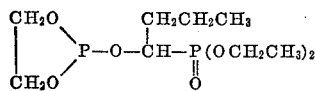

Another 7.0 g., 138° C./0.2 mm., of the phosphonate was obtained by distilling the residue remaining after removing said fraction, B.P. 132–136° C./0.35 mm.

*Example 62*

Redistilled triethyl phosphite (109.7 g., 0.66 mole) and 75.9 g. (0.6 mole) of 2-chloro-1,3,2-dioxaphospholane were charged to a reaction vessel; the resulting solution was cooled to 1° C., and there was added thereto 84.7 g. (0.725 mole) of redistilled 2-ethylhexaldehyde during 30 minutes. During addition of the aldehyde the temperature of the reaction mixture rose spontaneously to 22° C. The reaction mixture was then heated to 65° C., placed under water-pump vacuum and subsequently heated to 100° C., in order to remove by-product ethyl chloride and any unreacted material. Distillation of the residue gave 156.0 g. (73% theoretical yield) of the substantially pure ethylene glycol phosphite (cyclic ester) of diethyl (2-ethyl-1-hydroxyhexyl)phosphonate, B.P. 151–155° C./0.15 mm., of the structure

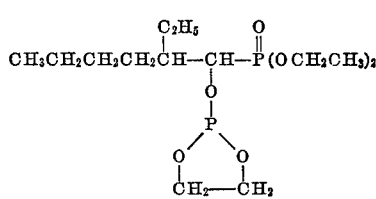

The presently provided phosphonate analyzed as follows:

|  | Found | Calcd. for $C_{14}H_{30}O_6P_2$ |
|---|---|---|
| Percent C | 46.79 | 47.15 |
| Percent H | 8.50 | 8.48 |
| Percent P | 17.09 | 17.33 |

*Example 63*

To a mixture consisting of 116.9 g. (0.43 mole) of tris-(2-chloroethyl) phosphite and 78.7 g. (0.45 mole) 2 - chloro - 4 - chloromethyl - 1,3,2 - dioxaphospholane, there was added dropwise, with stirring, 57.6 g. (0.45 mole) of 2-ethylhexaldehyde. During addition of the aldehyde, the temperature increased to 31° C.; at this point, cooling was applied and the remainder of the aldehyde was added while maintaining the reaction mixture at a temperature of 10–20° C. When all of the aldehyde had been added, the reaction mixture was stirred at room temperature for a period of 0.3 hour and then heated to 80° C. in order to insure complete reaction. Removal of volatile by-products and impurities by heating the mixture to 100° C. under water-pump vacuum, and concentration to 145° C./0.15 mm., gave as residue 198.5 g. (97.3% theoretical yield) of the substantially pure 3-chloro-1,2-propanediol phosphite (cyclic ester) of bis(2-chloroethyl) (2-ethyl-1-hydroxyhexyl)phosphonate, $n_D^{25}$ 1.4871, of the structure

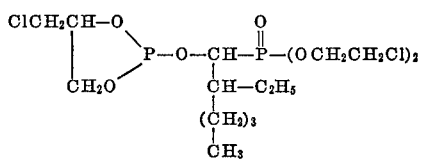

*Example 64*

To a cooled mixture of 63.7 g. (0.6 mole) of benzaldehyde and 62 g. (0.5 mole) of trimethyl phosphite there was added, during a period of 0.2 hour at a temperature of 5–10° C., 60.5 g. (0.48 mole) of 2-chloro-1,3,2-dioxaphospholane. When all of the phospholane had been added, extraneous cooling was discontinued and the temperature of the reaction mixture rose spontaneously to 36° C. A total of 20.8 g. of methyl chloride was collected in the Dry-Ice trap during the reaction. Distillation of the resulting reaction mixture to remove material boiling below 160° C./0.3 mm., gave as residue 145 g. (98.5% theoretical yield) of the substantially pure ethylene glycol phosphite (cyclic ester) of dimethyl (α-hydroxybenzyl)phosphonate having the structure

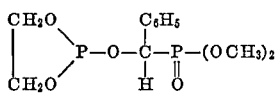

Example 65

2-chloro-1,3,2-benzodioxaphosphole (68.4 g., 0.392 mole) was added, dropwise, to a mixture consisting of 65.1 g. (0.392 mole) of triethyl phosphite and 41.6 g. (0.392 mole) of benzaldehyde. During the addition of the aldehyde, the temperature of the reaction mixture rose from 25° C. to 31° C., at which point the reaction vessel was placed in an ice bath. The remainder of the aldehyde was added while maintaining the temperature of the mixture at 25–28° C. External cooling was discontinued and the reaction mixture allowed to stand until cessation in temperature rise (35° C.) maximum. It was then heated to 90° C. in order to insure complete reaction, cooled to 35° C., subjected to water-pump vacuum and heated to 100° C. in order to remove by-product ethyl chloride and any unreacted material. Concentration to 125° C./0.7 mm., gave as residue 146.8 g. (97.7% theoretical yield) of the substantially pure pyrocatechol phosphite (cyclic ester) of diethyl (α-hydroxybenzyl)phosphonate, $n_D^{25}$ 1.5394, analyzing 52.88% carbon and 5.40% hydrogen as against 53.41% and 5.26%, the calculated values, and having the structure

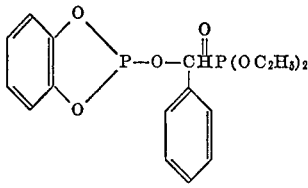

Example 66

To a mixture consisting of 91.5 g. (0.55 mole) of triethyl phosphite and 96.1 g. (0.55 mole) of 2-chloro-4-chloromethyl-1,3,2-dioxaphospholane, there was added dropwise, with stirring, 58.4 g. (0.55 mole) of benzaldehyde. During addition of the benzaldehyde, the temperature rose to 35° C.; at this point, cooling was applied and the remainder of the aldehyde was added while maintaining the reaction mixture at 25–30° C. Subsequent heating of the reaction mixture to 75° C. in order to insure complete reaction, removal of volatile by-product by heating under water-pump vacuum at 100° C., and distillation of the residue to remove material boiling below 150° C./0.2 mm., gave as residue 203.6 g. of the substantially pure 3-chloro-1,2-propanediol phosphite (cyclic ester) of diethyl (α-hydroxybenzyl)phosphonate, $n_D^{25}$ 1.5149, of the structure

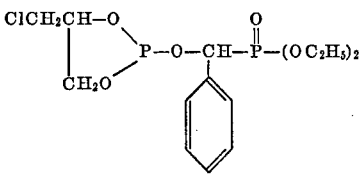

The presently provided phosphonate analyzed as follows:

|  | Found | Calcd. for $C_{14}H_{21}ClO_5P_2$ |
|---|---|---|
| Percent C | 44.19 | 43.91 |
| Percent Cl | 9.76 | 9.26 |

Example 67

1-naphthaldehyde (78.1 g., 0.5 mole) was added, dropwise, to a mixture consisting of 62.2 g. (0.5 mole) of trimethyl phosphite and 87.4 g. (0.5 mole) of 2-chloro-4-chloromethyl-1,3,2-dioxaphospholane. The reaction mixture was then heated to 29° C., external heating was discontinued and the temperature of the exothermic reaction was maintained at below 52° C. by ice-cooling at intervals. When cessation of the temperature increase was noted, the mixture was heated at 60–75° C. for 2 hours. It was then subjected to water-pump vacuum and heated to 113° C. in order to remove impurities and by-products. The residue comprised the 3-chloro-1,2-propanediol phosphite (cyclic ester) of dimethyl (1-naphthylhydroxymethyl)phosphonate, of the structure

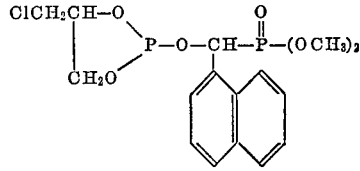

Example 68

To a mixture consisting of 51.4 g. (0.414 mole) of trimethyl phosphite and 72.3 g. (0.414 mole) of 2,4-dichlorobenzaldehyde dissolved in about 250 ml. of dichloromethane, there was added, dropwise with stirring, 52.3 g. (0.414 mole) of 2-chloro-1,3,2-dioxaphospholane. During the addition, the temperature increased from 24° C. to 30° C., at which point ice-cooling was applied and the remainder of the phospholane was added at a temperature of 27–30° C. The whole was then stirred at room temperature for 30 minutes. At the end of that time, the mixture was warmed at reflux (40° C.) for another 30 minutes in order to insure complete reaction. By-product methyl chloride and any unreacted material were removed by placing it under water-pump vacuum and warming it to 40° C. Concentration to 110° C./0.05 mm., gave as residue 154.4 g. (99.6% theoretical yield) of the substantially pure ethylene glycol phosphite (cyclic ester) of diethyl (2,4-dichloro-α-hydroxybenzyl)phosphonate, $n_D^{25}$ 1.5422, analyzing 35.19% carbon and 3.87% hydrogen as against 35.25% and 3.76%, the calculated values, and having the structure

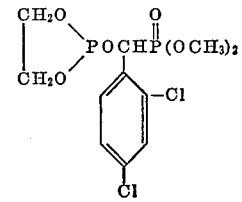

Example 69

Ethyl acetoacetate (78 g., 0.6 mole) was gradually added to a mixture of 75.8 g. (0.6 mole) of 2-chloro-1,3,2-dioxaphospholane and 108 g. (0.65 mole) of triethyl phosphite. After warming the colorless solution at 60–65° C. for 3 hours, concentration under water-pump pressure to 70° C., and distillation at higher vacuum, there was obtained 85.7 g. of colorless liquid, B.P. 120–164° C./0.1 mm., which upon redistillation gave 57.7 g. of the substantially pure ethylene glycol phosphite (cyclic ester) of ethyl 3-hydroxy-3-diethoxyphosphinyl butyrate, B.P. 148–150° C./0.1 mm., $n_D^{25}$ 1.4622, of the structure

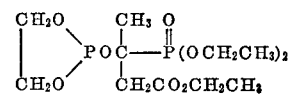

The presently obtained ester analyzed as follows:

|  | Found | Calcd. for $C_{12}H_{21}O_8P_2$ |
|---|---|---|
| Percent C | 40.05 | 40.2 |
| Percent H | 6.55 | 6.75 |
| Percent P | 17.40 | 17.3 |

Example 70

To ice-cooled 2-chloro-1,3,2-dioxaphospholane (63.2 g., 0.5 mole) there was added, during about 5 minutes, 51.6 g. (0.25 mole) of 2,2'-dithiobis(isobutyraldehyde); and then to the resulting mixture, there was gradually introduced 83 g. (0.5 mole) of triethyl phosphite. During the first half of the phosphite addition, a slight exothermic (8–12° C.) reaction was observed. The whole was then warmed to 60° C. and distilled in vacuo to remove material boiling below 42° C./1 mm. There was then obtained as residue 125.5 g. of the yellow, viscous, substantially pure ester having the structure

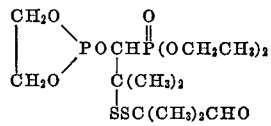

Example 71

A mixture consisting of 58.2 g. (0.35 mole) of triethyl phosphite and 28.8 g. (0.3 mole) of redistilled furfural was cooled in ice as 37.9 g. (0.3 mole) of 2-chloro-1,3,2-dioxaphospholane was added thereto, during 20 minutes. An exothermic reaction was noted throughout the addition. The whole was then stirred for one hour while cooling with ice, and then warmed to 52° C. Concentration of the whole to a pot temperature of 102° C./2.5 mm. to remove by-product ethyl chloride and excess triethyl phosphite, gave as residue 99.5 g. of the substantially pure ethylene glycol phosphite (cyclic ester) of diethyl (α-hydroxy-furfuryl)phosphonate, $n_D^{25}$ 1.4908, analyzing 40.22% carbon and 5.53% hydrogen as against 40.7% and 5.6%, the calculated values, and having the structure

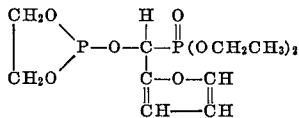

Example 72

To a mixture consisting of 29.6 g. (0.178 mole) of triethyl phosphite and 22.53 g. (0.178 mole) of 2-chloro-1,3,2-dioxaphospholane there was added, dropwise with stirring, 20.0 g. (0.178 mole) of 2-thiophenecarboxaldehyde. During the addition, the temperature of the reaction mixture rose from 17° C. to 35° C., at which point cooling was applied to bring the temperature down to 21° C. When all of the aldehyde had been added, cooling was discontinued and the reaction mixture heated to 60° C. It was then subjected to water-pump vacuum and heated to 80° C. in order to remove by-product ethyl chloride and any unreacted starting material. Distillation of the residue to remove material boiling below 163° C./0.35 mm., gave as residue 46.6 g. of the substantially pure ethylene glycol phosphite (cyclic ester) of diethyl (α-hydroxythenyl)phosphonate, $n_D^{25}$ 1.5278, having the structure

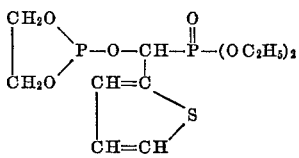

The presently provided phosphonate analyzed as follows:

|  | Found | Calcd. for $C_{11}H_{18}O_4P_2S$ |
|---|---|---|
| Percent C | 37.31 | 38.81 |
| Percent H | 5.41 | 5.33 |
| Percent S | 8.81 | 9.41 |

Example 73

1,4,5,6,7,7 - hexachlorobicyclo[2.2.1]hept-5-ene-2-carboxaldehyde (85.5 g., 0.26 mole), in enough dichloromethane to solubilize it, was mixed with 32.4 g. of trimethyl phosphite. The mixture was placed in an ice bath, and 45.4 g. (0.26 mole) of 2-chloro-1,3,2-benzodioxaphosphole was added, dropwise, thereto. During the addition, the temperature of the reaction mixture rose from 5° C. to 17° C., and at this point the rate of phosphole addition was regulated in order to maintain the temperature at 14–17° C. When all of the phosphole had been added, external cooling was discontinued and the reaction mixture stirred until cessation in temperature increase. It was then heated at reflux for 30 minutes, placed under water-pump vacuum and warmed to 40° C. in order to remove the solvent and by-product methyl chloride. The residue comprised the phosphonate of the structure

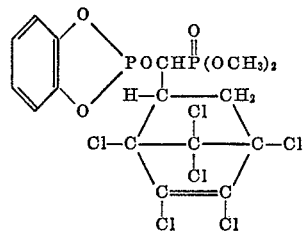

Example 74

To a solution of 74.4 g. (0.6 mole) of trimethyl phosphite and 63.2 g. (0.5 mole) of 2-chloro-1,3,2-dioxaphospholane there was added, during a period of 0.2 hour, 34.8 g. (0.6 mole) of acetone, with cooling. When the bath was removed, the temperature increased spontaneously to 48° C.; it was then brought to 101° C. within 1.25 hours by external heating. A total of 24.0 g. of colorless liquid (probably methyl chloride and unreacted acetone) collected in the Dry-Ice trap which formed a part of the reaction equipment. Distillation of the reaction mixture gave 78.4 g. of the substantially pure ethylene glycol phosphite (cyclic ester) of dimethyl (2-hydroxy-2-propyl)phosphonate, B.P. 117–127° C./1.5 mm., $n_D^{25}$ 1.4627, of the formula

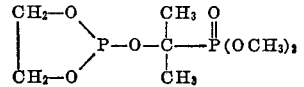

Example 75

To a mixture consisting of 78.4 g. (0.62 mole) of 2-chloro1,3,2-dioxaphospholane and 104 g. (0.62 mole) of triethyl phosphite there was gradually added, during a time of 0.3 hour, 60.8 g. (0.62 mole) of 5-hexen-2-one. During the addition, the temperature of the reaction mixture rose from 24° C. to 33° C. When all of the hexenone had been added, the mixture was stirred at room temperature for 30 minutes. It was then heated to 70° C. and maintained at this temperature for one hour. By-product ethyl chloride and any unreacted starting materials were removed by subjecting the reaction mixture to water-pump vacuum at 60° C. Distillation of the residue gave 83.9 g. of the substantially pure ethylene glycol phosphite (cyclic ester) of diethyl (2-hydroxyhexen-5-yl)phosphonate, B.P. 156–161° C./0.2 mm., $n_D^{25}$ 1.4679, of the structure

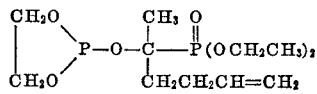

Example 76

To a cooled (2° C.) mixture consisting of 52.5 g. (0.316 mole) of triethyl phosphite and 37.9 g. (0.3 mole) of 2-chloro-1,3,2-dioxaphospholane there was added, dropwise with stirring during a period of 0.2 hour, 25.2 g.

(0.30 mole) of cyclopropyl methyl ketone. During the addition, the temperature of the reaction mixture was maintained at from 2–6° C. When all of the ketone had been added, extraneous cooling was discontinued, whereby the temperature of the reaction mixture rose to 23° C. The whole was then heated to 50° C. and maintained at a temperature of 50–60° C. for one hour. At the end of that time, it was subjected to water-pump vacuum and heated to 70° C. in order to remove impurities and unreacted starting materials. Distillation of the residue gave the substantially pure ethylene glycol phosphite (cyclic ester) of diethyl (2-cyclopropyl-2-hydroxyethyl)phosphonate, B.P. 136° C./0.1 mm., $n_D^{25}$ 1.4684, of the structure

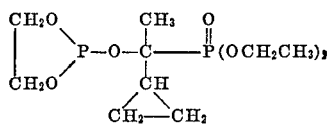

The presently provided phosphonate analyzed 41.03% carbon and 7.22% hydrogen, as against 42.3% and 7.09%, the calculated values.

*Example 77*

To a cooled (2° C.) mixture consisting of 113.2 g. (0.682 mole) of triethyl phosphite and 82.2 g. (0.65 mole) of 2-chloro-1,3,2-dioxaphospholane there was added, dropwise with stirring during 0.3 hour, 60.3 g. (0.716 mole) of cyclopentanone. The whole was then heated to 29° C., whereby an exothermic reaction was evidenced. Extraneous heating was then discontinued and the temperature of the reaction mixture rose spontaneously to a maximum of 45° C. In order to insure complete reaction, the mixture was heated to 85° C. It was then submitted to water-pump vacuum and heated to 100° C. for removal of by-product ethyl chloride and any unreacted material. Distillation of the residue gave 106.0 g. of the substantially pure ethylene glycol phosphite (cyclic ester) of diethyl (1-hydroxycyclopentyl)phosphonate, B.P. 142–145° C./0.15 mm., $n_D^{25}$ 1.4741, of the structure

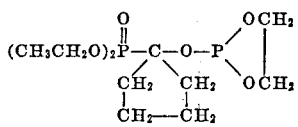

*Example 78*

To a mixture consisting of 37.1 g. (0.298 mole) of trimethyl phosphite and 29.3 g. (0.298 mole) of cyclohexanone, there was added, over a 10-minute period, 52 g. (0.298 mole) of 2-chloro-1,3,2-benzodioxaphosphole. During the addition, the temperature of the reaction mixture increased from 22° C. to 30° C. Subsequently, the mixture was allowed to stand until the temperature of the exothermic reaction rose to 36° C., at which point it was cooled to 20° C. Stirring was then continued without external cooling for about an hour. At the end of that time, the mixture was heated to 85° C. in order to insure complete reaction, cooled to 70° C., placed under water-pump vacuum, and heated to 102° C. in order to remove by-product methyl chloride and any unreacted material. The residue which solidified upon cooling consisted of 103.2 g. (100% theoretical yield) of the substantially pure pyrocatechol phosphite (cyclic ester) of dimethyl (1-hydroxycyclohexyl)phosphonate of the structure

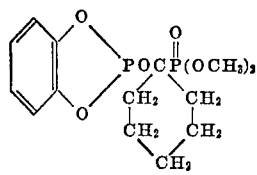

*Example 79*

To a cooled (0° C.) mixture consisting of 113. 7 g. (0.71 mole) of triethyl phosphite and 82.5 g. (0.65 mole) of 2-chloro-1,3,2-dioxaphospholane there was added, dropwise with stirring during 30 minutes, 70.1 g. (0.715 mole) of cyclohexanone. The temperature of the reaction mixture rose to 23° C. during the cyclohexanone addition. The whole was then warmed to 70° C., subjected to water-pump vacuum, and heated to 95° C. Subsequent distillation gave 169.0 g. (79.7% theoretical yield) of the substantially pure ethylene glycol phosphite (cyclic ester) of diethyl (1 - hydroxycyclohexyl)phosphonate, B.P. 156–158° C./0.3 mm., 152–153° C/0.2 mm., $n_D^{26}$ 1.4779, of the structure

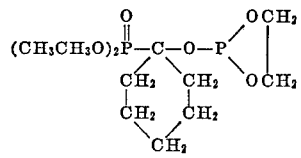

The presently provided phosphonate analyzed as follows:

|  | Found | Calcd. for $C_{12}H_{24}O_6P_2$ |
|---|---|---|
| Percent C | 44.43 | 44.16 |
| Percent H | 7.55 | 7.48 |
| Percent P | 18.76 | 18.98 |

*Example 80*

2-chloro-1,3,2-benzodioxaphosphole (69.8 g., 0.4 mole) was added, during 15 minutes, to a mixture consisting of 134 g. (0.4 mole) of tri-n-hexyl phosphite and 39.3 g. (0.4 mole) of cyclohexanone. During addition of the phosphole, the temperature of the reaction mixture was maintained at 25–30° C. by occasional cooling. The whole was then stirred until cessation in temperature rise, employing external cooling in order to maintain the temperature of the mixture at below 40° C. The reaction was completed by heating the mixture to 95° C.; and by-product n-hexyl chloride was removed by heating the mixture to 115° C. under water-pump vacuum. Concentration to 168° C./0.4 mm., gave as residue 189.5 g. (99.6% yield) of the substantially pure pyrocatechol phosphite (cyclic ester) of di-n-hexyl (1-hydroxycyclohexyl)phosphonate, $n_D^{25}$ 1.4970, analyzing 58.55% carbon and 8.80% hydrogen as against 59.21% and 8.27%, the calculated values, and having the structure

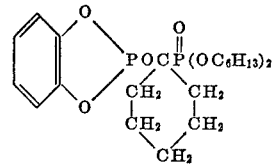

*Example 81*

To a mixture consisting of 44.2 g. (0.45 mole) of cyclohexanone and 126.8 g. (0.47 mole) of tris(2-chloroethyl) phosphite cooled to 12° C., there was added, dropwise, 78.5 g. (0.45 mole) of 2-chloro-1,3,2-benzodioxaphosphole. Occasional cooling was employed to keep the temperature of the reaction mixture below 40° C. during addition of the phosphole. The mixture was then allowed to stand at room temperature and stirred until cessation in temperature rise. It was then heated to 80° C. in order to insure complete reaction, placed under water-pump vacuum and heated to 110° C. to remove by-product 1,2-dichloroethane and any unreacted material, and finally concentrated to 146° C./0.2 mm. There was thus obtained as residue 202.0 g. of the substantially pure pyrocatechol phosphite (cyclic ester) of bis(2-chloroethyl) (1-hydroxycyclohexyl)phosphonate, $n_D^{25}$ 1.5302, of the following structure

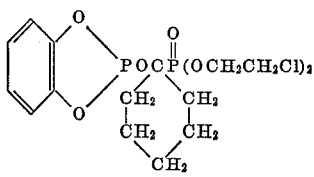

*Example 82*

To a mixture consisting of 83 g. (0.50 mole) of triethyl phosphite and 34.8 g. (0.60 mole) of propionaldehyde there was added, with cooling, 52 g. (0.25 mole) of methylphenylphosphoramidous dichloride, during a time of about 10 minutes at a temperature of from 10° C. to 20° C. The reaction mixture was maintained at 45–55° C. for another 12 minutes, using occasional cooling. The resulting orange product was then warmed to 90° C., placed under water-pump vacuum at this temperature, and finally concentrated to 95° C./0.2 mm., to give as residue 132.5 g. of the substantially pure bis[1 - (diethoxyphosphinyl)propyl]methylphenylphosphoramidite having the formula

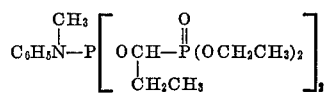

*Example 83*

To a mixture consisting of 88.0 g. (0.263 mole) of tri-n-hexyl phosphite and 27.9 g. (0.263 mole) of benzaldehyde in a nitrogen atmosphere there was added, with stirring, during 0.1 hour, 24.4 g. (0.132 mole) of piperidinophosphorodichloridite. A slight exothermal reaction was noted and when all of the chloridite had been added, the reaction mixture was warmed at 85–90° C. for 1.5 hours and subsequently distilled to remove 26.2 g. of material boiling up to 40° C./0.05 mm. (chiefly hexyl chloride) to give as residue 112.2 g. of the substantially pure bis[α-(di-n-hexyloxyphosphinyl)benzyl]piperidinophosphonite having the formula

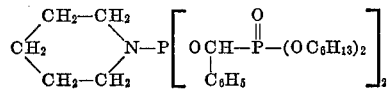

*Example 84*

To a mixture consisting of 135 g. (0.50 mole) of tris(β-chloroethyl) phosphite and 46.5 g. (0.25 mole) of piperidinophosphorodichloridite there was added, with cooling during 0.2 hour, 41.6 g. (0.70 mole) of propionaldehyde. When all of the aldehyde had been added and cooling was discontinued, the temperature of the reaction mixture increased spontaneously and during the next 0.3 hour, occasional cooling was required to maintain the temperature of the mixture at 80–90° C. When there was no longer evidence of exothermal reaction, the reaction mixture was warmed at 90–102° C. for 0.3 hour and then concentrated to 105° C./0.05 mm., to give 38.6 g. of by-product ethylene chloride in the trap which formed a part of the equipment, and as residue 183.6 g. of the substantially pure bis{1-[bis(2-chloroethoxy)phosphinyl]propyl}piperidinophosphonite of the formula

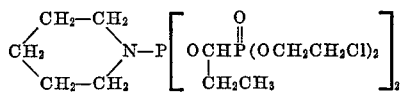

*Example 85*

To 1067.7 g. of a substantially equimolar mixture of bis(2-chloropropyl) phosphorochloridite and tris(2-chloropropyl) phosphite there was added, dropwise, 216 g. (1.884 moles) of heptaldehyde. By the time two-thirds of the aldehyde had been added, the temperature had risen to 30° C.; at this point, ice-cooling was applied and the remainder of the aldehyde was added at a temperature of 20–30° C. The whole was then stirred, with cooling, until no further heat of reaction was apparent. Upon warming the reaction mixture to 75° C., subjecting it to water-pump vacuum, heating to 90° C. to remove by-product dichloropropane, and concentrating to 125° C./3.0 mm., there was obtained as residue 1075 g. of the substantially pure bis(2-chloropropyl) phosphite of bis(2-chloropropyl) (1-hydroxyheptyl)phosphonate, $n_D^{25}$ 1.4743, of the structure

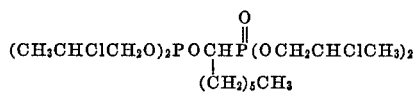

*Example 86*

To 202.4 g. of a substantially equimolar mixture of bis(2-chloropropyl) phosphorochloridite and tris(2-chloropropyl) phosphite there was added, during 10 minutes, 38.1 g. (0.358 mole) of benzaldehyde, while applying sufficient cooling to keep the reaction temperature between 20–30° C. during addition of the aldehyde. The whole was then stirred while maintaining the temperature of the reaction mixture at below 40° C.; and when no further reaction was apparent, it was heated to 85° C. in order to insure complete reaction. Concentration to 130° C./1.4 mm. to remove any unreacted starting material and by-product gave as residue 198.2 g. (99.2% yield) of the substantially pure bis(2-chloropropyl) phosphite of bis(2-chloropropyl) (α-hydroxybenzyl)phosphonate, $n_D^{25}$ 1.5048, of the following structure

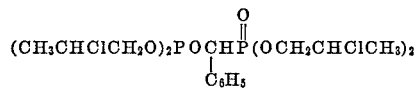

*Example 87*

To a mixture consisting of 99.6 g. (0.6 mole) of triethyl phosphite and 43.5 g. (0.75 mole) of acetone there was added, during 0.3 hour, 63.2 g. (0.5 mole) of 2-chloro - 1,3,2 - dioxaphospholane, while maintaining the temperature of the reaction mixture at 32–36° C. by ice-cooling. The whole was then gradually warmed to 85° C. and distilled to give 126.5 g. (88% yield) of the substantially pure ethylene glycol (cyclic ester) of diethyl (2-hydroxy-2-propyl)phosphonate, B.P. about 113° C./0.1 mm., $n_D^{25}$ 1.4550, which analyzed 37.62% carbon and 7.06% hydrogen as against 37.7% and 7.05% the respective calculated values, and having the structure

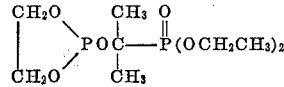

*Example 88*

To 124 g. (1.0 mole) of trimethyl phosphite there was added, during about 6 minutes, 45.2 g. (0.33 mole) of phosphorus trichloride. While cooling the reaction mixture in an ice bath, there was gradually added thereto, during 30 minutes at 15–18° C., 60 g. (1.07 mole) of redistilled acrolein. When the cooling bath was removed, the temperature increased exothermally to 33° C. Heat was then applied and it was warmed to 50° C. During this time a total of 45.0 g. of methyl chloride was collected in the Dry-Ice trap which formed a part of the reaction equipment. The reaction mixture was then placed under vacuum and warmed to 101° C./4 mm. There was thus obtained as residue 173.0 g. (100% of theory) of the substantially pure tris[1-(dimethoxyphosphinyl)-2-propenyl] phosphite, $n_D^{25}$ 1.4793, analyzing 33.57% carbon and 6.03% hydrogen as against 34.3% and 5.8%, the calculated values.

Example 89

To a mixture consisting of 87 g. (0.7 mole) of trimethyl phosphite and 63.2 g. (0.5 mole) of 2-chloro-1,3,2-dioxaphospholane there was gradually added, during a period of 0.3 hour, 39.2 g. (0.7 mole) of acrolein containing 1.1% hydroquinone as stabilizer. During the acrolein addition, the temperature of the reaction mixture was maintained at 23–28° C. by external cooling. When all of the acrolein had been added, the reaction mixture was heated to 112° C. and then distilled in vacuo to give 68 g. of the substantially pure 2-[1-(dimethoxyphosphinyl) - 2 - propenyloxy] - 1,3,2 - dioxaphospholane, B.P. 134–145° C./1.5 mm., $n_D^{25}$ 1.4725, of the structure

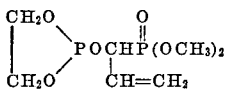

Example 90

To 40 g. (0.72 mole) of redistilled acrolein containing 1% of hydroquinone there was gradually added with cooling, during a period of 0.3 hour, 63.2 g. (0.50 mole) of 2-chloro-1,3,2-dioxaphospholane. During the addition of the phospholane, the temperature of the reaction mixture was maintained at from minus 1° C. to 4° C. To the cooled reaction mixture there was then added 150 g. (0.6 mole) of tributyl phosphite during a period of 0.2 hour. Cooling was discontinued and the whole warmed to 78° C. Distillation in vacuo to remove material boiling below 105° C./0.2 mm., gave as residue 181.8 g. of colorless 2-[1-(dibutoxyphosphinyl)-2-propenyloxy]-1,3,2-dioxaphospholane, $n_D^{25}$ 1.4678, analyzing 46.4% carbon and 7.6% hydrogen as against 45.9% and 7.7%, the calculated values.

Example 91

To 166 g. of an equimolar mixture consisting of tris-(2-chloroethyl) phosphite and bis(2-chloroethyl) phosphorochloridite there was added, during 0.1 hour, 43.6 g. (0.33 mole) of cinnamaldehyde. The temperature increased spontaneously to a maximum of 49° C. The reaction mixture was then warmed to 90° C. and finally concentrated to a pot temperature of 148° C./1.5 mm. There was thus obtained as residue 180 g. of the substantially pure 1-[bis(2-chloroethoxy)phosphinyl] - 3 - phenyl - 2 - propenyl bis(2-chloroethyl) phosphite, $n_D^{25}$ 1.5278, of the structure

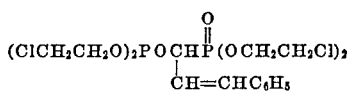

The presently obtained phosphite-phosphonate analyzed as follows:

|   | Found | Calcd. for $C_{17}H_{24}Cl_4O_6P_2$ |
|---|---|---|
| Percent C | 38.14 | 38.7 |
| Percent H | 4.65 | 4.6 |
| Percent Cl | 27.35 | 26.9 |

Example 92

To a mixture consisting of 55.8 g. (0.45 mole) of trimethyl phosphite and 50.7 g. (0.4 mole) of 2-chloro-1,3,2-dioxaphospholane there was added, with cooling, during 0.2 hour 28 g. (0.4 mole) of methacrolein. After all of the methacrolein had been added, cooling was discontinued and the temperature of the reaction mixture increased spontaneously to 41° C. The colorless reaction mixture was then warmed at 60–68° C. for 0.5 hour. Distillation gave 83.5 g. (77% theoretical yield) of the substantially pure 2-[(dimethoxyphosphinyl)-2-methyl-2-propenyloxy] - 1,3,2 - dioxaphospholane, B.P. 132–140° C./0.1 mm., analyzing 35.71% carbon, 6.27% hydrogen and 23.20% phosphorus as against 35.6%, 6.0% and 23.0%, the calculated values, and having the structure

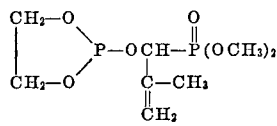

Example 93

To a cooled mixture consisting of 69.6 g. (0.57 mole) of 4-hydroxybenzaldehyde and 94.8 g. (0.57 mole) of triethyl phosphite there was added 72.2 g. (0.57 mole) of 2-chloro-1,3,2-dioxaphospholane during 20 minutes. Toward the end of the phospholane addition, about 50 ml. of methylene dichloride was added to the reaction mixture. After all of the phospholane had been added, the reaction mixture was stirred for about 1.5 hours, during which time the temperature was noted to rise to 35° C. There was thus obtained a methylene dichloride solution of 2-[α-(diethoxyphosphenyl) - 4 - hydroxybenzyloxy] - 1,3,2 - dioxaphospholane having the structure

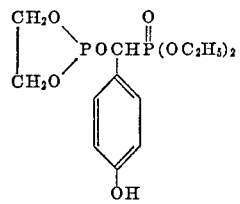

Example 94

To a cooled mixture consisting of 94.6 g. (0.57 mole) of triethyl phosphite and 72.0 g. (0.57 mole) of 2-chloro-1,3,2-dioxaphospholane there was added, during 30 minutes, 68.6 g. (0.57 mole) of redistilled salicylaldehyde. When all of the aldehyde had been added, the mixture was allowed to attain room temperature, stirred for 20 minutes, and then heated to 45° C. in order to insure complete reaction. Volatile by-product was removed by subjecting the mixture to a vacuum of 2.0 mm. There was thus obtained the substantially pure 2-[α-(diethoxyphosphinyl)-2-hydroxybenzyl]-1,3,2-dioxaphospholane,

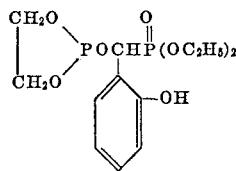

Example 95

To a mixture consisting of 49.5 g. (0.312 mole) of 4-acetamidobenzaldehyde and 38.8 g. (0.312 mole) of trimethyl phosphite dissolved in methylene chloride there was added, dropwise, 39.5 g. (0.312 mole) of 2-chloro-1,3,2-dioxaphospholane while cooling at 25–35° C. The whole was allowed to stand until cessation in temperature rise. It was then refluxed for one hour to insure complete reaction. The solvent and by-product methyl chloride were removed by subjecting the reaction mixture to water-pump vacuum. The residue comprised 2-[α-(dimethoxyphosphinyl) - 4 - acetamido - benzyloxy] - 1,3,2-dioxaphospholane

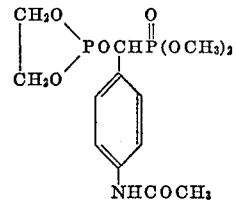

Example 96

To a mixture consisting of 62.7 g. (0.35 mole) of phenylphosphonous dichloride and 234 g. (0.70 mole) of trihexyl phosphite there was gradually added 74.3 g. (0.70 mole) of benzaldehyde. The reaction mixture was cooled moderately in order to maintain the temperature below 35° C. When no further rise in temperature was evidenced, the reaction mixture was slowly warmed to 97° C. and finally concentrated to a pot temperature of 183° C./1 mm. There was thus obtained as residue 273 g. (95% of theory) of the substantially pure bis[α-(dihexyloxyphosphinyl)benzyl] phenylphosphonite, $n_D^{25}$ 1.5068, of the structure

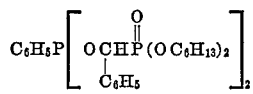

Example 97

To a mixture consisting of triethyl phosphite 10.0 g. (0.06 mole) and 4.6 g. (0.079 mole) of propionaldehyde there was added under a nitrogen atmosphere 4.5 g. (0.028 mole) of n-butylphosphonous dichloride with cooling at 9–15° C. The colorless reaction mixture was warmed to 70° C., transferred to a distilling flask, and concentrated to a pot temperature of 110° C./0.3 mm. to give as residue 12.0 g. of the substantially pure bis-[1-(diethoxyphosphinyl)propyl] n-butylphosphonite,

Example 98

Into a 500 ml. flask equipped as in the previous example there was added 19.8 g. (0.1 mole) of diethyl phenylphosphonite and 4.6 g. (0.033 mole) of phosphorus trichloride. The mixture was cooled to 10° C. and then 4.4 g. (0.1 mole) of acetaldehyde was added dropwise in a few minutes. Cooling was applied to keep the temperature below 30° C. When the addition was completed the reaction mixture was heated to 75° C. to insure complete reaction. The mixture was then subjected to water-pump vacuum to remove the by-product. The product was finally concentrated to 80° C./3 mm. The product, tris[1-(ethoxyphenylphosphinyl)ethyl] phosphite, $n_D^{25}$ 1.5409, was obtained as a clear colorless viscous liquid.

Example 99

To a 500 ml. flask there was added 19.8 g. (0.1 mole) of diethyl phenylphosphonite and 5.8 g. (0.1 mole) of propionaldehyde. Then 9.8 g. (0.05 mole) of phenyl phosphorodichloridite was added dropwise in five minutes while cooling at 25–30° C. When the addition was completed, the mixture was heated to 130° C. to insure complete reaction. Concentration to 150° C. at reduced pressure gave as residue bis[1-(ethoxyphenylphosphinyl)propyl] phenyl phosphite,

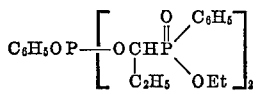

Example 100

Into a 500 ml. flask equipped with a stirrer, thermometer, condenser with drying tube, and a dropping funnel there was placed 49.6 g. (0.25 mole) of diethyl phenylphosphonite and 34.1 g. (0.25 mole) of p-anisaldehyde. Then 31.7 g. (0.25 mole) of 2-chloro-1,3,2-dioxaphospholane was added dropwise in ten minutes at 25–35° C., using an ice bath for cooling throughout the addition. When the addition was completed, the mixture was stirred until no further reaction was apparent and then concentrated at reduced pressure to give as residue 98.5 g. of viscous, colorless 2-[α-(ethoxyphenylphosphinyl)-p-methoxybenzyloxy]-1,3,2-dioxaphospholane,

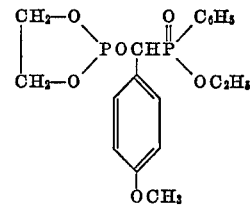

Example 101

To a mixture consisting of 5.0 g. (0.027 mole) of diethyl butylphosphonite and 2.0 g. (0.034 mole) of propionaldehyde there was added 5.2 g. (0.029 mole) of 2-chloro-4,5-benzo-1,3,2-dioxaphospholane. During the addition the temperature increased from 15° to 22° C. The mixture was then heated to 60° C. to insure complete reaction. Concentration at reduced pressure gave as residue 2 - [1 - (ethoxybutylphosphinyl)propyloxy]-4,5-benzo-1,3,2-dioxaphospholane.

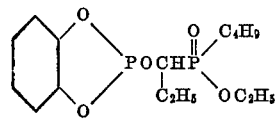

Example 102

To a mixture consisting of 9.9 g. (0.05 mole) of diethyl phenylphosphonite and 7.6 g. (0.05 mole) of vanillin there was added 8.7 g. (0.05 mole) of 2-chloro-4,5-benzo-1,3,2-dioxaphospholane dropwise in a few minutes. A water bath was used for cooling to moderate the reaction. When the addition was completed, the mixture was heated to 65° C. to insure complete reaction. The mixture was then concentrated at reduced pressure to give 2 - [α - (ethoxyphenylphosphinyl)-3-methoxy-4-hydroxybenzyloxy]-4,5-benzo-1,3,2-dioxaphospholane as a very viscous pale yellow liquid in almost quantitive yield.

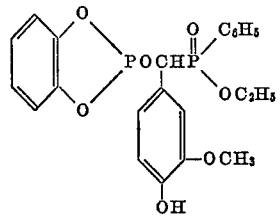

Example 103

To a mixture consisting of 19.8 g. (0.10 mole) of diethyl phenylphosphonite and 8.95 g. (0.05 mole) of phenylphosphonous dichloride, cooled to 20° C., there was added 4.4 g. (0.10 mole) of acetaldehyde. When the addition was completed, the cooling bath was removed and the mixture was heated to 75° C. to insure complete reaction. By-product, ethyl chloride, was removed by heating the reaction mixture under vacuum. The residue was concentrated to 80° C./1.5 mm. to obtain bis [1-(ethoxyphenylphosphinyl)ethyl] phenylphosphonite, $n_D^{25}$ 1.5583, having the formula

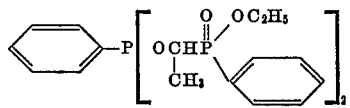

Example 104

To a mixture consisting of 5.4 g. of 2-ethylhexaldehyde and 8.5 g. of diethyl phenylphosphonite there was added 9.0 g. of tetraethyl phosphorodiamidochloridite. The mixture was heated to 75° C. to insure complete reaction. Concentration to 90° C. at reduced pressure gave as residue 19.8 g. of 1-(ethoxyphenylphosphinyl)-2-ethylhexyl tetraethyl phosphorodiamidite,

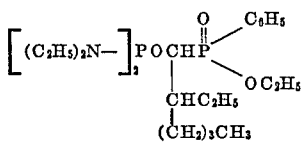

This application is a continuation-in-part of my co-pending application Serial No. 780,209, filed December 15, 1958, and now abandoned.

What I claim is:

1. The method of preparing compounds having diverse phosphorus ester groups which comprises contacting together the three reactants: (1) a trivalent phosphorus compound which does not undergo self-condensation and which has attached to the phosphorus atom thereof from one to three halogen atoms selected from the class consisting of chlorine and bromine, (2) a carbonyl compound which is selected from the class consisting of aldehydes and ketones and which has no substituent with which the compound (1) reacts in preference to the carbonyl group, and (3) a triorgano trivalent phosphorus ester in which at least one of the organic groups is bonded, at an aliphatic carbon thereof, to phosphorus through an oxygen atom, the quantity of (2) and of (3) being substantially that which is stoichiometrically required for the replacement of the halogen in (1).

2. The method of preparing compounds having diverse phosphorus ester groups which comprises contacting together: (1) a halogenated phosphorus compound which does not undergo self-condensation and which has the formula $R_nPX_{(3-n)}$ where R is selected from the class consisting of hydrocarbyl-, hydrocarbyloxy-, hydrocarbylthio-, and (hydrocarbyloxy)hydrocarbyloxy radicals of from 1 to 12 carbon atoms and such radicals carrying halogen as a substituent, (alkyl)$_2$N- and (alkyl)(aryl)N-radicals having from 1 to 5 carbon atoms in each alkyl group and 6 to 7 carbon atoms in the aryl group;

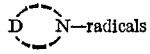

radicals where D represents the necessary atoms to make up a saturated N-hetero ring of from 3 to 6 members; and wherein two R's taken together stand for a radical selected from the class consisting of the bivalent —O—hydrocarbylene—O— and —O—halohydrocarbylene—O— radicals which complete a ring with the phosphorous atom, are free of aliphatic unsaturation, and which contain from 2 to 4 carbon atoms in a chain and a total of 2 to 12 carbon atoms; $n$ is an integer of from 0 to 2 and X is selected from the class consisting of chlorine and bromine; (2) a carbonyl compound of the formula

wherein Y is selected from the class consisting of hydrogen, hydrocarbyl radicals of from 1 to 17 carbon atoms when $n$ is 2, hydrocarbyl radicals of from 1 to 10 carbon atoms when $n$ is less than 2, the furyl radical and the thienyl radical, and such radicals carrying as a substituent, when $n$ is 0 to 2, a radical which is selected from the class consisting of halogen, —NO$_2$, —CHO, methylenedioxy, —CN, (alkyl)$_2$N—, —COO—alkyl, —S—alkyl, —SS—alkyl, —O—alkyl and alkyl—CONH— where the alkyl radical has from 1 to 5 carbon atoms, and also only when $n$ is 2, the —OH and —COOH radical; and Z is selected from the class consisting of hydrogen and the methyl radical and is methyl only when Y is selected from the class consisting of alkyl radicals of from 1 to 2 carbon atoms and the cyclopropyl radical; and when $n$ is 2, Z and Y taken together with the carbon atom to which they are attached complete the cyclohexane ring; and (3) a phosphorus ester compound of the formula A$_2$P—OT wherein A is selected from the class consisting of hydrocarbyl, hydrocarbyloxy, and (hydrocarbyloxy)hydrocarbyloxy radicals of from 1 to 12 carbon atoms and such radicals having halogen as a substituent, and T is selected from the class consisting of alkyl, alkenyl, aralkyl and hydrocarbyloxyalkyl radicals of from 1 to 12 carbon atoms, and such radicals having halogen substitution, and recovering from the resulting reaction product a compound of the formula

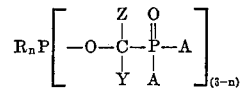

in which R, Z, Y, A, and $n$ are as defined above.

3. The method of preparing a compound having diverse phosphorus ester groups which comprises reacting together phosphorus trichloride, a hydrocarbon carboxaldehyde having from 1 to 10 carbon atoms in the hydrocarbon radical and a trialkyl phosphite having from 1 to 12 carbon atoms in the alkyl radical and recovering from the resulting reaction product a tris[(dialkoxyphosphinyl)hydrocarbyl] phosphite wherein each alkoxy radical has from 1 to 12 carbon atoms and the hydrocarbyl radical has from 1 to 10 carbon atoms.

4. The method of preparing a compound having diverse phosphorus ester groups which comprises reacting together a dialkyl phosphorochloridite having from 1 to 12 carbon atoms in each alkyl radical, a hydrocarbon carboxaldehyde having from 1 to 17 carbon atoms in the hydrocarbon radical and a trialkyl phosphite having from 1 to 12 carbon atoms in the alkyl radical and recovering from the resulting reaction product the dialkyl phosphite of a dialkyl (1-hydroxyhydrocarbyl)phosphonate wherein the hydrocarbyl radical has from 1 to 17 carbon atoms and each alkyl radical has from 1 to 12 carbon atoms.

5. The method of preparing a compound having diverse phosphorus ester groups which comprises reacting together a bis(haloalkyl) phosphorochloridite having from 1 to 12 carbon atoms in each haloalkyl radical, a hydrocarboncarboxaldehyde having from 1 to 17 carbon atoms in the hydrocarbon radical and a tris(haloalkyl) phosphite having from 1 to 12 carbon atoms in each alkyl radical, and recovering from the resulting reaction product the bis(haloalkyl) phosphite of a bis(haloalkyl) (1-hydroxyhydrocarbyl)phosphonate wherein each haloalkyl radical is as defined above and the hydrocarbyl radical has from 1 to 17 carbon atoms.

6. The method of preparing a compound having diverse phosphorus ester groups which comprises reacting together a bis(haloalkyl) phosphorochloridite having from 1 to 12 carbon atoms in each haloalkyl radical, an alkanecarboxaldehyde having from 1 to 17 carbon atoms in the alkane radical, and a tris(haloalkyl) phosphite having from 1 to 12 carbon atoms in the haloalkyl radical and recovering from the resulting reaction product the bis(haloalkyl) phosphite of a bis(haloalkyl) (1-hydroxyalkyl)phosphonate wherein the haloalkyl radical is as above defined and the hydroxyalkyl radical has from 1 to 17 carbon atoms.

7. The method of preparing a compound having diverse phosphorus ester groups which comprises reacting together a bis(haloalkyl) phosphorochloridite having from 1 to 12 carbon atoms in the haloalkyl radical, formaldehyde, and a tris(haloalkyl) phosphite having from 1 to 12 carbon atoms in each haloalkyl radical and recovering from the resulting reaction product the bis(haloalkyl) phosphite of a bis(haloalkyl) (1-hydroxymethyl)phosphonate wherein the haloalkyl radical is as above defined.

8. The method of preparing a compound having diverse phosphorus ester groups which comprises reacting together a bis(chloroalkyl) phosphorochloridite having from 1 to 12 carbon atoms in the chloroalkyl radical, a hydrocarboncarboxaldehyde with from 1 to 17 carbon atoms in the hydrocarbon radical, and a tris(chloroalkyl) phosphite with from 1 to 12 carbon atoms in the chloroalkyl radical, and recovering from the resulting product the bis(chloroalkyl) phosphite of a bis(chloroalkyl) (1-hydroxyhydrocarbyl)phosphonate wherein each chloroalkyl radical is as defined above and the hydrocarbyl radical has from 1 to 17 carbon atoms.

9. The method of preparing a compound having diverse phosphorus ester groups which comprises reacting together a bis(bromoalkyl) phosphorobromidite wherein each bromoalkyl radical has from 1 to 12 carbon atoms, a hydrocarboncarboxaldehyde having from 1 to 17 carbon atoms in the hydrocarbon radical, and a tris(bromoalkyl) phosphite having from 1 to 12 carbon atoms in each bromoalkyl radical, and recovering from the resulting reaction product the bis(bromoalkyl) phosphite of a bis-(bromoalkyl) (1 - hydroxyhydrocarbyl)phosphonate wherein each bromoalkyl radical is as defined above and the hydrocarbyl radical has from 1 to 17 carbon atoms.

10. The method of preparing a compound having diverse phosphorus ester groups which comprises reacting together a phosphorus-chlorine compound of the formula

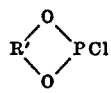

in which R' is a bivalent hydrocarbylene radical which is free of aliphatic unsaturation and which contains from 2 to 4 carbon atoms in a chain and a total of 2 to 12 carbon atoms, a hydrocarboncarboxaldehyde having from 1 to 17 carbon atoms in the hydrocarbon radical, and a trialkyl phosphite having from 1 to 12 carbon atoms in the alkyl radical and recovering from the resulting reaction product a compound of the formula

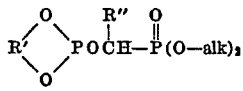

wherein R' is as defined above, R" is a hydrocarbyl radical having from 1 to 17 carbon atoms and alk denotes an alkyl radical of from 1 to 12 carbon atoms.

11. The method of preparing a compound having diverse phosphorus ester groups which comprises reacting together a bis(haloalkyl) phosphorochloridite with from 1 to 12 carbon atoms in each haloalkyl radical, an alkenecarboxaldehyde having from 1 to 17 carbon atoms in the alkene radical, and a tris(haloalkyl) phosphite having from 1 to 12 carbon atoms in the haloalkyl radical and recovering from the resulting reaction product the bis-(haloalkyl) phosphite of a bis(haloalkyl) (1-hydroxyalkenyl)phosphonate wherein each haloalkyl radical is as above defined and the alkenyl radical has from 1 to 17 carbon atoms.

12. The method of preparing a compound having diverse phosphorus ester groups which comprises reacting together a bis(haloalkyl) phosphorochloridite having from 1 to 12 carbon atoms in each haloalkyl radical, acetone, and a tris(haloalkyl) radical having from 1 to 12 carbon atoms in each haloalkyl radical and recovering from the resulting reaction product the bis(haloalkyl) phosphite of bis(haloalkyl) (2-hydroxypropyl)phosphonate wherein each haloalkyl radical is as above defined.

13. The method of preparing a compound having diverse phosphorus ester groups which comprises reacting together bis(chloroethyl) phosphorochloridite, acetaldehyde, and tris(2-chloroethyl) phosphite and recovering the bis(2-chloroethyl) phosphite of bis(2-chloroethyl) (1-hydroxyethyl)phosphonate from the resulting reaction product.

14. The method of preparing a compound having diverse phosphorus ester groups which comprises reacting together bis(2-chloropropyl) phosphorochloridite, acetaldehyde and tris(2-chloropropyl) phosphite and recovering the bis(2-chloropropyl) phosphite of bis(2-chloropropyl) (1-hydroxyethyl)phosphonate from the resulting reaction product.

15. The method of preparing a compound having diverse phosphorus ester groups which comprises reacting together bis(2-chloropyl) phosphorochloridite, benzaldehyde and tris(2-chloropropyl) phosphite and recovering the bis(2-chloropropyl) phosphite of bis(2-chloropropyl) (α-hydroxybenzyl)phosphonate from the resulting reaction product.

16. The method of preparing a compound having diverse phosphorus ester groups which comprises reacting together 2-chloro-1,3,2-dioxaphospholane, acetaldehyde, and triethyl phosphite and recovering the ethylene glycol phosphite (cyclic ester) of diethyl (1-hydroxyethyl)phosphonate from the resulting reaction product.

17. The method of preparing a compound having diverse phosphorus ester groups which comprises reacting together phosphorus trichloride, acrolein and trimethyl phosphite and recovering tris[1-(dimethoxyphosphinyl)-2-propenyl] phosphite from the resulting reaction product.

18. The method of preparing a compound having diverse phosphorus groups which comprises reacting together bis-(2-bromo-3-chloropropyl) phosphorobromidite, acetaldehyde and tris(2-bromo-3-chloropropyl) phosphite and recovering the bis(2-bromo-3-chloropropyl) (1-hydroxyethyl)phosphonate from the resulting reaction product.

19. The method of preparing a compound having diverse phosphorus groups which comprises reacting together 2-chloro-1,3,2-benzodioxaphosphole, triethyl phosphite and acetaldehyde and recovering from the resulting reaction product the pyrocatechol (cyclic ester) of dimethyl (1-hydroxyethyl)phosphonate.

20. The method which comprises contacting substantially five moles of an oxirane compound of the formula

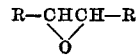

in which R is selected from the class consisting of hydrogen, alkyl, haloalkyl and alkenyl radicals of from 1 to 6 carbon atoms, the phenyl radical, and alkoxyalkyl and phenoxyalkyl radicals of from 2 to 7 carbon atoms and in which the sum of the carbon atoms in the two R radicals is less than 9, with substantially two moles of a phosphorus trihalide of the formula

in which X is selected from the class consisting of chlorine and bromine to obtain a substantially equimolar mixture of a phosphite of the formula

in which R and X are as herein defined, and a phosphorohalidite of the formula

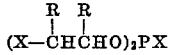

in which R and X are as herein defined, contacting said equimolar mixture with a carbonyl compound of the formula

in which Y is selected from the class consisting of hydrogen, and the radicals: alkyl of from 1 to 17 carbon atoms, alicyclic hydrocarbon which are free of α,β-unsaturation and have from 5 to 6 carbon atoms in the ring and a total of from 5 to 10 carbon atoms, benzenoid hydrocarbon which are free of olefinic and acetylenic unsaturation and have from 6 to 18 carbon atoms, furyl, and thienyl, and the said radicals carrying a substituent selected from the class consisting of —CN, —NO₂, halogen, methylenedioxy, —CHO, —OH, alkyl, —COOalkyl, —Oalkyl, —Salkyl, (alkyl)₂N—, and alkylCONH— where alkyl denotes an alkyl radical of from 1 to 5 carbon atoms; Z is selected from the class consisting of hydrogen and the methyl radical and is methyl only when Y is an alkyl radical of from 1 to 2 carbon atoms; and Z and Y together with the carbon atom to which they are attached stand for an alicyclic ring selected from the class consisting of cycloalkylene and cycloalkenylene radicals having 6 carbon atoms in the ring and a total of from 6 to 11 carbon atoms, and being free of α,β-unsaturation, and recovering from the resulting reaction product a phosphite-phosphonate of the formula

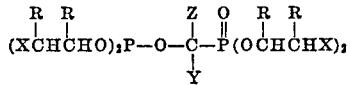

in which R, X, Z and Y are as herein defined.

21. The method defined as claim 20, further limited in that the oxirane compound is ethylene oxide.

22. The method defined in claim 20, further limited in that the oxirane compound is propylene oxide.

23. The method defined in claim 20, further limited in that the oxirane compound is epichlorohydrin.

24. The method which comprises contacting substantially five moles of ethylene oxide with substantially two moles of phosphorus trichloride to obtain a substantially equimolar mixture of tris(2-chloroethyl) phosphite and bis(2-chloroethyl) phosphorochoridite, contacting said equimolar mixture with a fatty aldehyde of from 2 to 18 carbon atoms and recovering from the resulting reaction product the compound of the formula

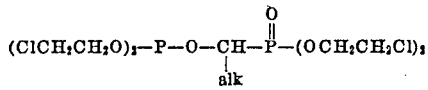

in which alk is an alkyl radical of from 1 to 17 carbon atoms.

25. The method which comprises contacting substantially five moles of ethylene oxide with substantially two moles of phosphorus trichloride to obtain a substantially equimolar mixture of tris(2-chloroethyl)phosphite and bis(2-chloroethyl) phosphorochloridite, contacting said equimolar mixture with acetaldehyde and recovering from the resulting reaction product the bis(2-chloroethyl) phosphite of bis(2-chloroethyl) (1-hydroxyethyl)phosphonate of the structure

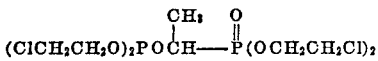

26. The method which comprises contacting substantially five moles of ethylene oxide with substantially two moles of phosphorus trichloride to obtain a substantially equimolar mixture of tris(2-chloroethyl) phosphite and bis(2-chloroethyl) phosphorochloridite, contacting said equimolar mixture with propionaldehyde and recovering from the resulting reaction product the bis(2-chloroethyl) phosphite of bis(2-chloroethyl) (1-hydroxypropyl)phosphonate of the structure

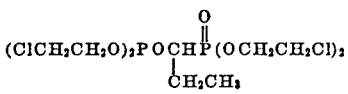

27. The method which comprises contacting substantially five moles of ethylene oxide with substantially two moles of phosphorus trichloride to obtain a substantially equimolar mixture of bis(2-chloropropyl) phosphorochloridite and tris(2-chloropropyl) phosphite, contacting said equimolar mixture with acetaldehyde, and recovering the bis(2-chloropropyl) phosphite of bis(2-chloropropyl) (1-hydroxyethyl)phosphonate from the resulting reaction product.

References Cited in the file of this patent

Alimov et al.: Bull. Acad. Sci., U.S.S.R., Div. of Chem. Sci. (English translation) 929–934 (1955).

UNITED STATES PATENT OFFICE
CERTIFICATE OF CORRECTION

Patent No. 3,014,944                                                   December 26, 1961

Gail H. Birum

It is hereby certified that error appears in the above numbered patent requiring correction and that the said Letters Patent should read as corrected below.

Column 6, lines 55 and 56, for "methyl, phenyl, phosphorochloridite," read -- methyl phenyl phosphorochloridite, --; column 7, line 11, for "d-2-" read -- di-2- --; lines 54 and 55, for "phosphorochloridothioite" read -- phosphorochloridodithioite --; line 56, for "bis(2-chloropropyl)" read -- bis(2,4-dichlorobenzyl) --; same column 7, lines 58 and 59, and lines 68 and 69, for "phosphorochloridothioite, each occurrence, read -- phosphorochloridodithioite --; column 9, line 53, for "R'" read -- R" --; column 10, line 24, for "1 to 1" read -- 1 to 18 --; column 18, line 65, strike out "R" is hydrogen"; column 23, line 25, for "R" read -- R' --; column 33, line 51, strike out "n-", first occurrence; column 35, line 58, for "Y" read -- Y' --; column 38, line 24, for "(butenyloxy)" read -- (2-butenyloxy) --; column 47, line 52, for "to" read -- of --; column 54, line 54, for "(2,3-dichloro-α-" read -- 2,4-dichloro-α- --; column 56, lines 51 to 57, the structure should appear as shown below instead of as in the patent:

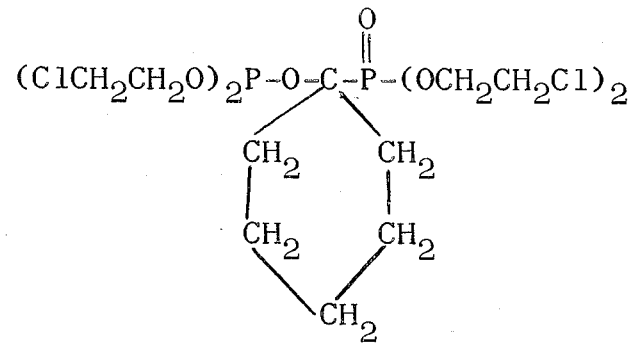

3,014,944 column 63, lines 30 to 37, the structure should appear as shown below instead of as in the patent:

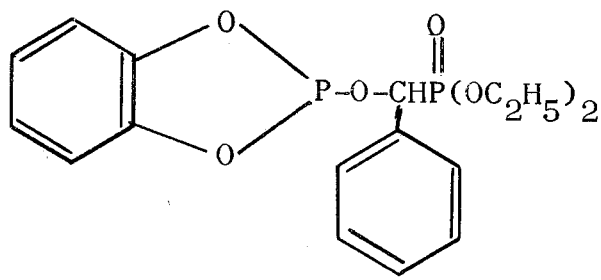

column 68, lines 15 to 22, the structure should appear as shown below instead of as in the patent:

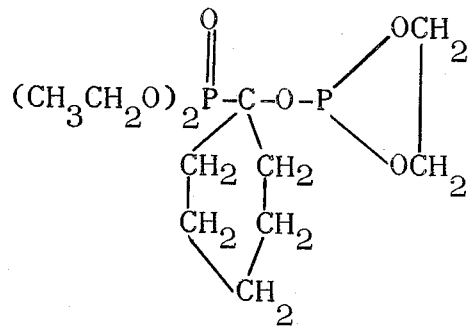

Signed and sealed this 23rd day of October 1962.

(SEAL)
Attest:

ERNEST W. SWIDER
Attesting Officer

DAVID L. LADD
Commissioner of Patents

UNITED STATES PATENT OFFICE
CERTIFICATE OF CORRECTION

Patent No. 3,014,944            December 26, 1961

Gail H. Birum

It is hereby certified that error appears in the above numbered patent requiring correction and that the said Letters Patent should read as corrected below.

Column 6, lines 55 and 56, for "methyl, phenyl, phosphorochloridite," read -- methyl phenyl phosphorochloridite, --; column 7, line 11, for "d-2-" read -- di-2- --; lines 54 and 55, for "phosphorochloridothioite" read -- phosphorochloridodithioite --; line 56, for "bis(2-chloropropyl)" read -- bis(2,4-dichlorobenzyl) --; same column 7, lines 58 and 59, and lines 68 and 69, for "phosphorochloridothioite, each occurrence, read -- phosphorochloridodithioite --; column 9, line 53, for "R'" read -- R" --; column 10, line 24, for "1 to 1" read -- 1 to 18 --; column 18, line 65, strike out "R" is hydrogen"; column 23, line 25, for "R" read -- R' --; column 33, line 51, strike out "n-", first occurrence; column 35, line 58, for "Y" read -- Y' --; column 38, line 24, for "(butenyloxy)" read -- (2-butenyloxy) --; column 47, line 52, for "to" read -- of --; column 54, line 54, for "(2,3-dichloro-α-" read -- 2,4-dichloro-α- --; column 56, lines 51 to 57, the structure should appear as shown below instead of as in the patent:

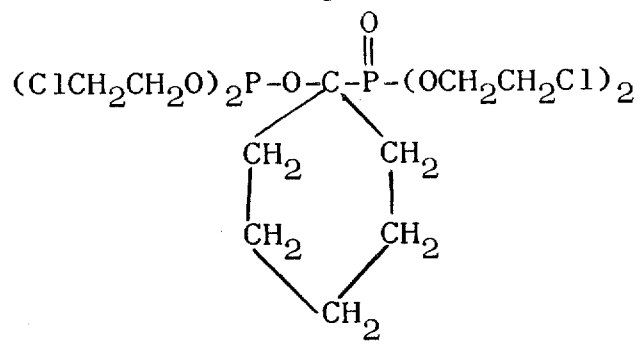

3,014,944 column 63, lines 30 to 37, the structure should appear as shown below instead of as in the patent:

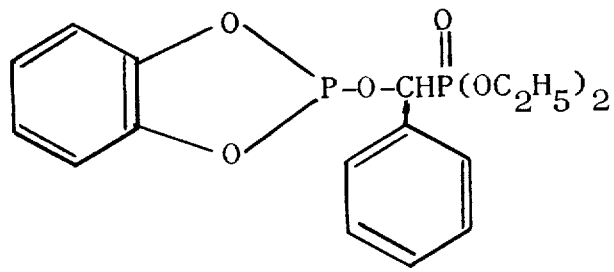

column 68, lines 15 to 22, the structure should appear as shown below instead of as in the patent:

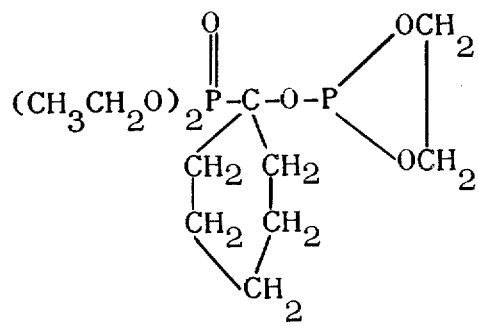

Signed and sealed this 23rd day of October 1962.

(SEAL)
Attest:

ERNEST W. SWIDER
Attesting Officer

DAVID L. LADD
Commissioner of Patents